US007395237B1

(12) United States Patent
Hall et al.

(10) Patent No.: US 7,395,237 B1
(45) Date of Patent: Jul. 1, 2008

(54) METHODS AND APPARATUS FOR CONNECTING SHIPPERS AND CARRIERS IN THE THIRD PARTY LOGISTICS ENVIRONMENT VIA THE INTERNET

(75) Inventors: Craig T. Hall, Holland, MI (US); Jeffrey W. Potts, Holland, MI (US); Dan Dershem, Holland, MI (US); Andrew J. Bass, Holland, MI (US)

(73) Assignee: LeanLogistics, Inc., Holland, MI (US)

( * ) Notice: Subject to any disclaimer, the term of this patent is extended or adjusted under 35 U.S.C. 154(b) by 0 days.

(21) Appl. No.: 09/482,154

(22) Filed: Jan. 12, 2000

Related U.S. Application Data

(60) Provisional application No. 60/162,809, filed on Nov. 1, 1999.

(51) Int. Cl.
*G06Q 30/00* (2006.01)
(52) U.S. Cl. ............................. 705/37; 705/26; 705/27; 705/38; 705/80
(58) Field of Classification Search .................. 705/14, 705/26, 27, 37, 39, 67, 38, 80
See application file for complete search history.

(56) References Cited

U.S. PATENT DOCUMENTS

| | | | | |
|---|---|---|---|---|
| 4,799,156 A | | 1/1989 | Shavit et al. .................. 705/26 |
| 5,666,493 A | | 9/1997 | Wojcik et al. ................. 705/26 |
| 5,706,211 A | | 1/1998 | Beletic et al. ........... 364/514 R |
| 5,717,989 A | | 2/1998 | Tozzoli et al. ................. 705/37 |
| 5,724,524 A | | 3/1998 | Hunt et al. ................... 395/237 |
| 5,826,244 A | * | 10/1998 | Huberman ..................... 705/37 |
| 5,835,896 A | * | 11/1998 | Fisher et al. ................... 705/37 |
| 5,867,495 A | | 2/1999 | Elliott et al. ................. 370/352 |
| 5,890,138 A | * | 3/1999 | Godin et al. ................... 705/37 |
| 5,910,896 A | | 6/1999 | Han-Carlson .......... 364/479.01 |
| 6,026,383 A | | 2/2000 | Ausubel ....................... 705/37 |
| 6,035,289 A | * | 3/2000 | Chou et al. ................... 705/37 |
| 6,230,146 B1 | * | 5/2001 | Alaia et al. ................... 705/37 |
| 6,269,343 B1 | * | 7/2001 | Pallakoff ..................... 705/26 |
| 6,598,026 B1 | * | 7/2003 | Ojha et al. ................... 705/26 |

OTHER PUBLICATIONS

"CAPS Logistics, Inc., a Baan Company, Luanches BidPro (TM) for Carrier Bid Optimization", PR Newswire, Apr. 16, 1999.*
"New Internet Start-up wil Match Empty Space or LTL Carriers with Shippers Seeking Cost Savings", PR Newswire, Oct. 29, 1999.*
"On-Line Matching Service Started", Logistic Management & Distribution Report, v37, n8, p. 96, Aug. 1999.*

(Continued)

*Primary Examiner*—Nga Nguyen
(74) *Attorney, Agent, or Firm*—Weaver Austin Villeneuve & Sampson LLP

(57) ABSTRACT

An online electronic marketplace in which carriers bid for loads tendered by shippers, and shippers purchase the most attractive transportation services. The system described herein efficiently matches loads and capacities, lowers transaction costs, and creates value through enhanced visibility to information resulting in efficient transportation and financial transactions. According to specific embodiments, the present invention combines a neutral marketplace patterned after a stock exchange, with the electronic format of an Internet auction site to create a trading system for the logistics industry.

17 Claims, 66 Drawing Sheets

OTHER PUBLICATIONS

"InterTrans, TanData Form Partnership", Traffic World, v9, n253, p. 45, Mar. 2, 1998.*

"GEN Sharpens ProVision", Traffic World, v6, n251, p. 49, Aug. 11, 1997.*

"Leaseway Joins Transport Exchange", Traffic World, v248, n9, p. 45, Dec. 2, 1996.*

"Descartes Announces Collaborative Logistics Exchange; E-Business Solution to Help Increase Transportation Efficiencies Across Trading Partner Communities.", Business Wire, Oct. 5, 1999.*

"Wal-Mart Streamlines Transportation Bidding Process with The SABRE Group's Decision-Support Software; Wal-Mart Realizes Multimillion Dollar Savings with OptiBid", PR Newswire, Aug. 15, 1998.*

\* cited by examiner

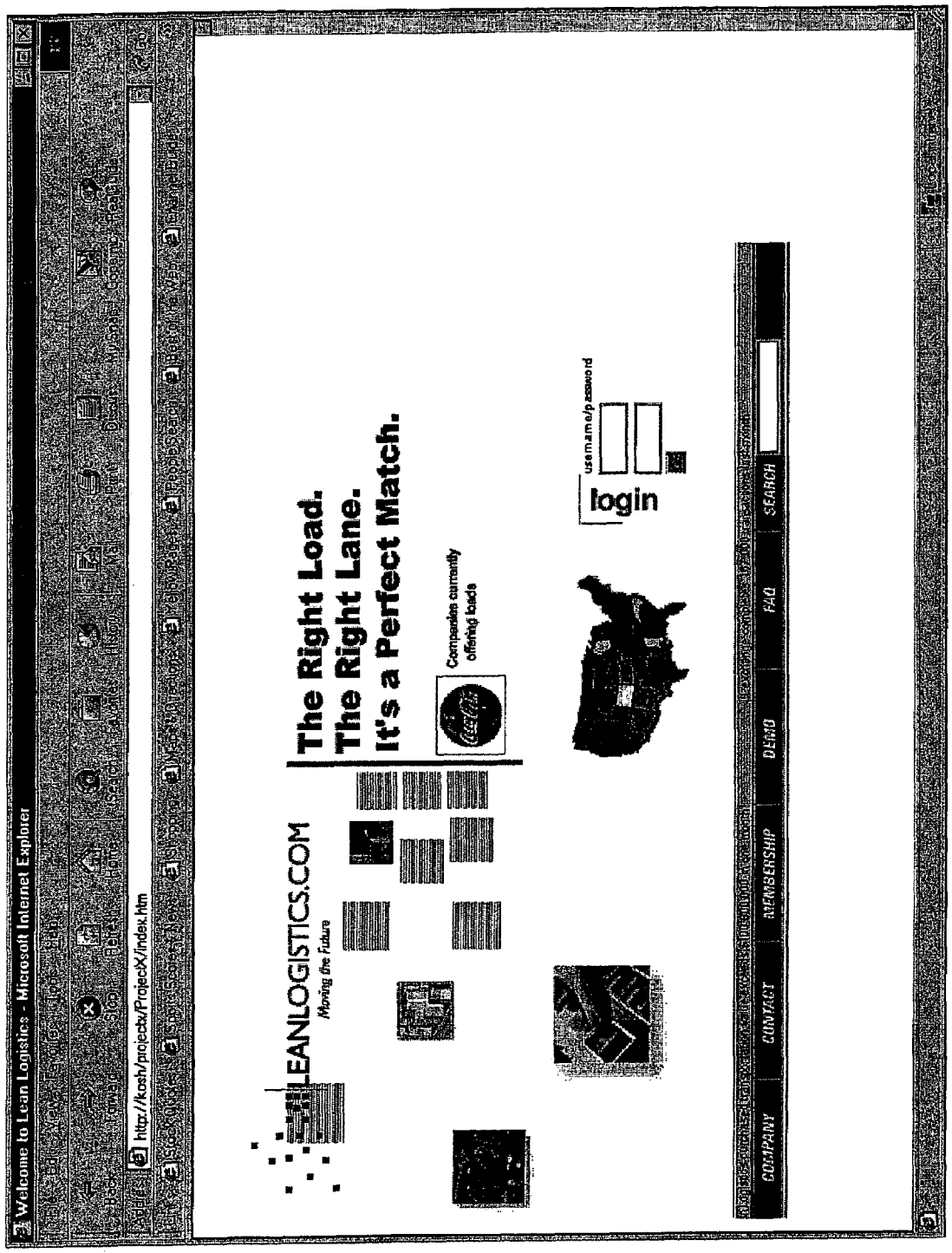
Fig. 1a (100)

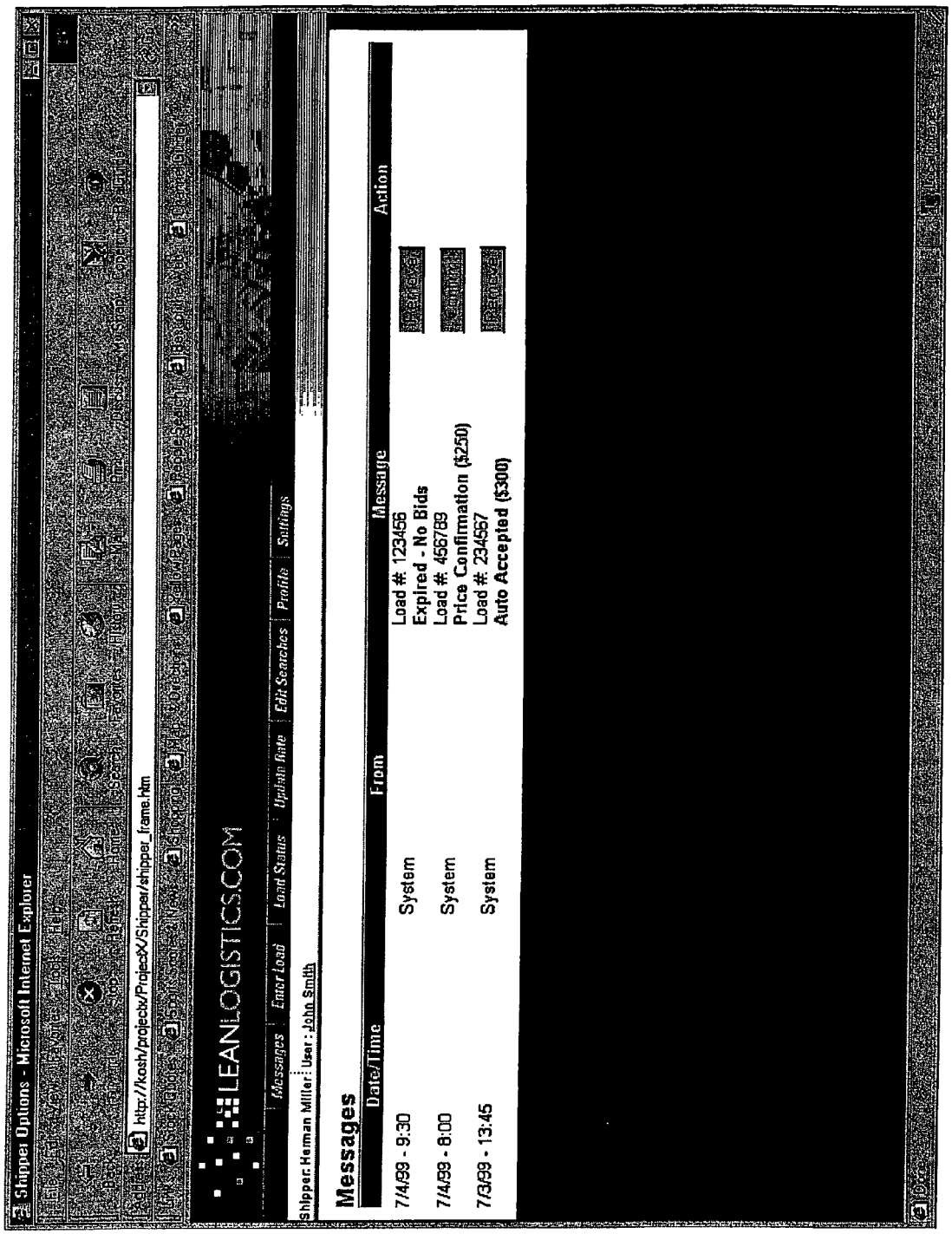
Fig. 1b (102)

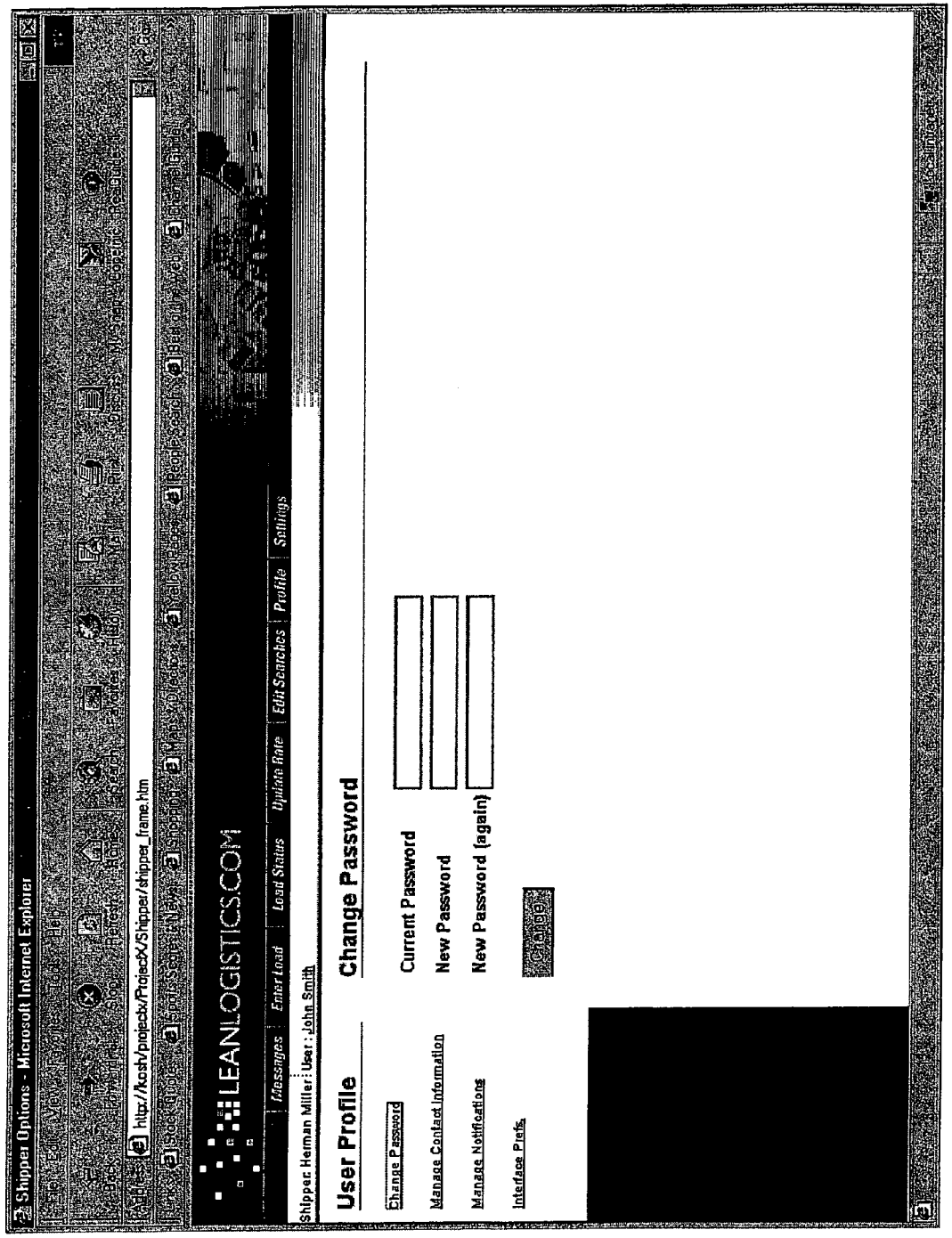
Fig. 2a (202)

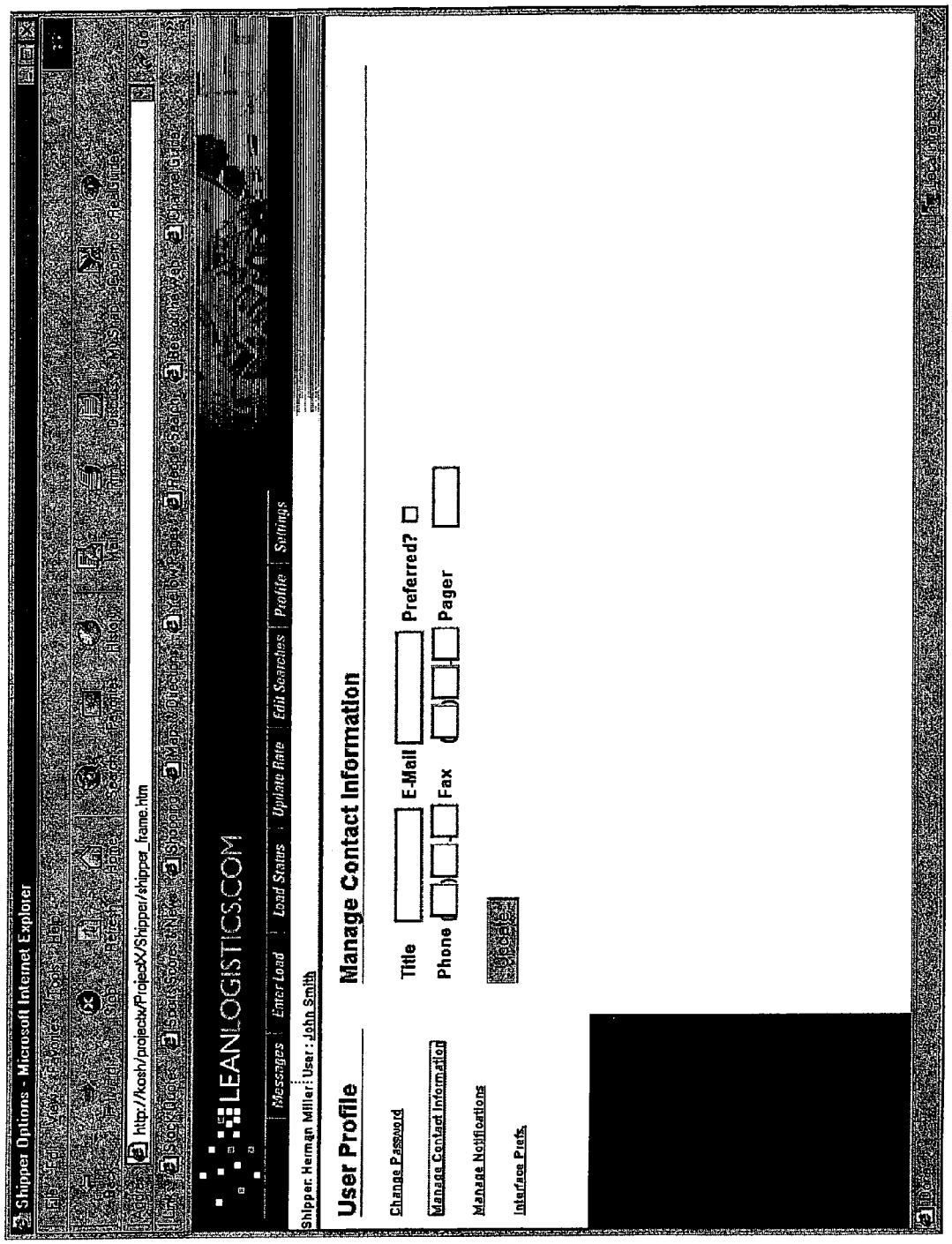
Fig. 2b (204)

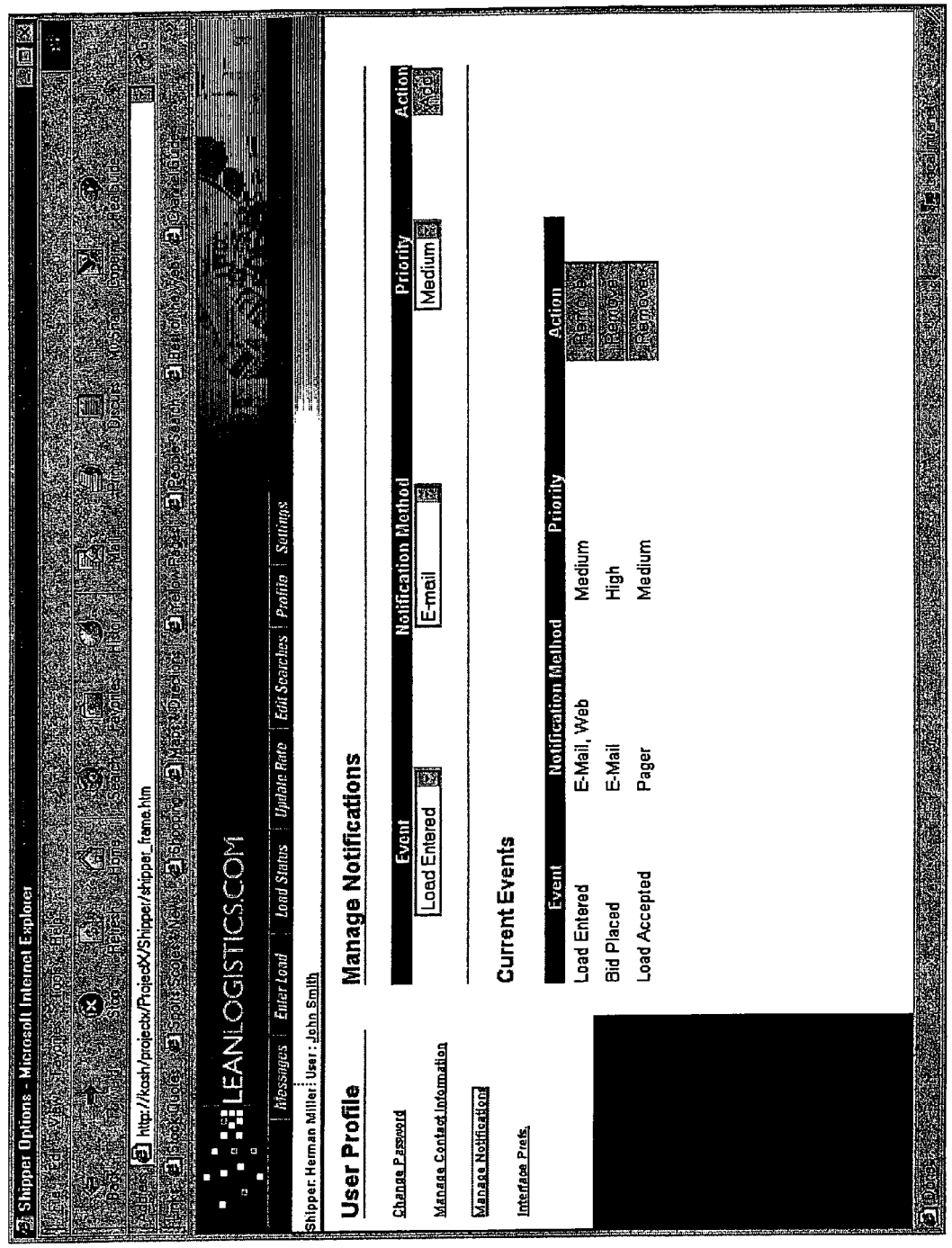
Fig. 2c (206)

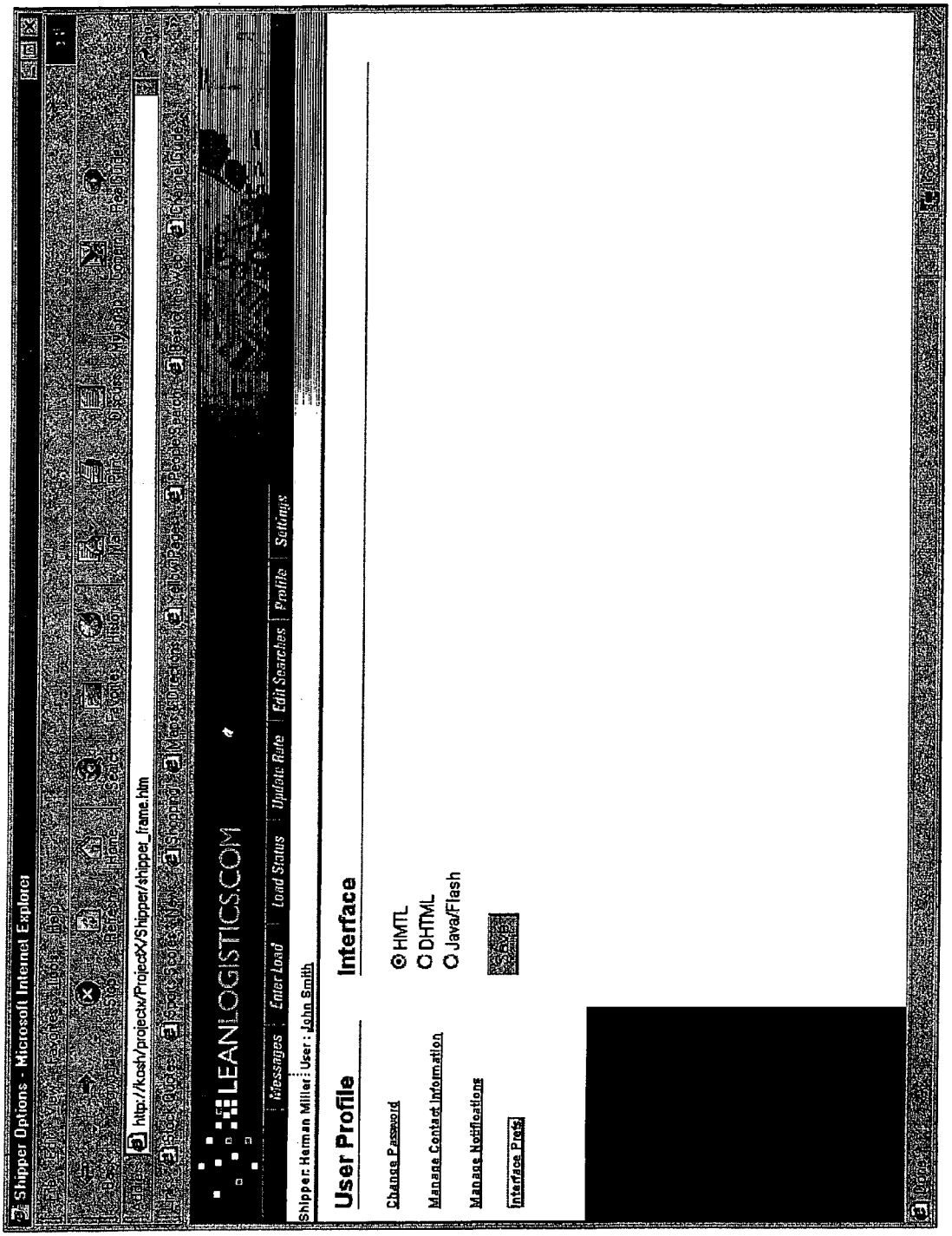
Fig. 2d (208)

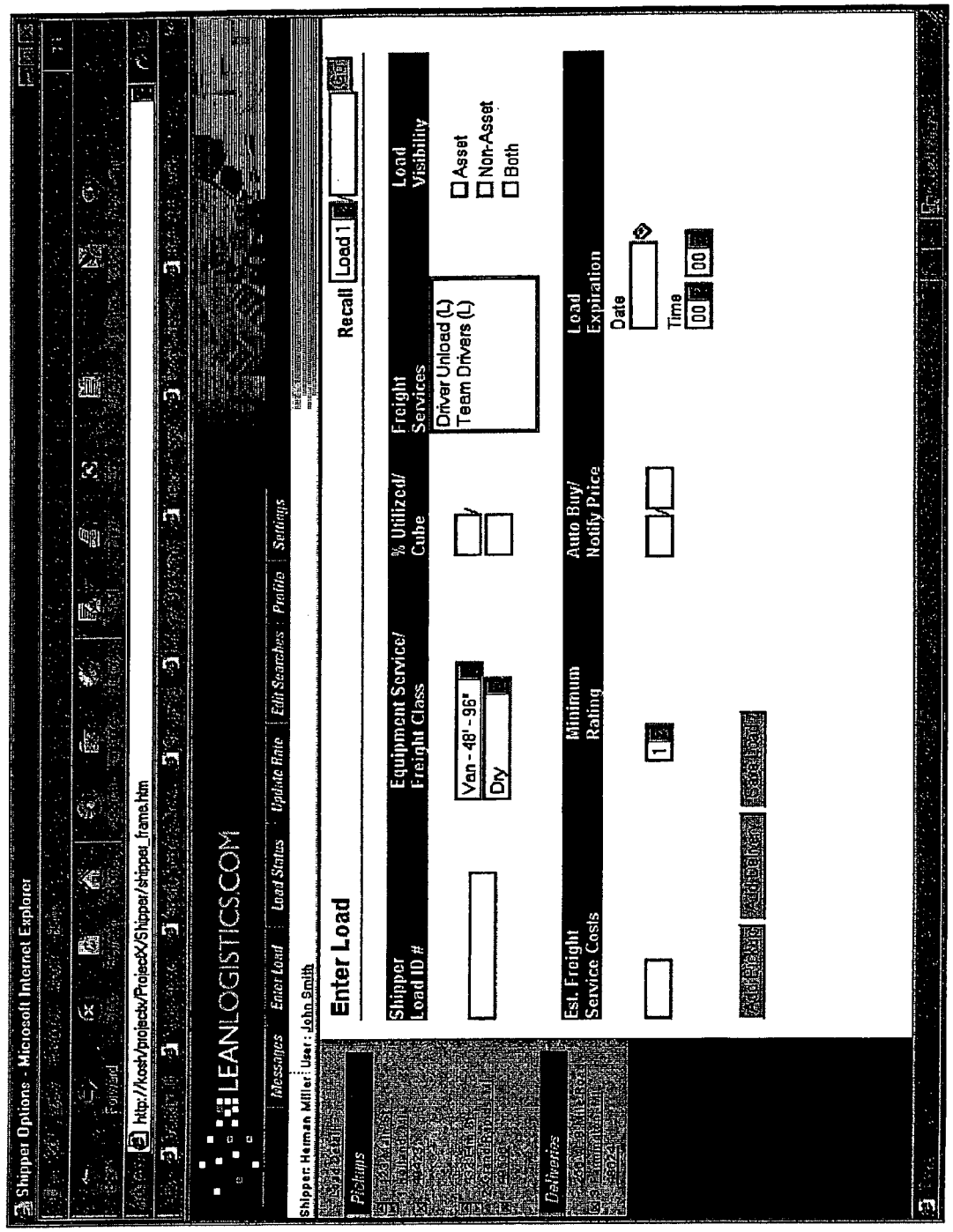
Fig. 3a (302)

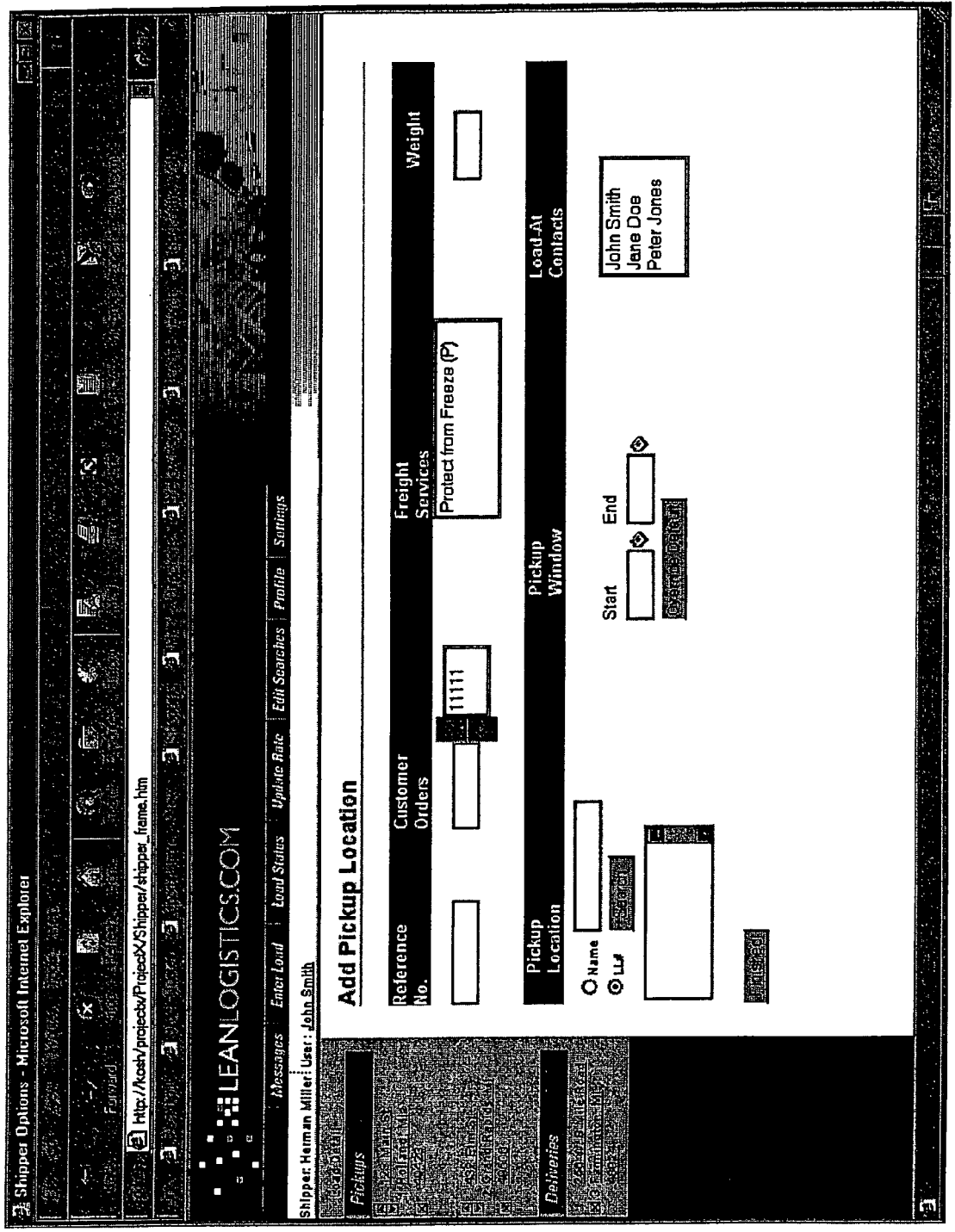
Fig. 3b (304)

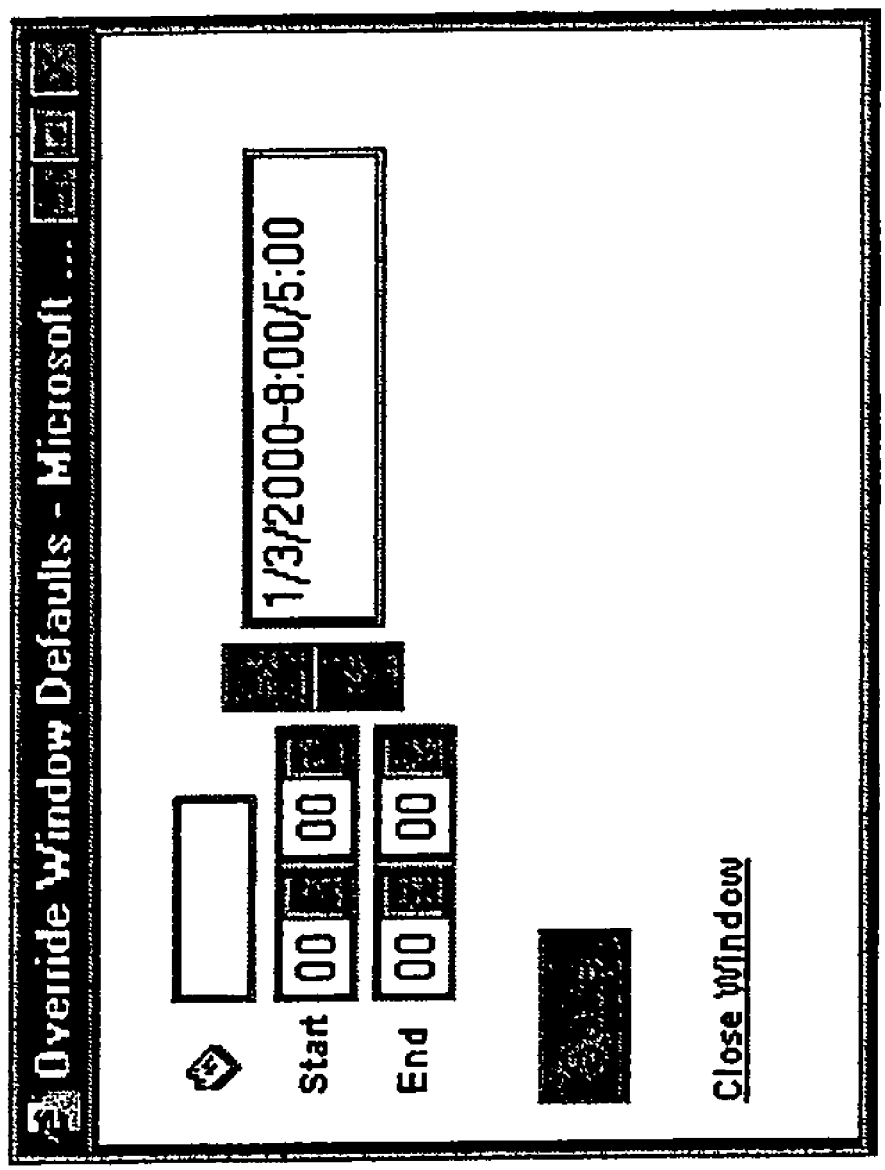
Fig. 3c (306)

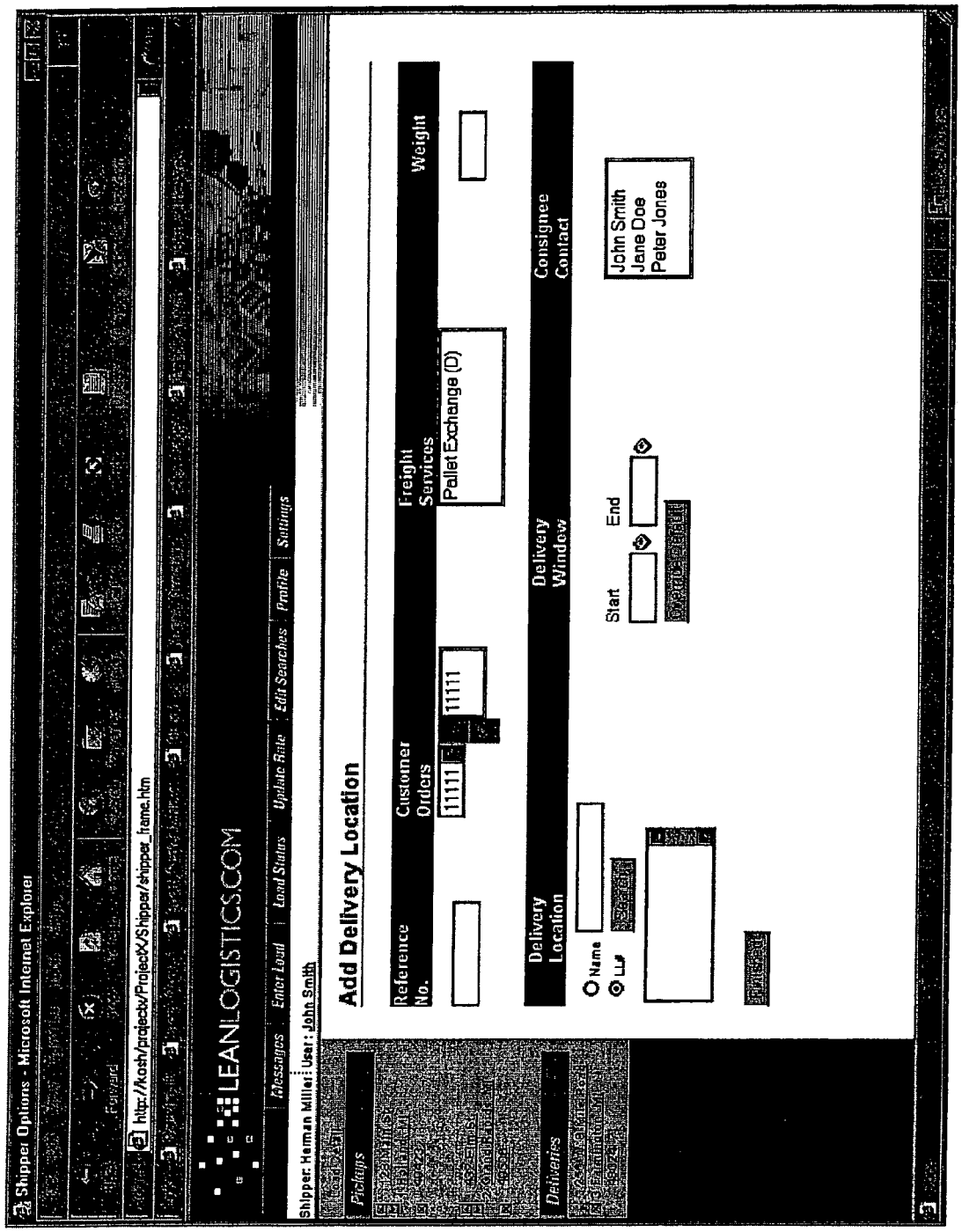
Fig.3d (308)

Search Consignees

| Name | City | State | Zip |
|---|---|---|---|
| | | | |

Search

| LL # | Company | Location | Shipper Ref. # |
|---|---|---|---|
| 12345 | Meijer | Grand Rapids | MM34 |
| 23456 | Meijer | Holland | MM45 |
| 34567 | Meijer | Muskegon | MM46 |

Load Validation

Load Details

| | | |
|---|---|---|
| Equipment Service | Van - 53' - 102" | |
| Freight Services | Pallet Exchange | Load Expiration | 7/2/99 17:00 EST |
| Total Miles | 165 | Auto-Buy Price | $300 |
| Total Weight | 43,000 | Auto-Notify Price | $400 |
| Freight Class | Dry | Minimum Rating | 3 |
| | | Visibility | Asset Based |

Pick-up

| | | | |
|---|---|---|---|
| Shipment Ref. | None | | |
| Location | 123 Main St. Holland, MI 49423 | Pick-up Window | 7/3/99-7/5/99 08:00 - 17:00 EST |
| Customer Orders | 11111,22222 | Weight | 22,000 |
| Freight Services | None | Mileage | 35 |
| | | | |
| Location | 432 Elm St. Grand Rapids, MI 49506 | Pick-up Window | 7/3/99-7/5/99 08:00 - 18:00 EST |
| Customer Orders | 33333,44444 | Weight | 21,000 |
| Freight Services | None | Mileage | 130 |

Delivery

| | | | |
|---|---|---|---|
| Shipment Ref. | None | | |
| Location | 255 W. 8 Mile Road Farmington, MI 48024 | Delivery Window | 7/6/99-7/7/99 08:00 - 17:00 EST |
| Customer Orders | 11111,22222,33333,44444 | Freight Services | Driver Unload |

Remember? ☐
Load Name: [          ]

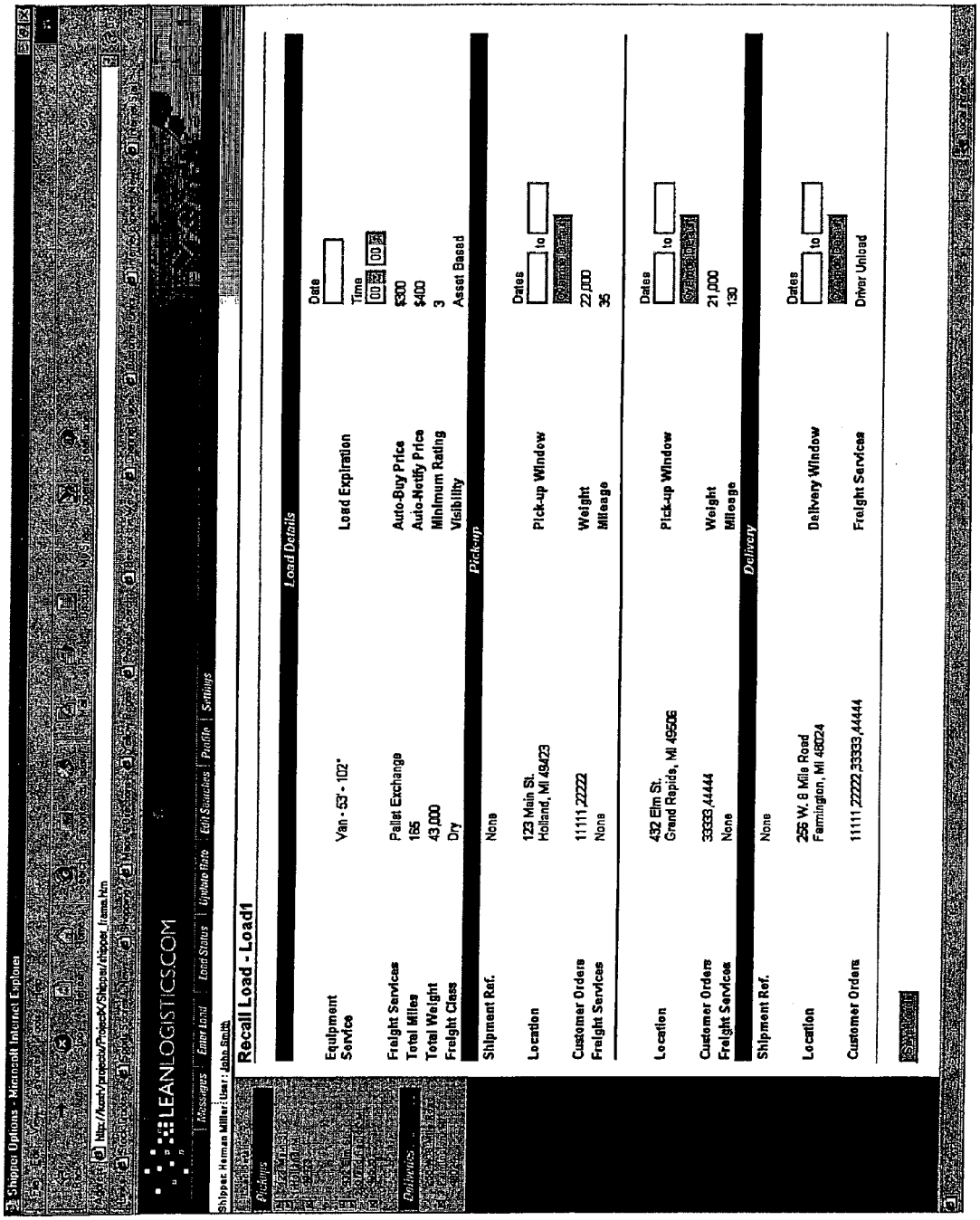
Fig. 3g (314)

Fig. 3h (316)

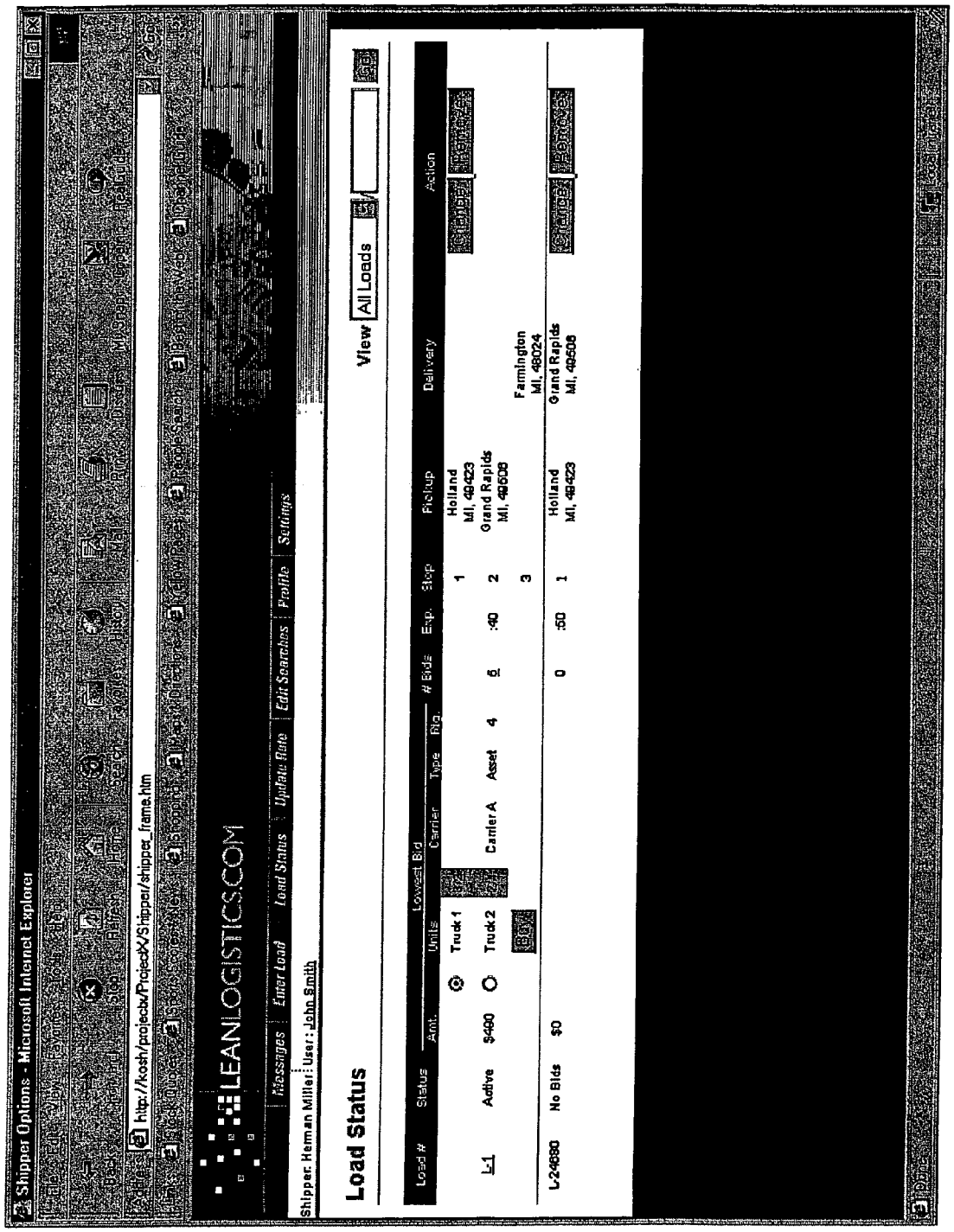
Fig. 4a (402)

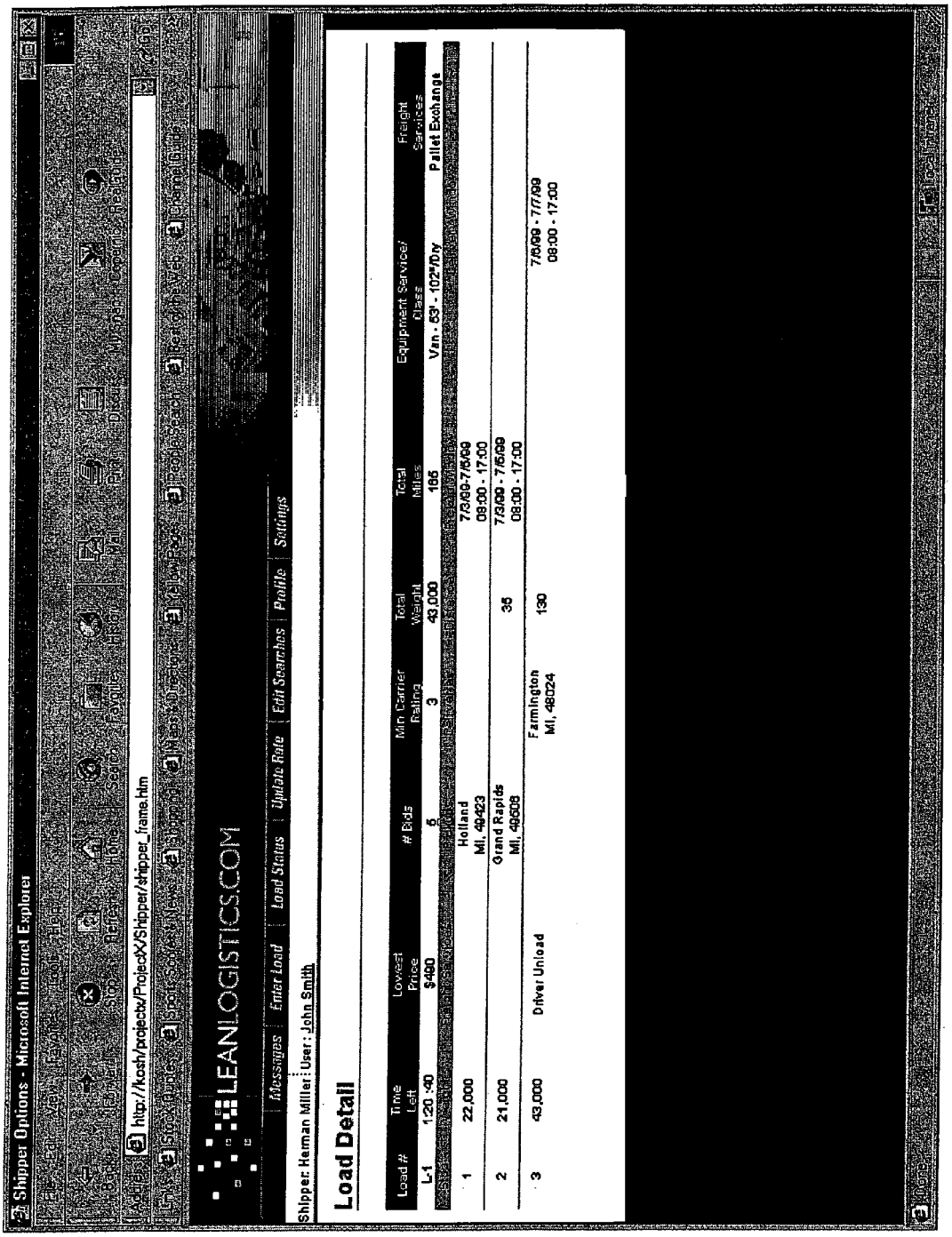
Fig. 4b (404)

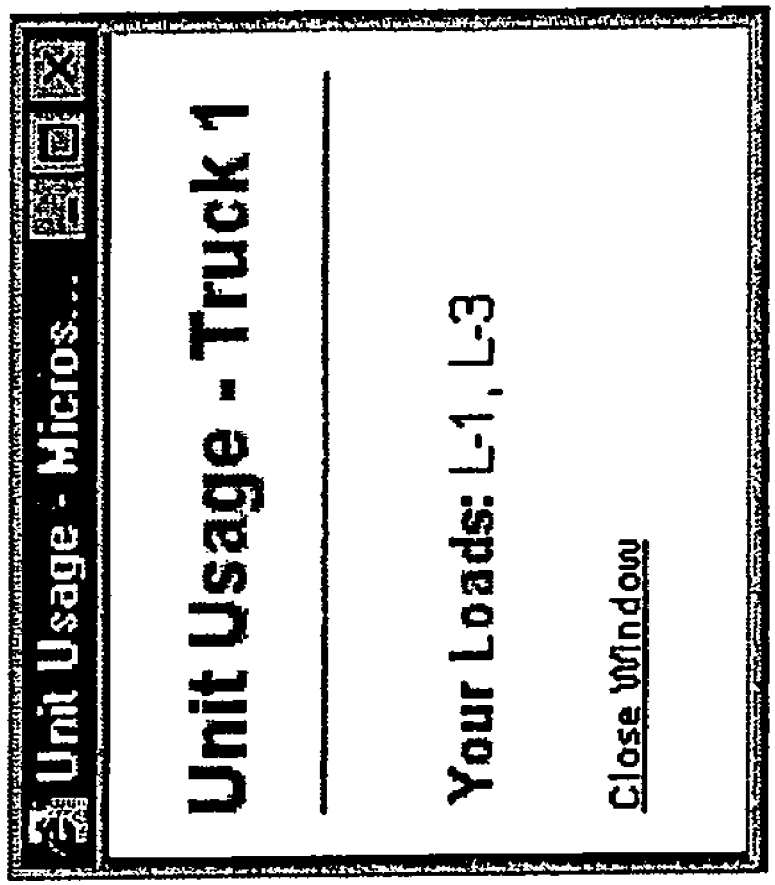
Fig. 4c (406)

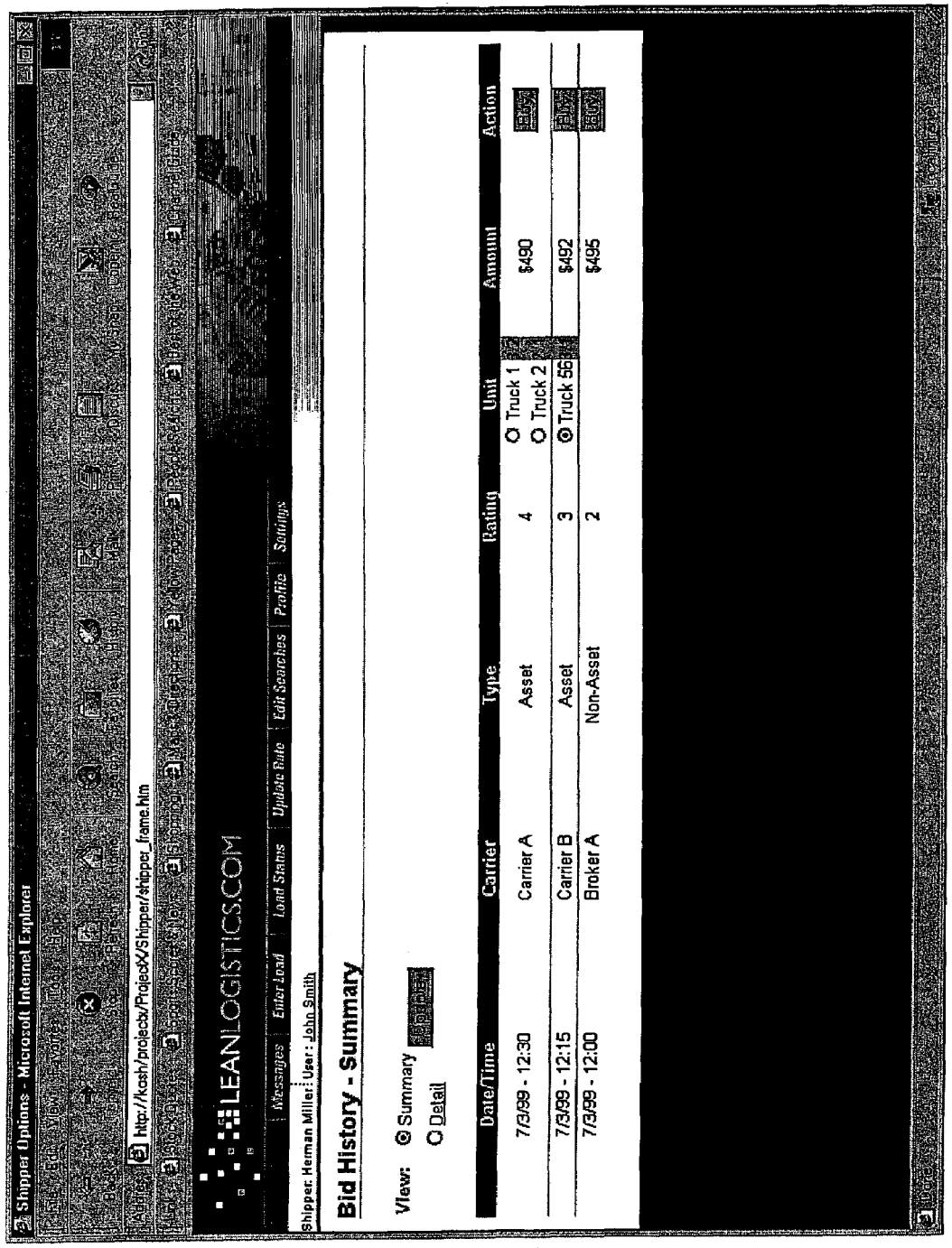
Fig. 4d (408)

Bid History - Detail

View: ○ Summary
    ● Detail

| Date/Time | Carrier | Type | Rating | Unit | Amount | Action |
|---|---|---|---|---|---|---|
| 7/3/99 - 12:30 | Carrier A | Asset | 3 | ○ Truck 1 | $490 | Buy |
| 7/3/99 - 12:15 | Carrier B | Asset | 4 | ○ Truck 2 | $492 | Buy |
| 7/3/99 - 12:00 | Broker A | Non-Asset | 2 | ● Truck 56 | $495 | Buy |
| 7/3/99 - 11:00 | Carrier B | Asset | 4 | | $500 | Old |
| 7/3/99 - 10:50 | Carrier C | Asset | 4 | Truck 56 | $525 | Removed |
| 7/3/99 - 10:45 | | | | | Open | |

Fig. 4e (410)

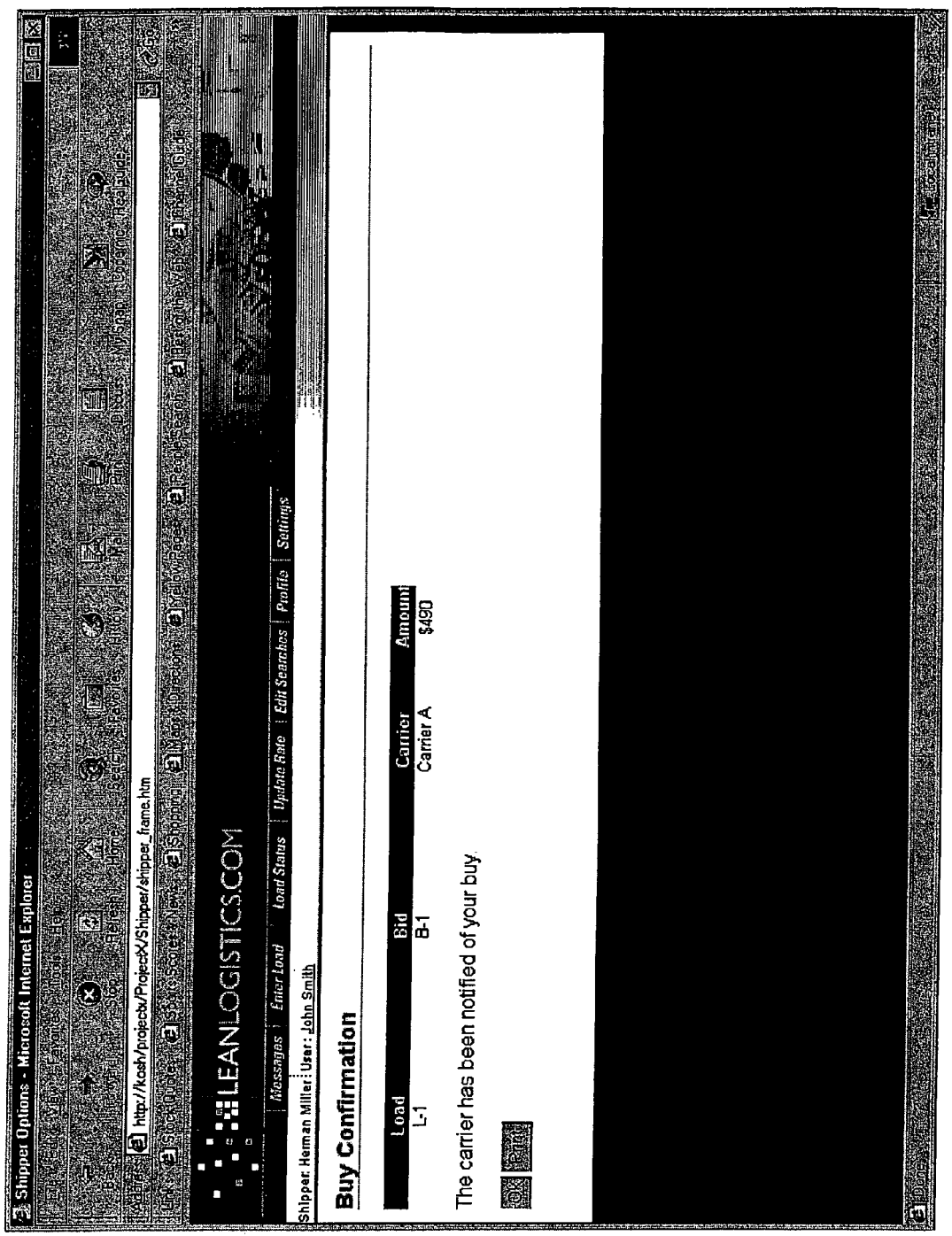
Fig. 4f (412)

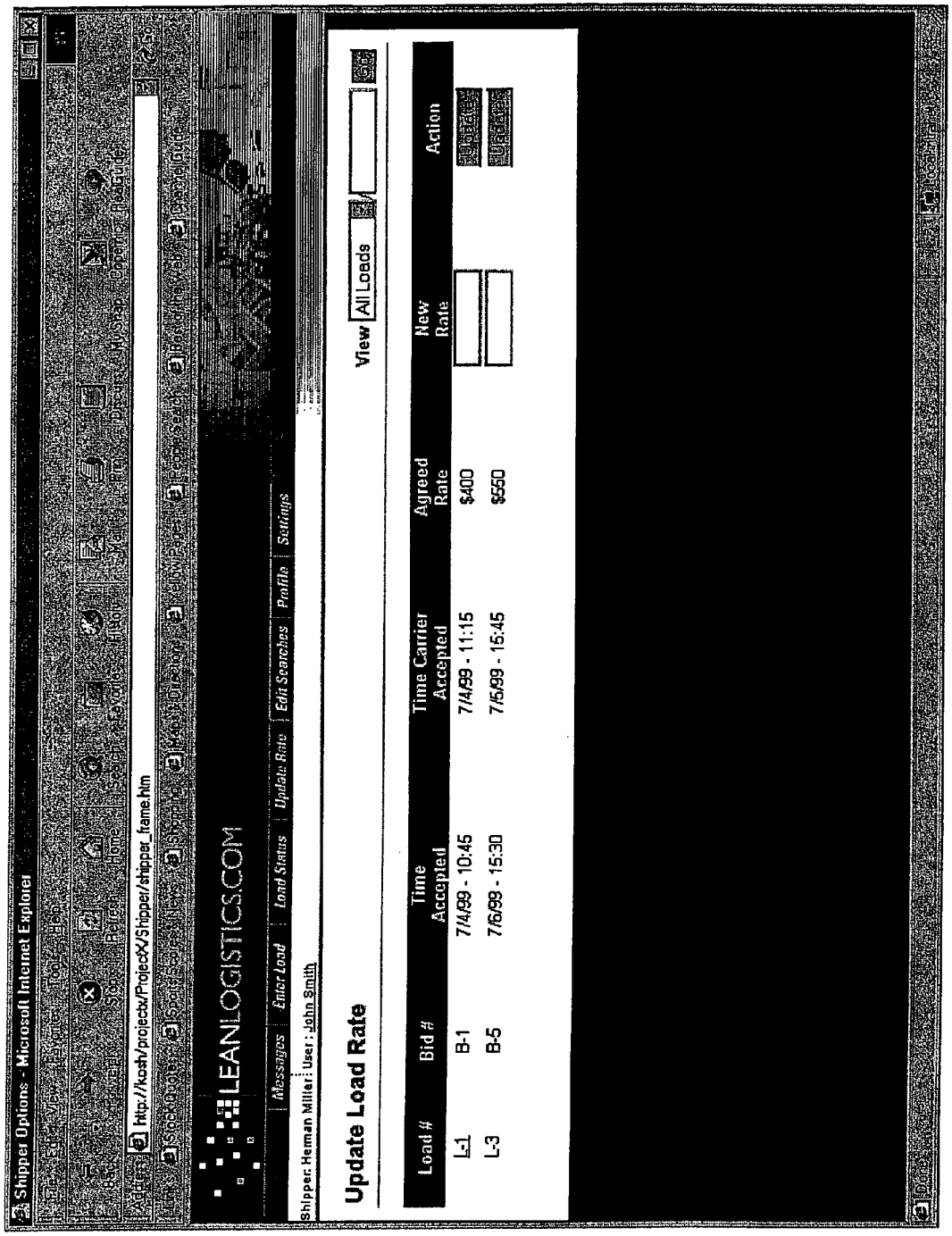
Fig. 5 (502)

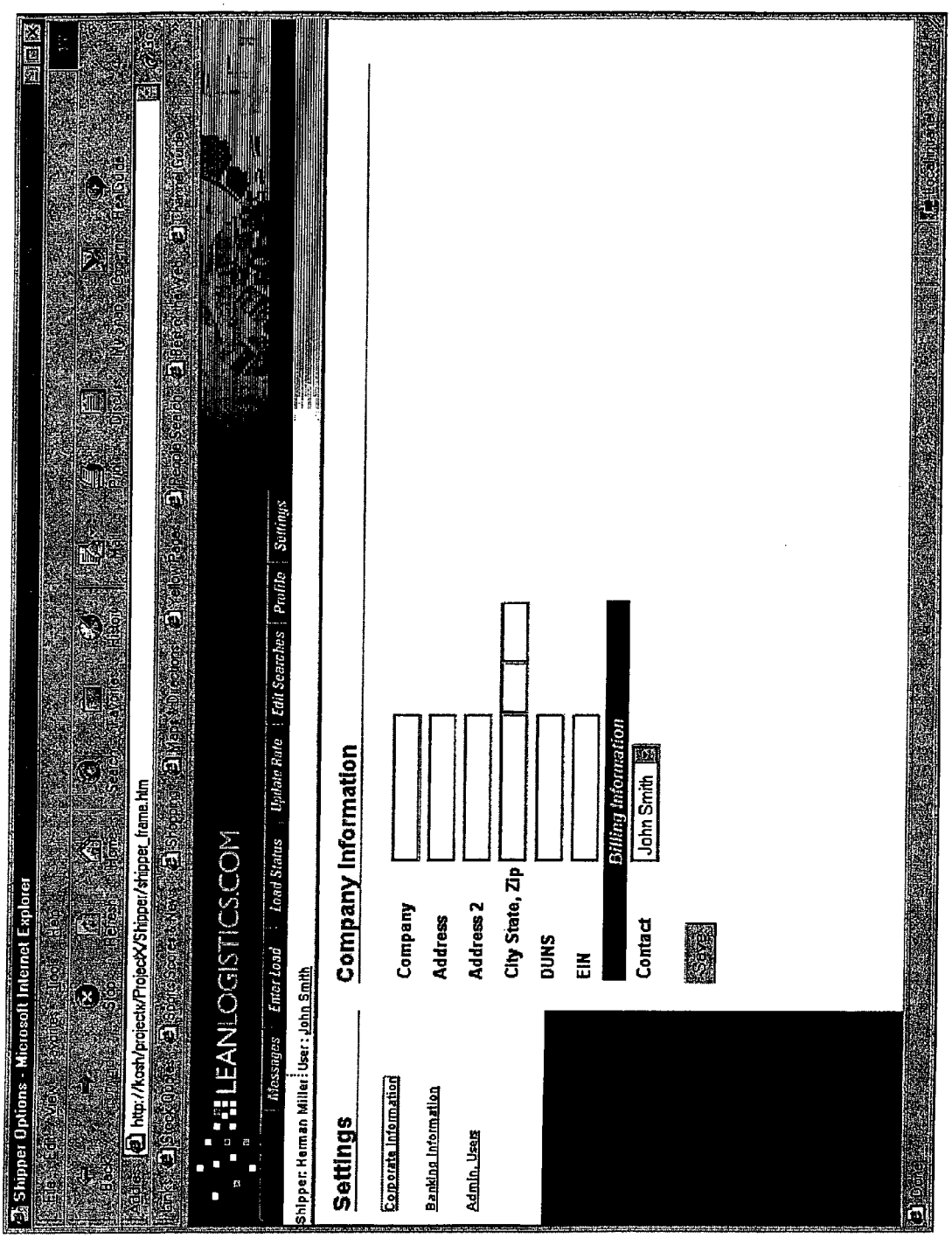
Fig. 6a (602)

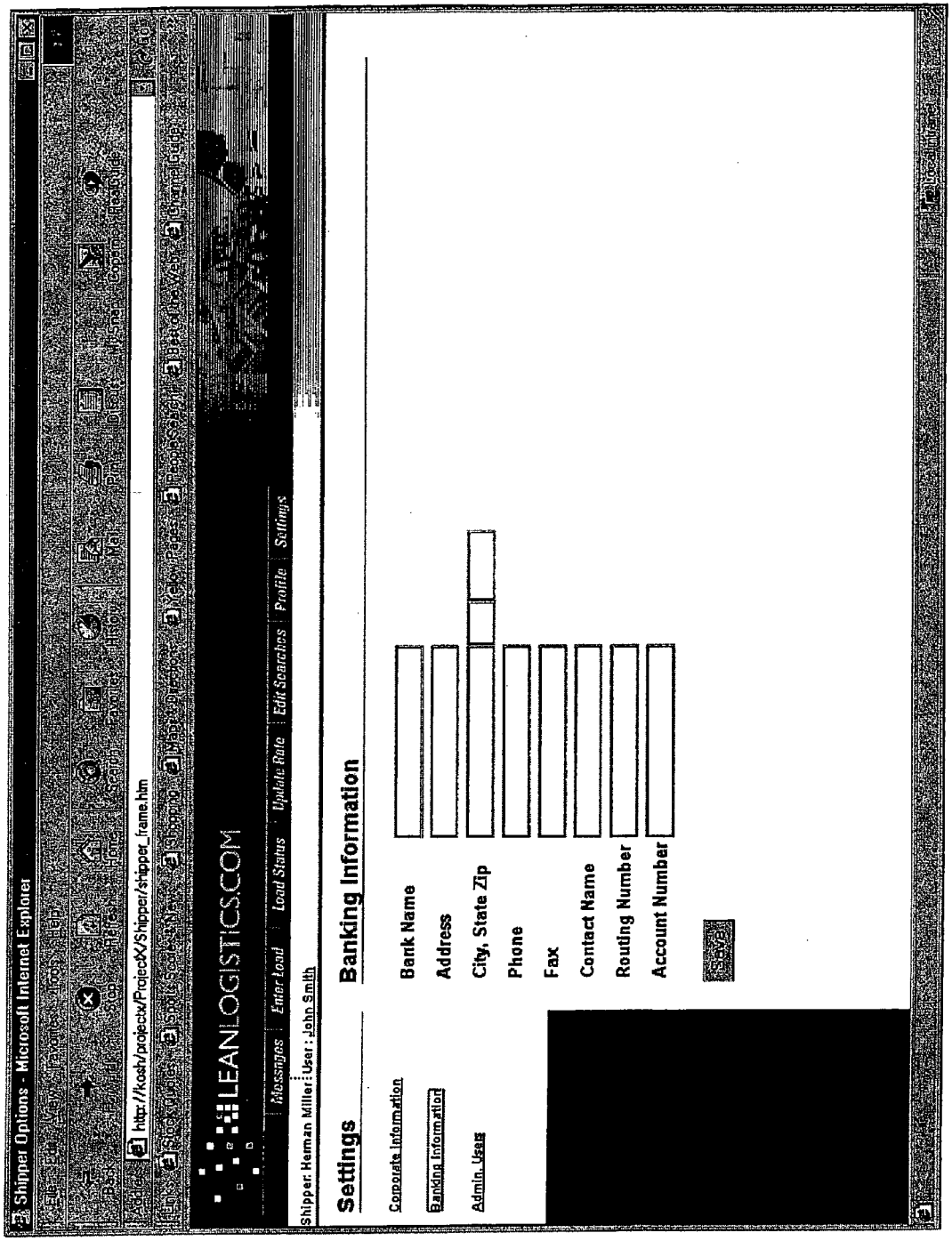
Fig. 6b (604)

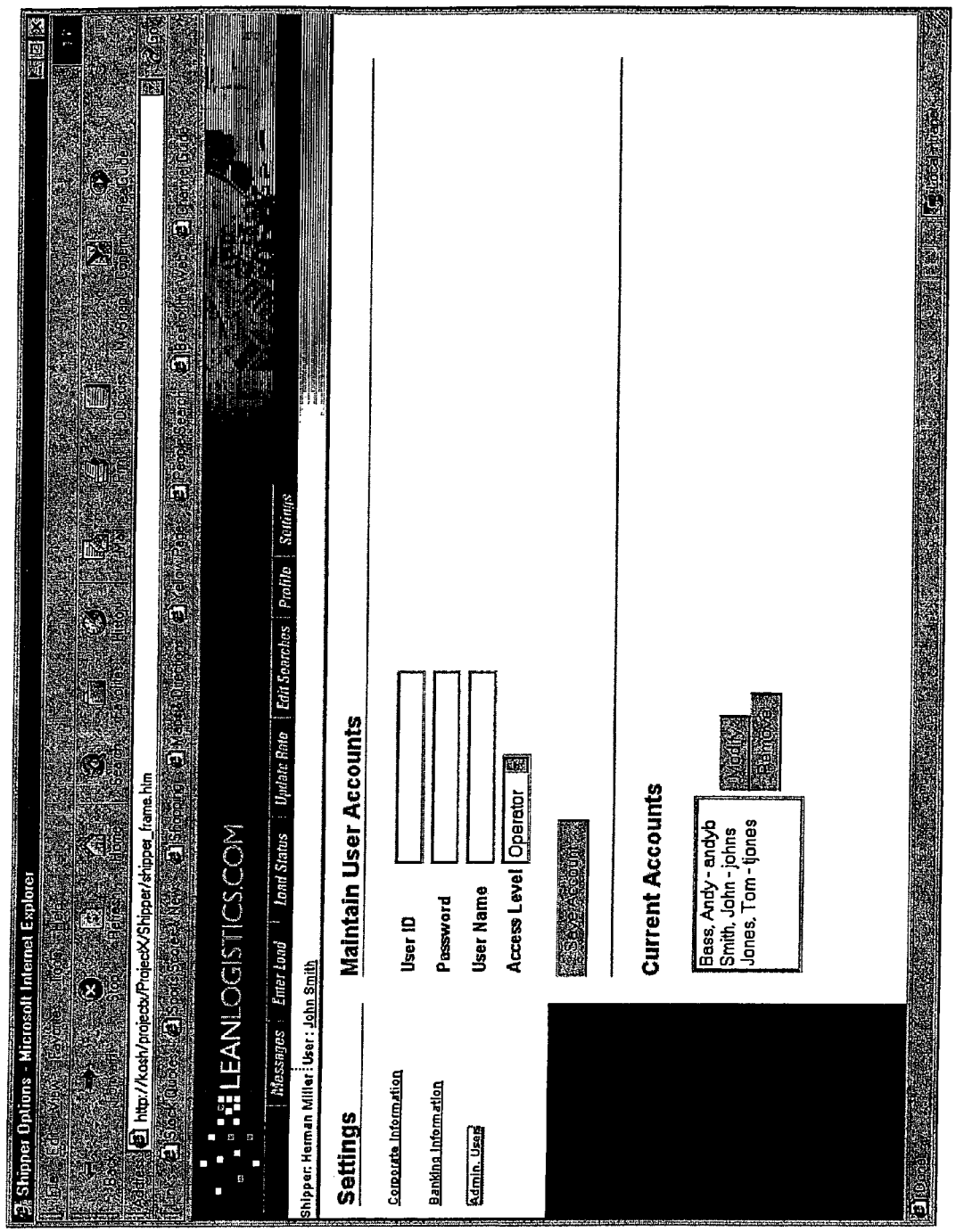
Fig. 6c (606)

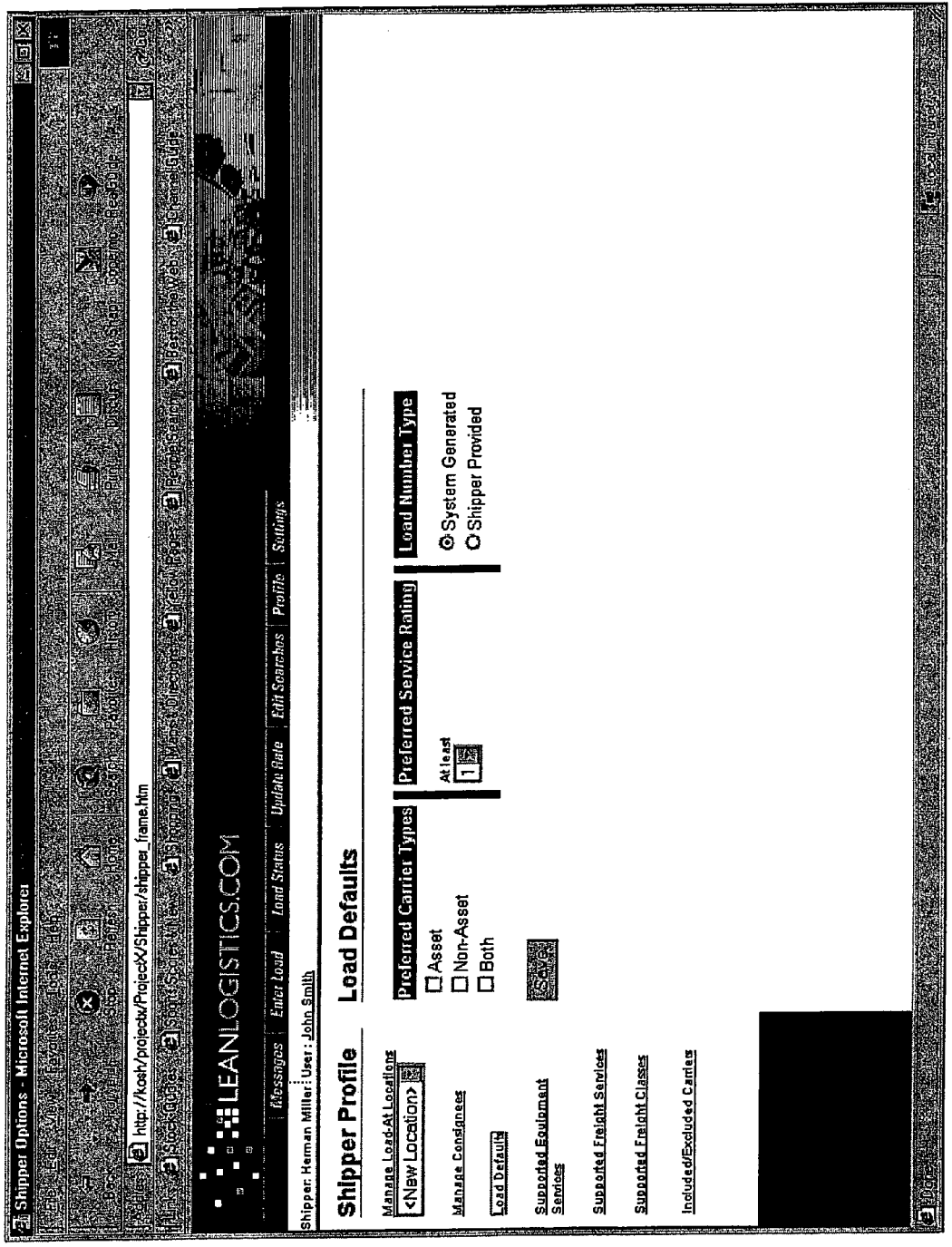
Fig. 7d (708)

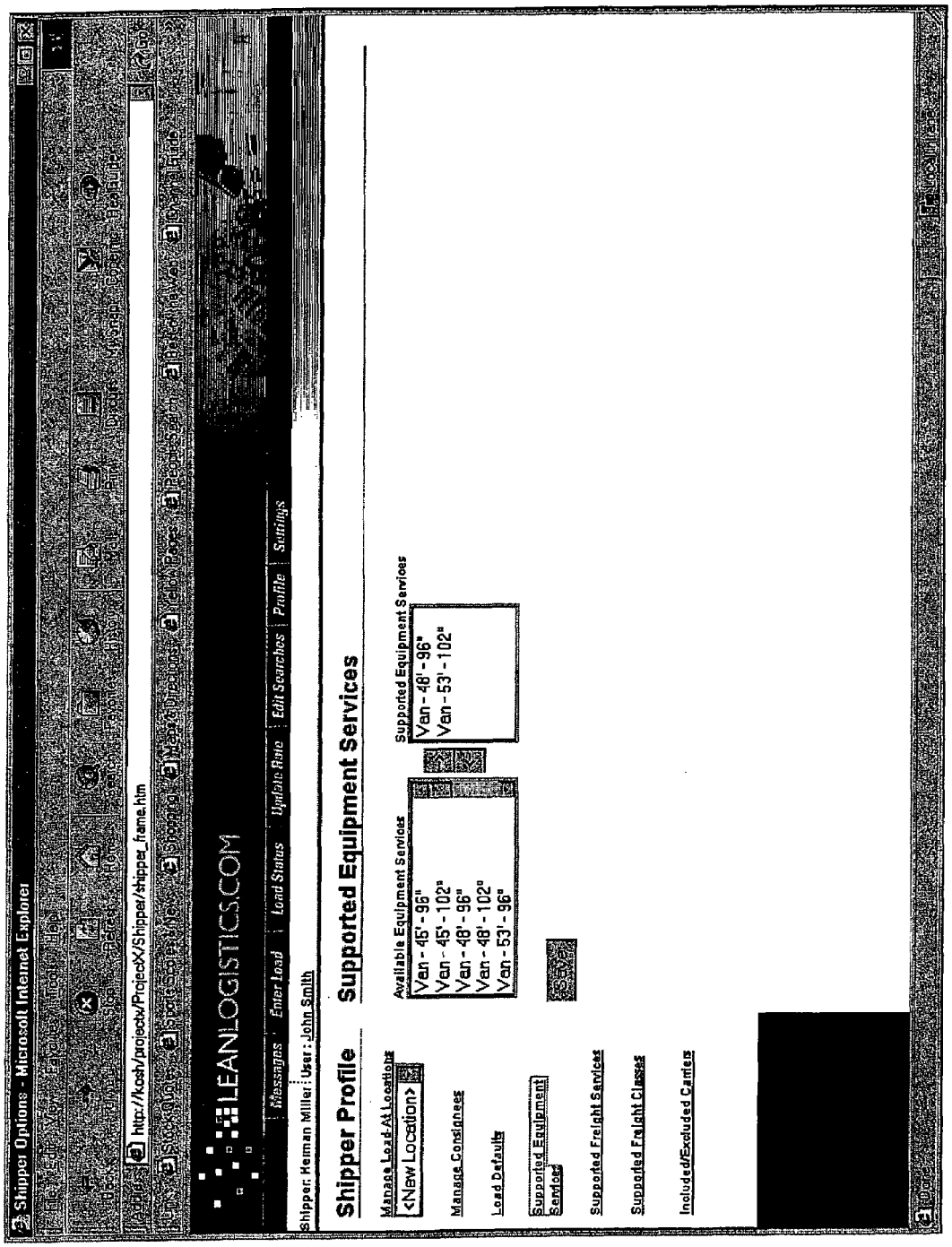
Fig. 7e (710)

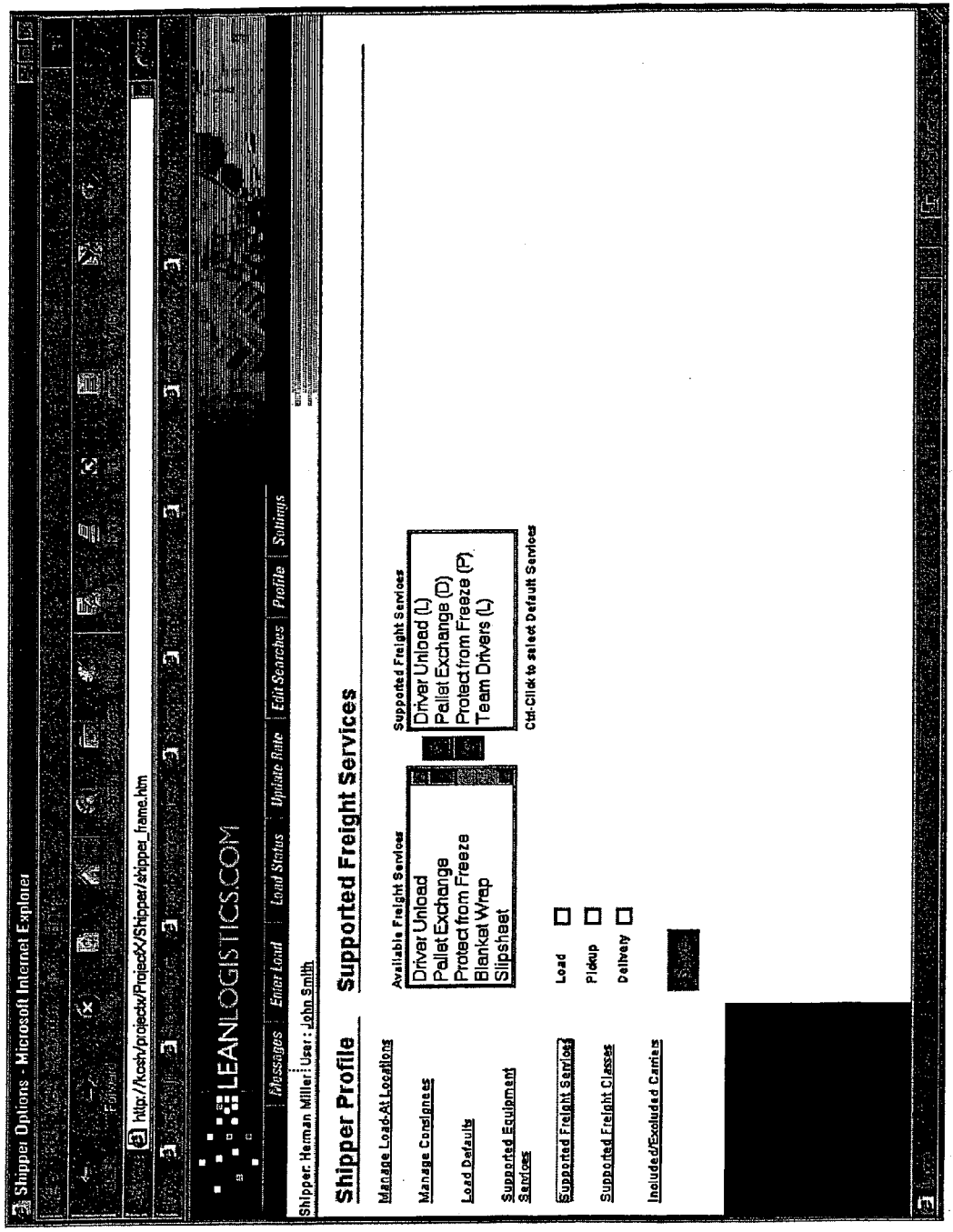
Fig. 7f (712)

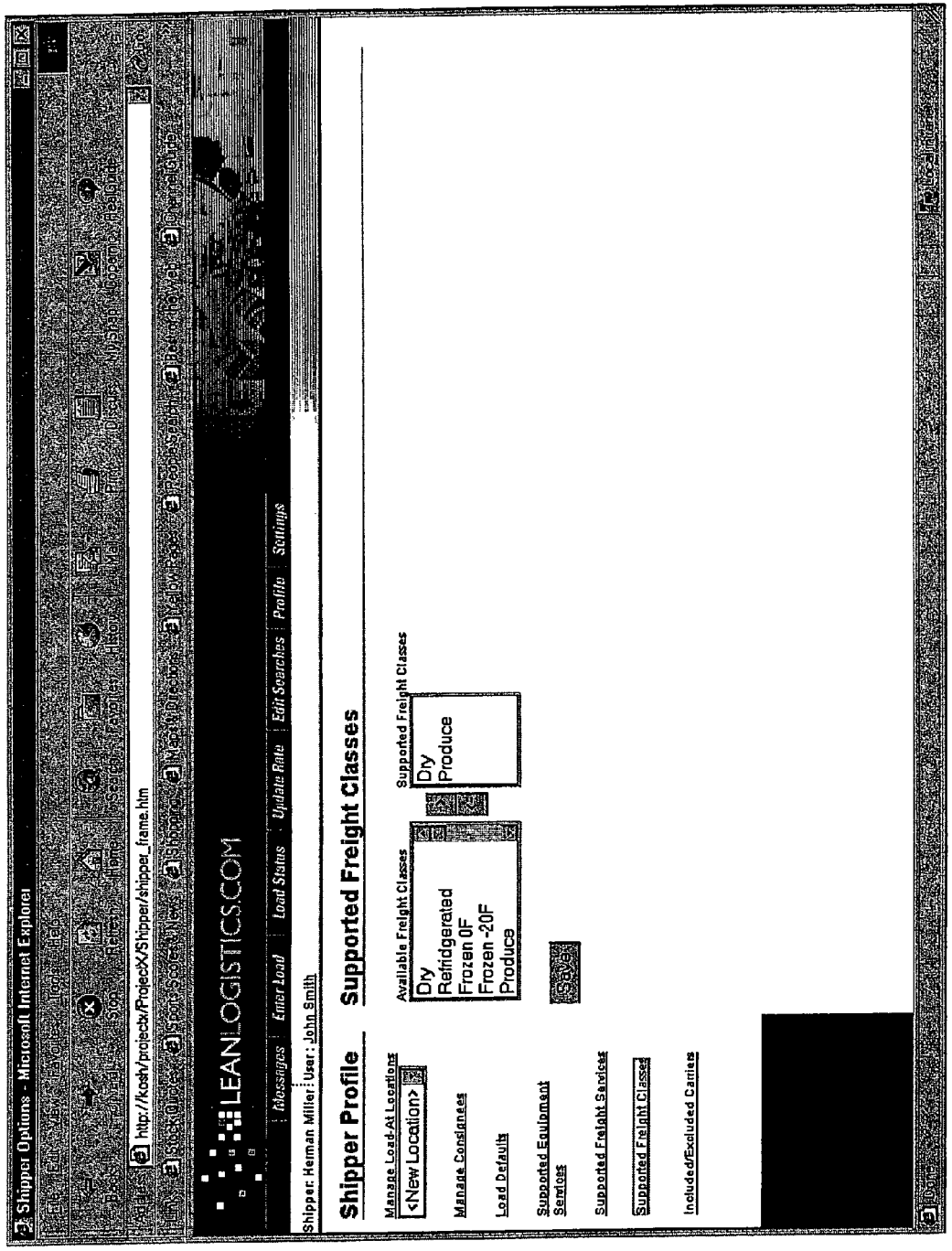
Fig. 7g (714)

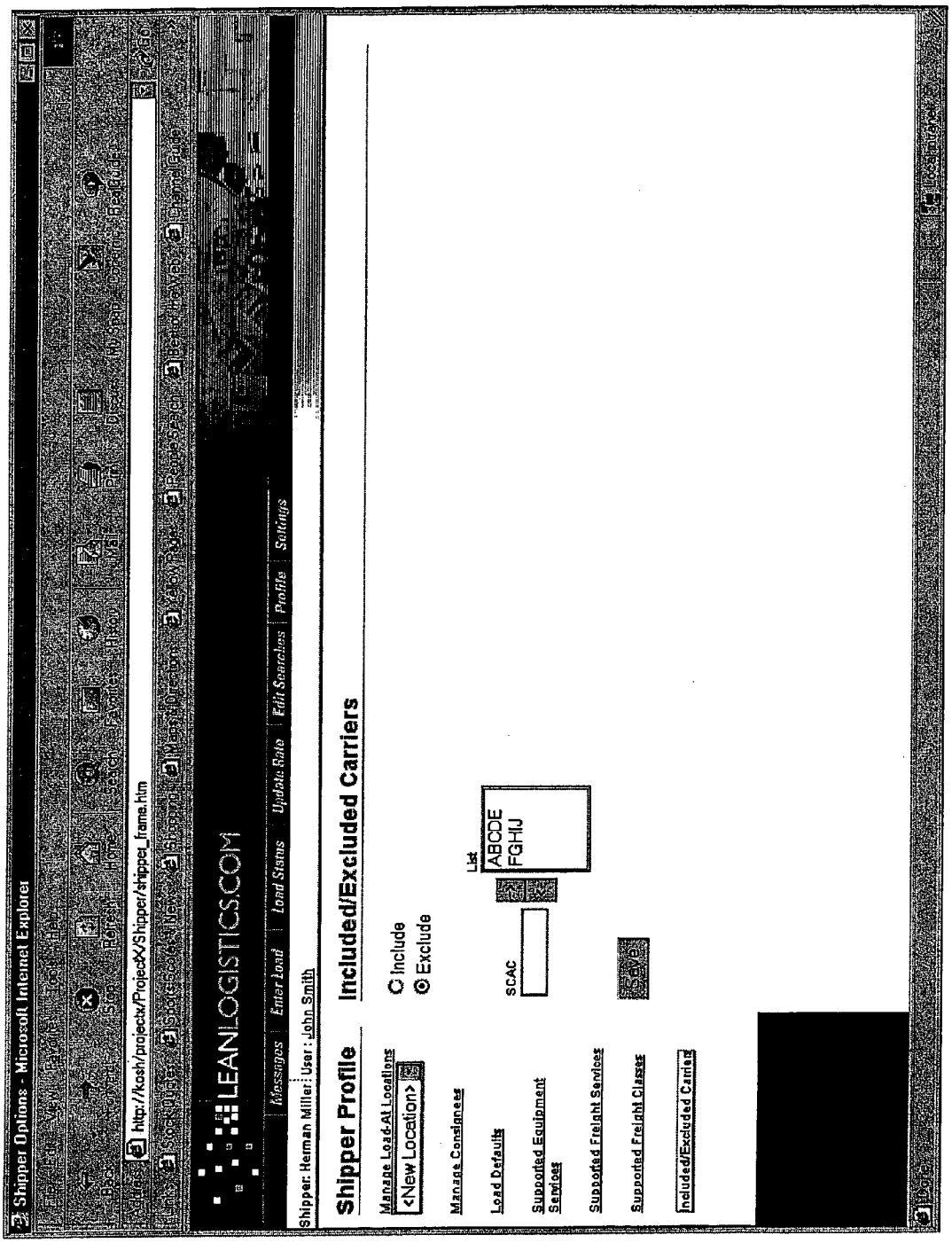
Fig. 7h (716)

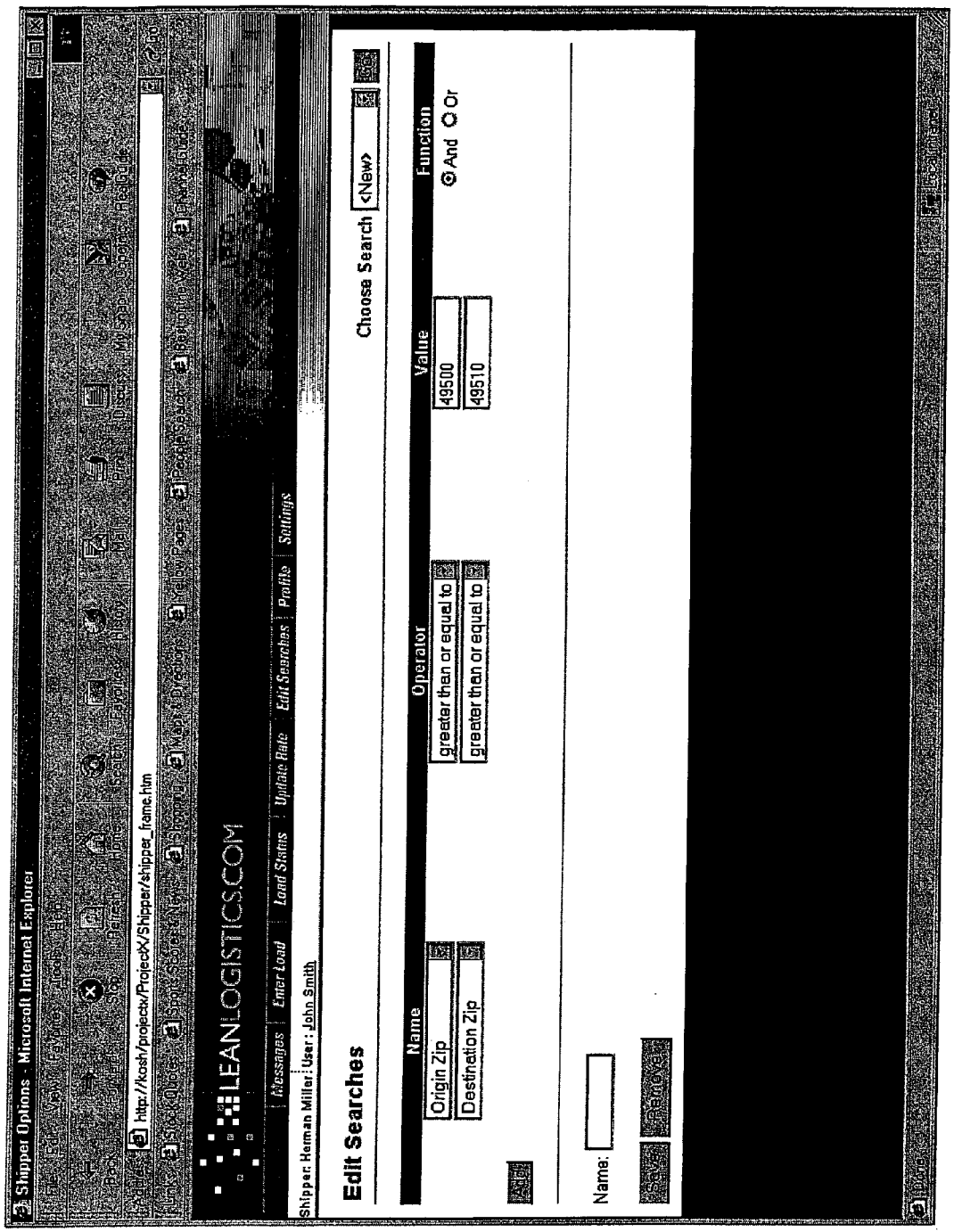
Fig. 8 (802)

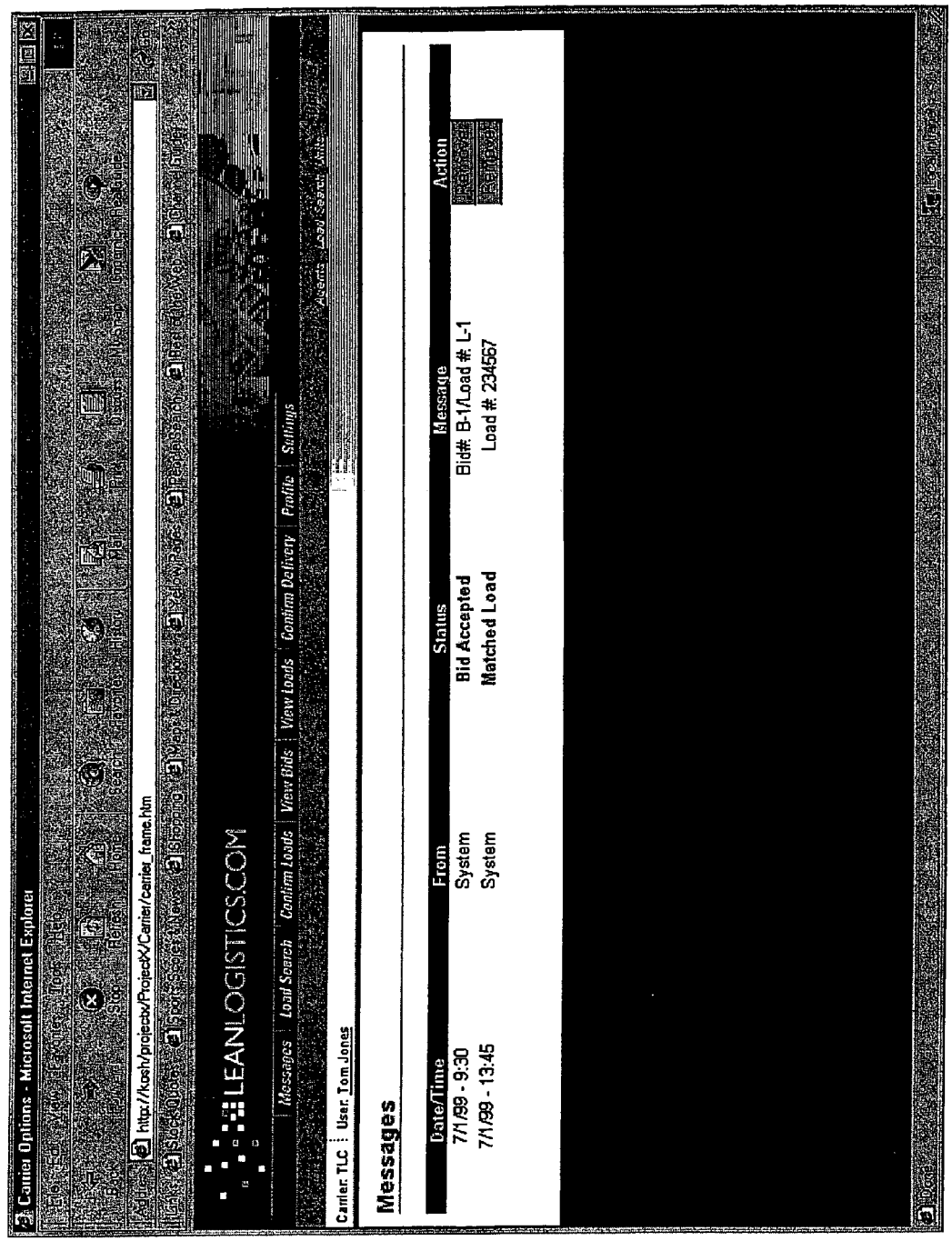
Fig. 9 (902)

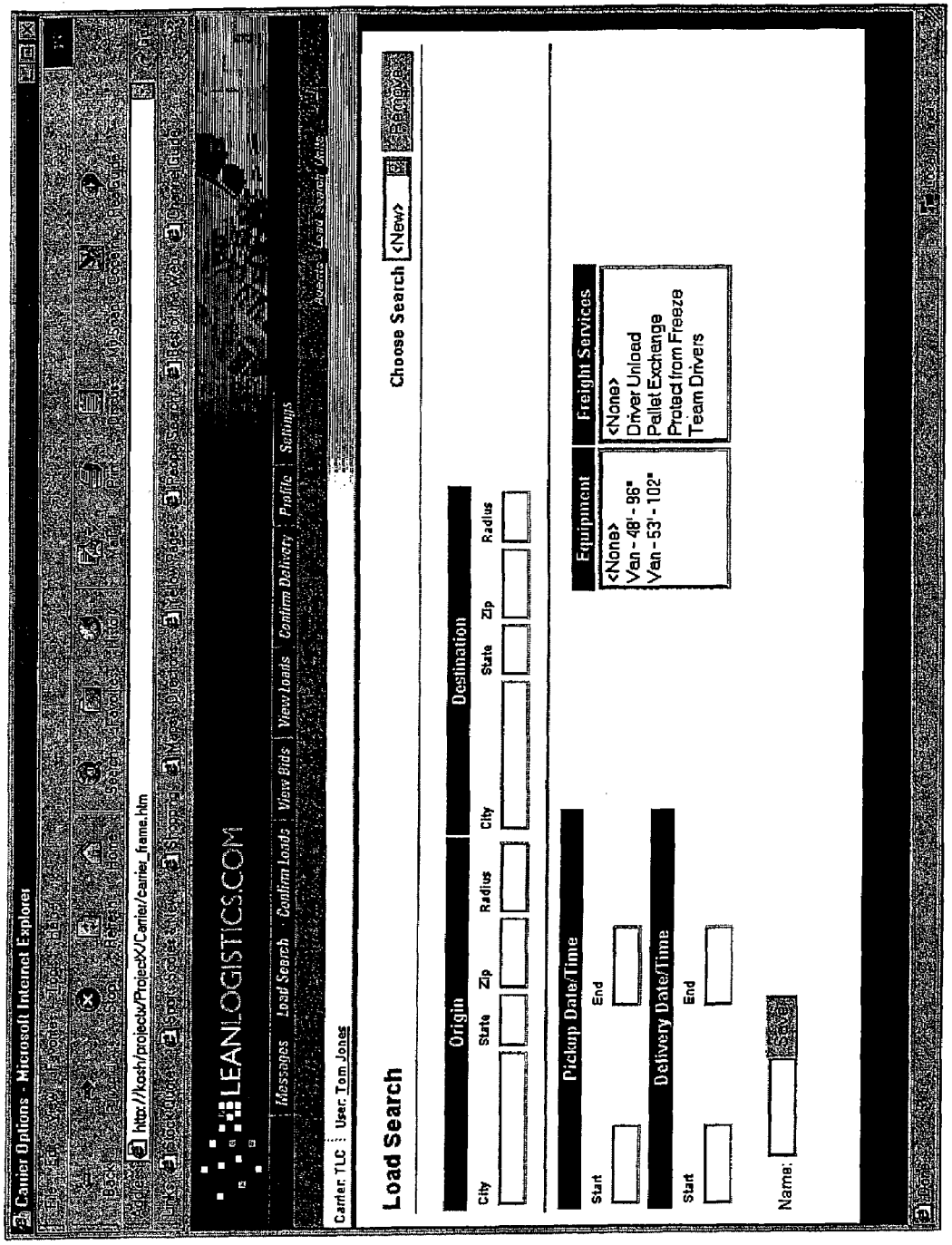
Fig. 10 (1002)

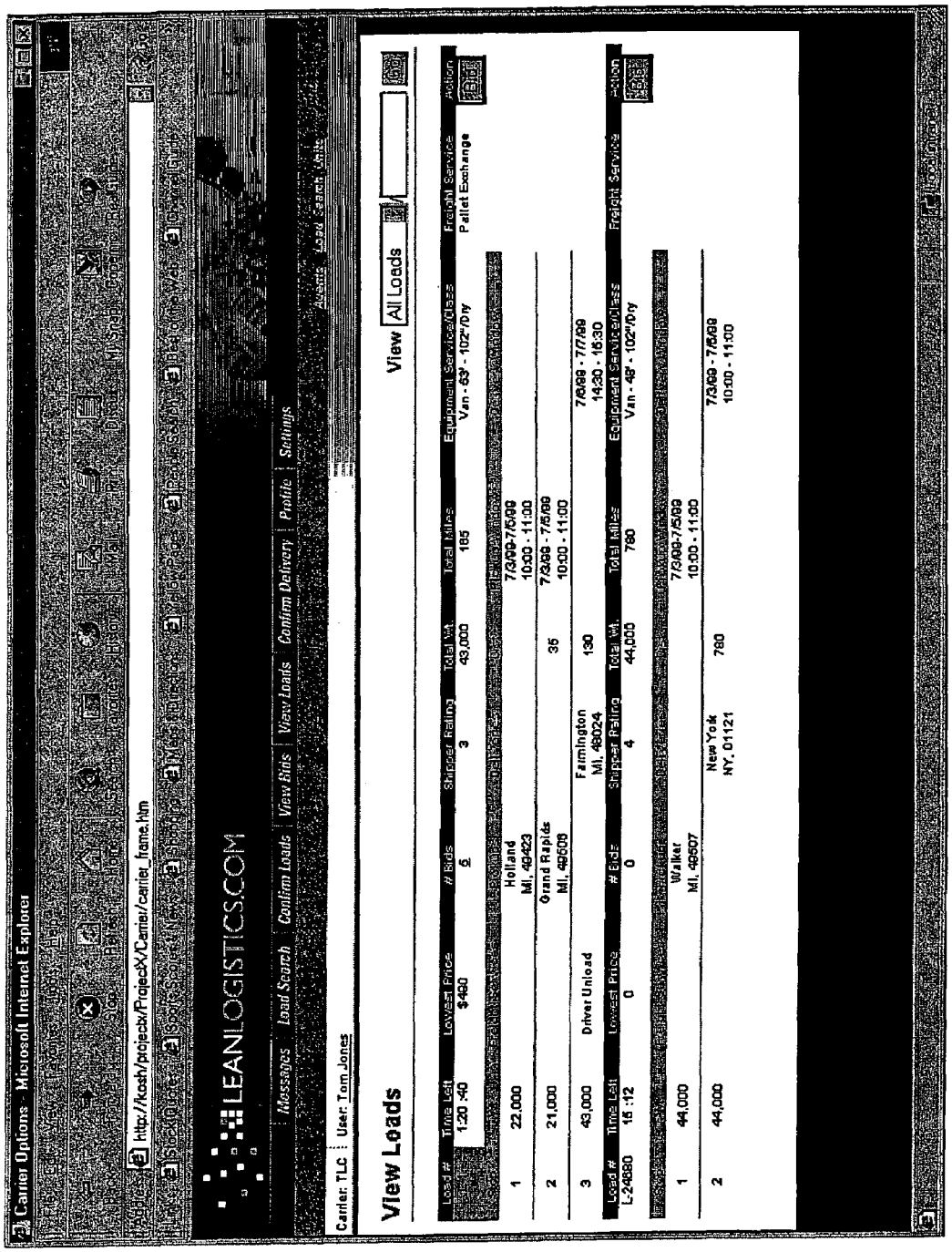
Fig. 11a (1102)

Fig. 11b (1104)

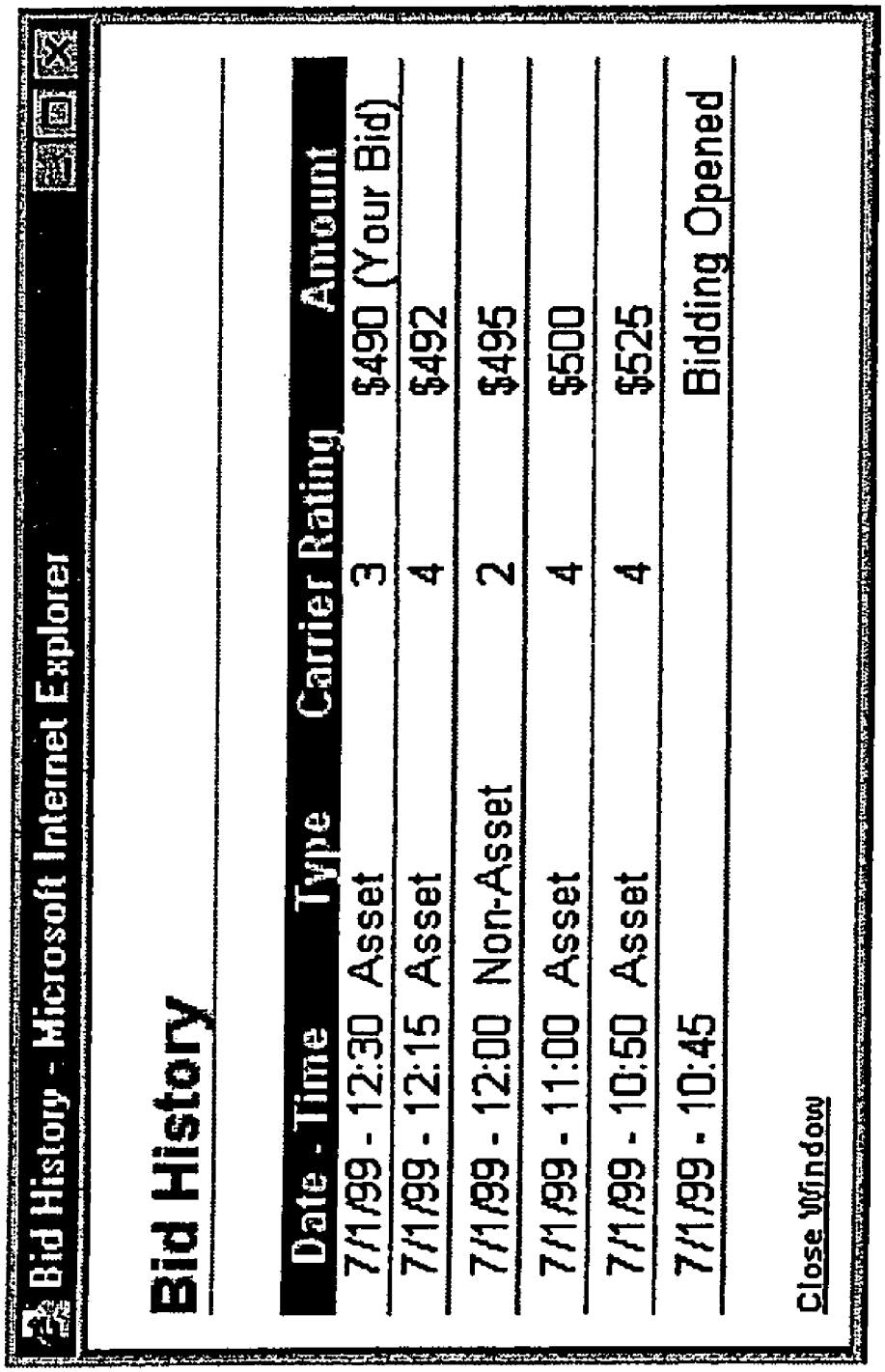
Fig. 11c (1106)

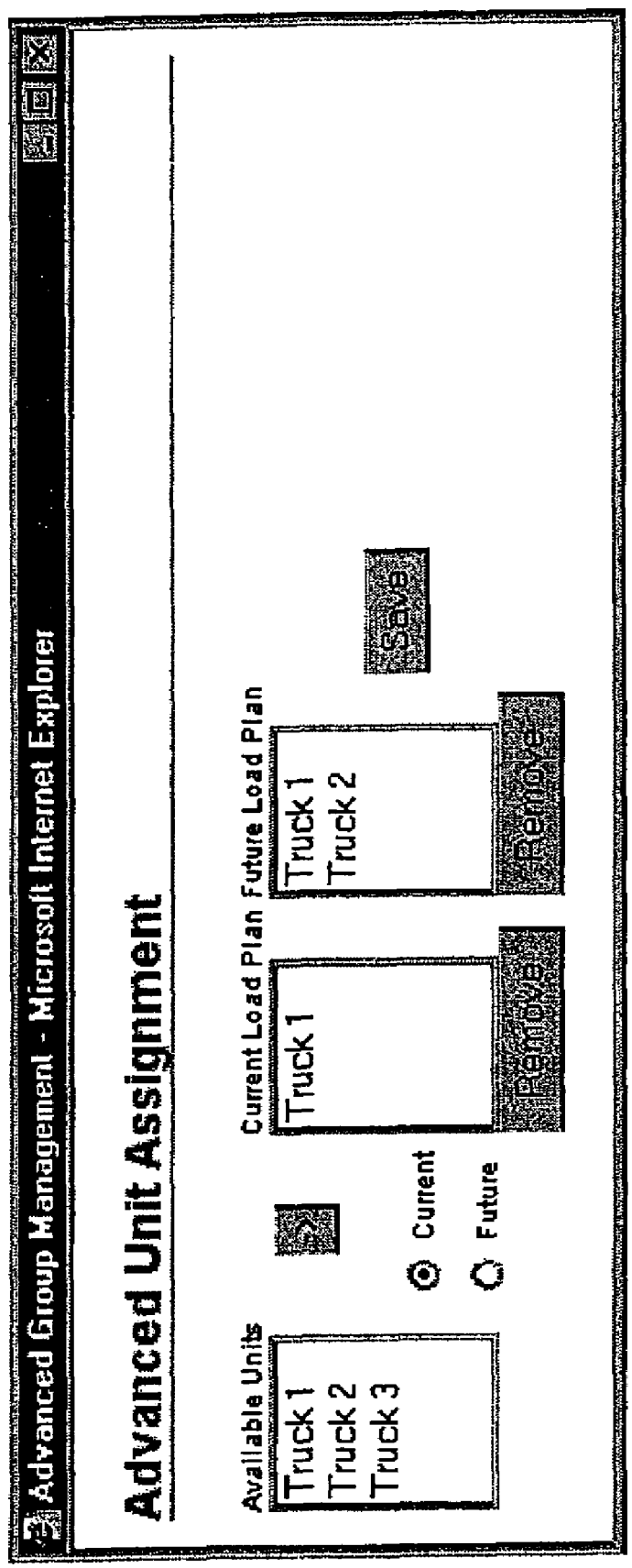
Fig. 11d (1108)

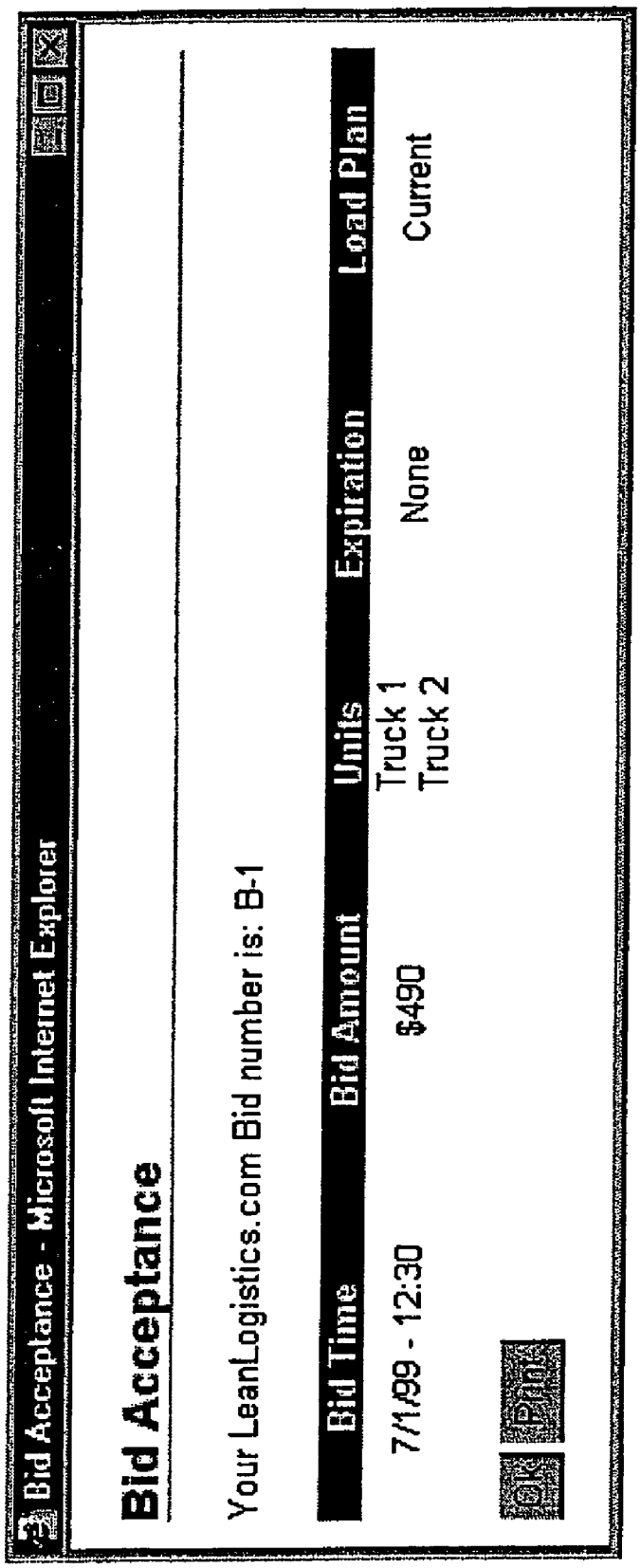
Fig. 11e (1110)

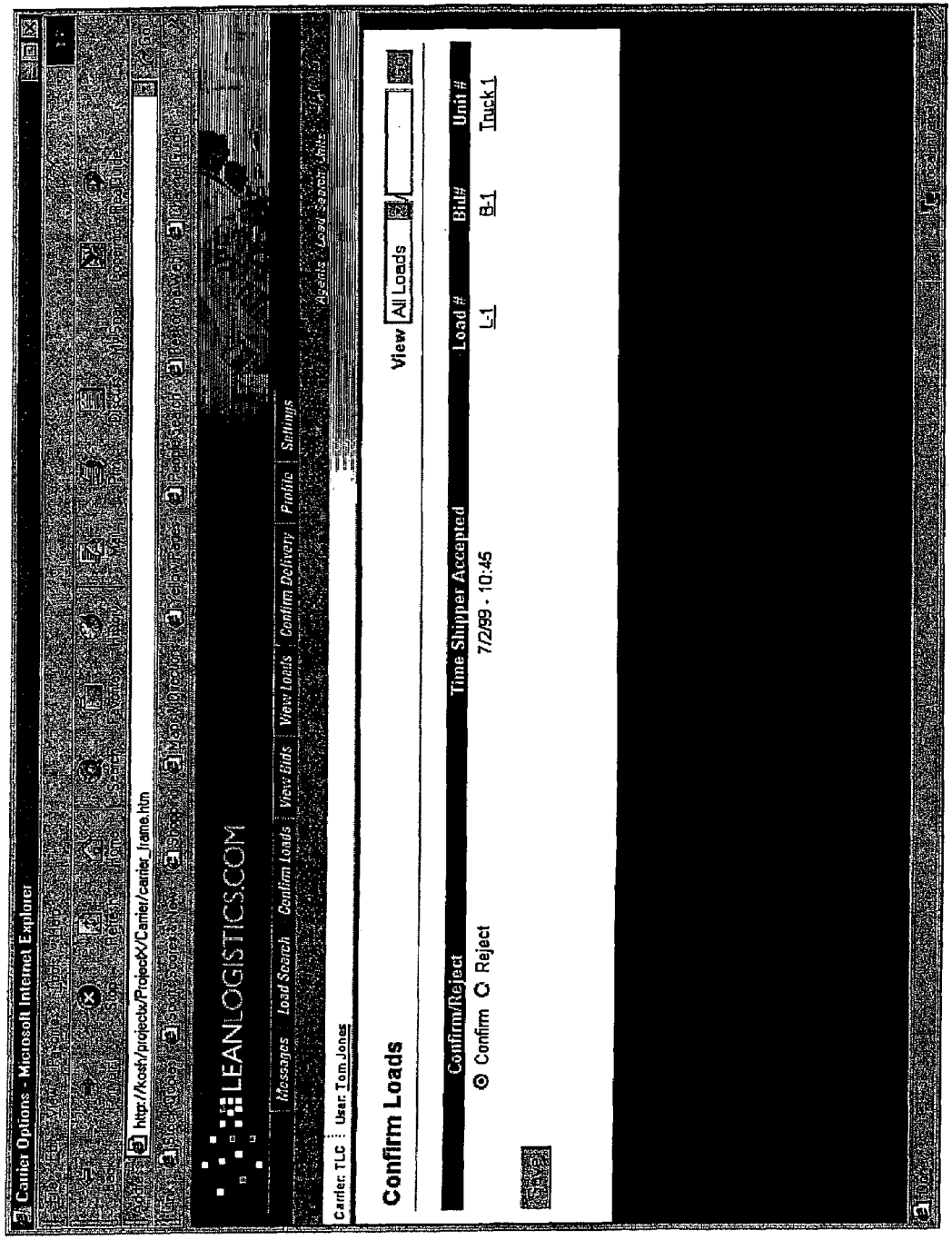
Fig. 12a (1202)

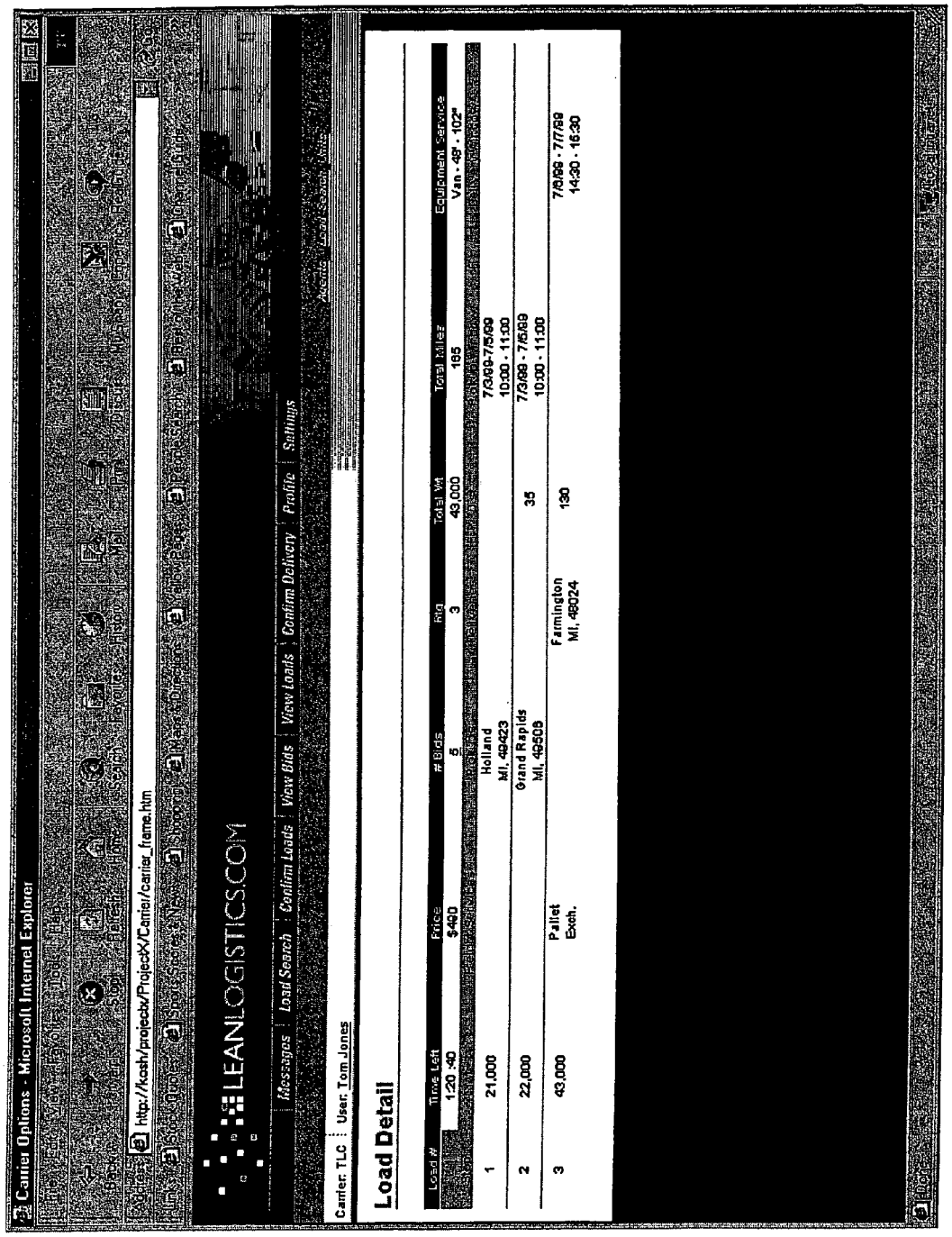
Fig. 12b (1204)

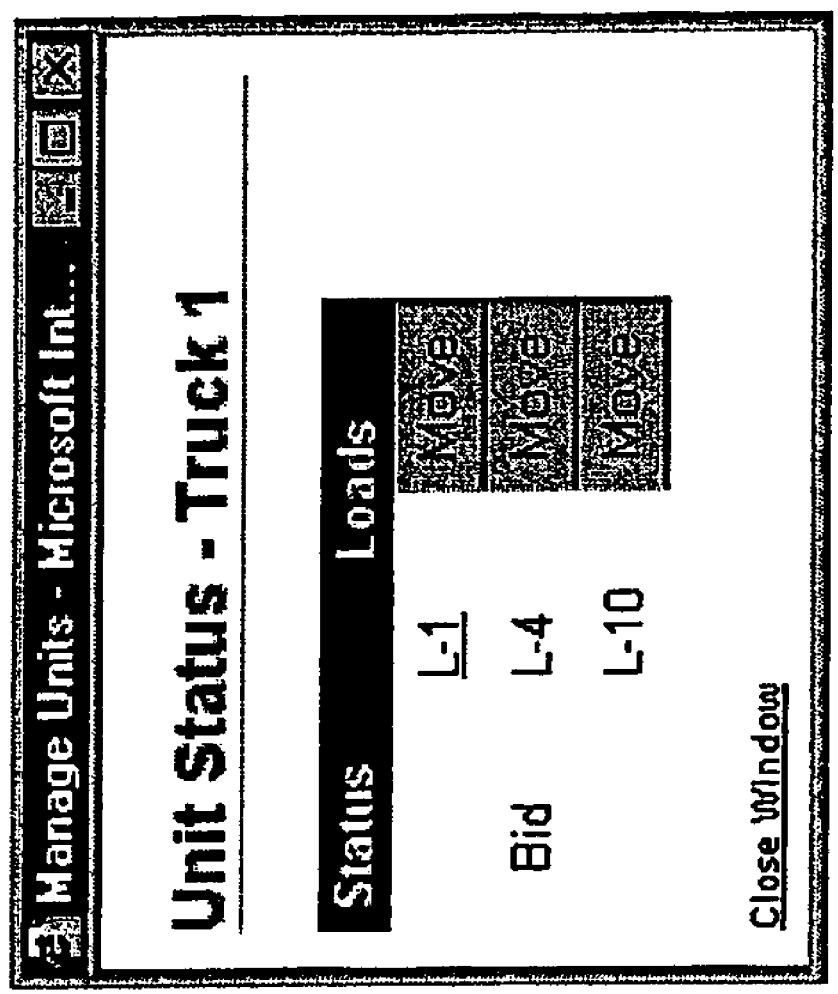
Fig. 12c (1206)

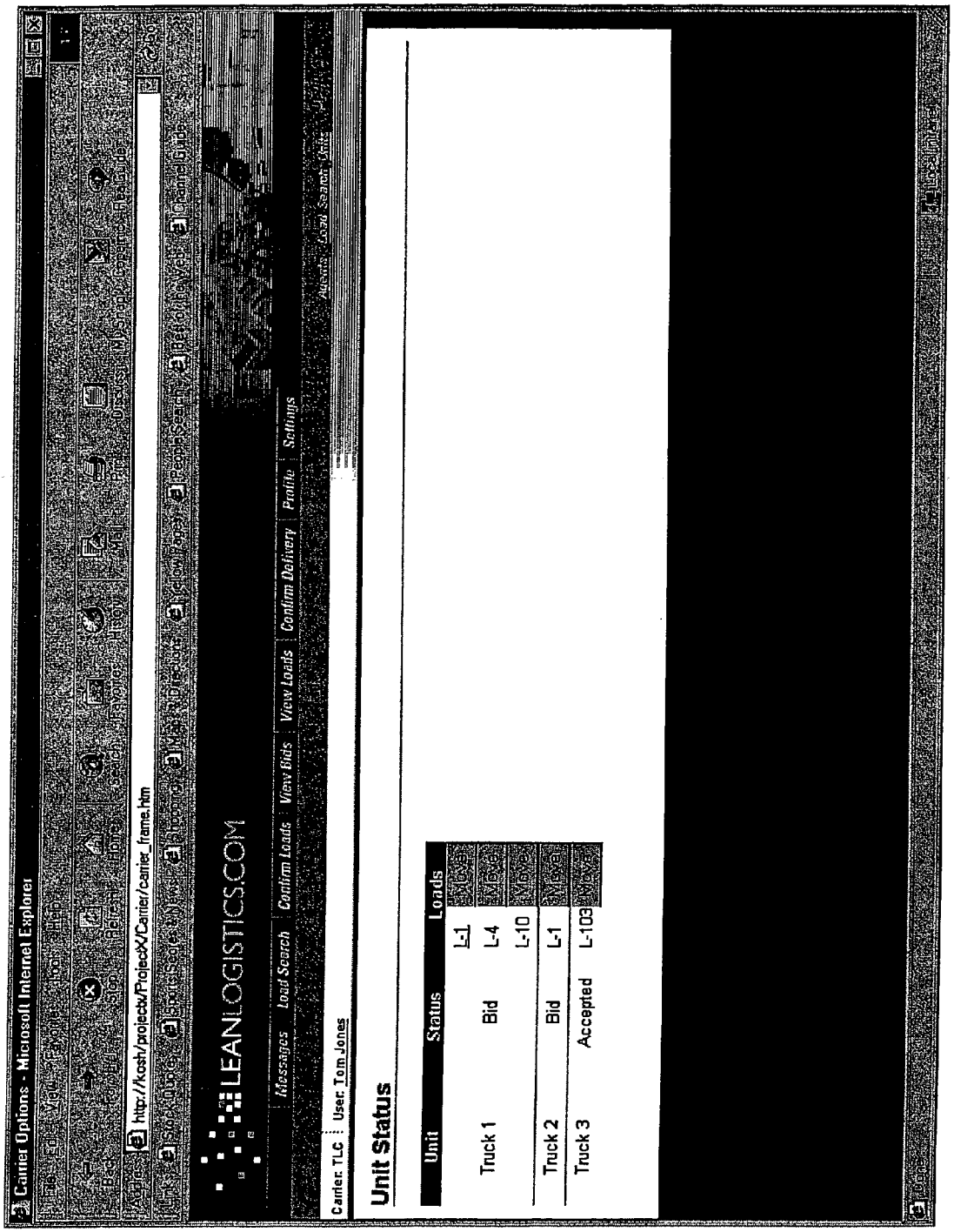
Fig. 12d (1208)

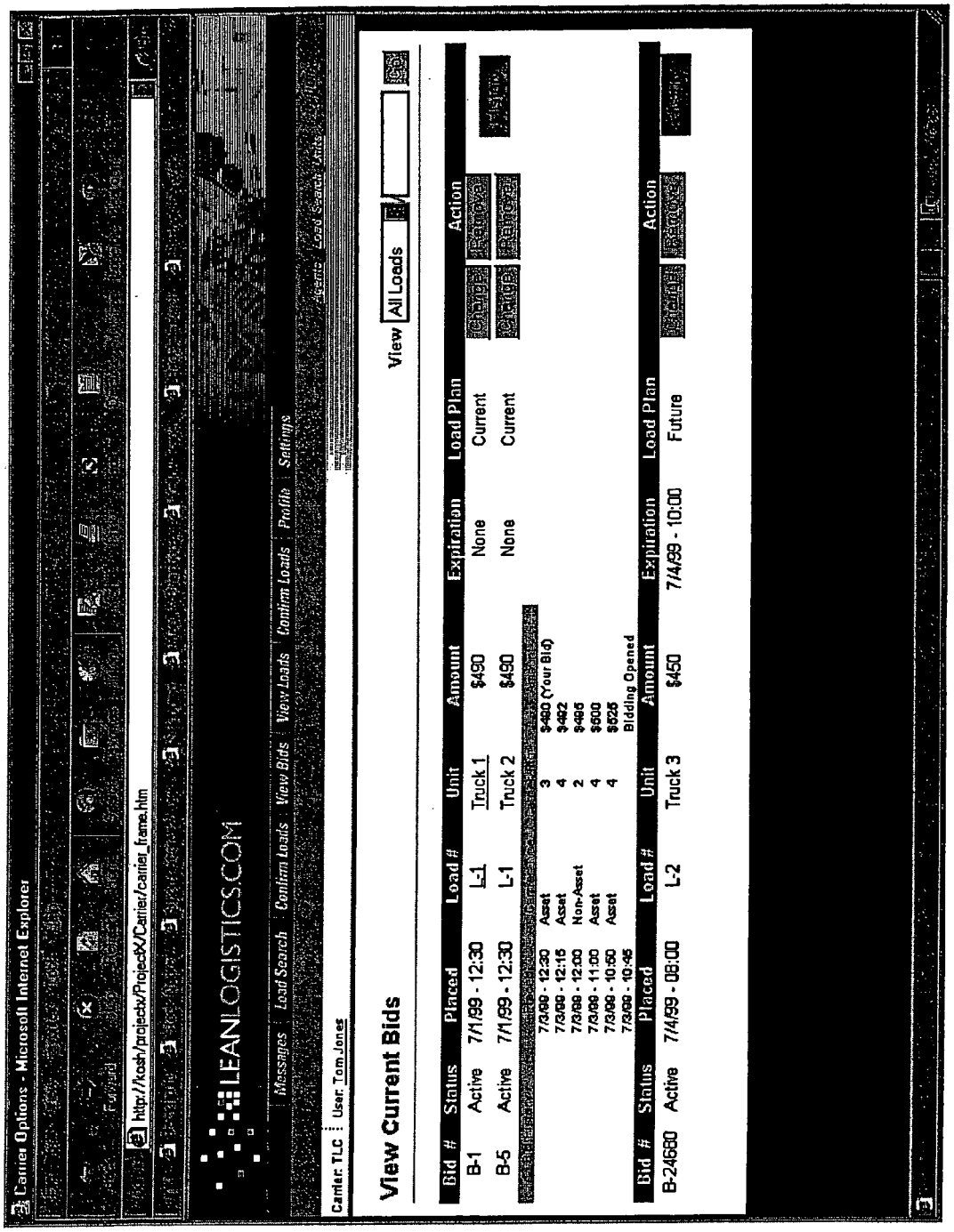
Fig. 13 (1302)

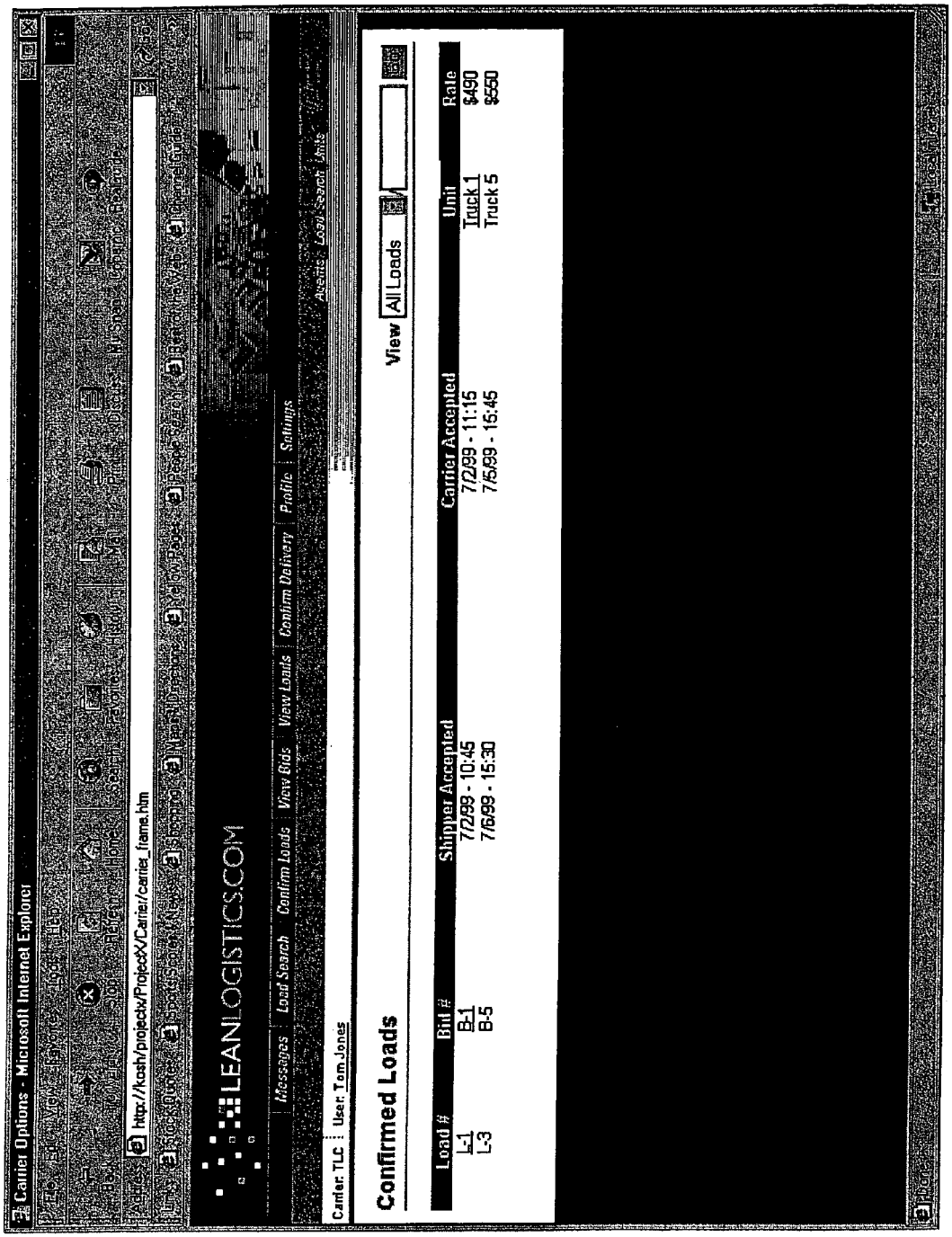
Fig. 14a (1402)

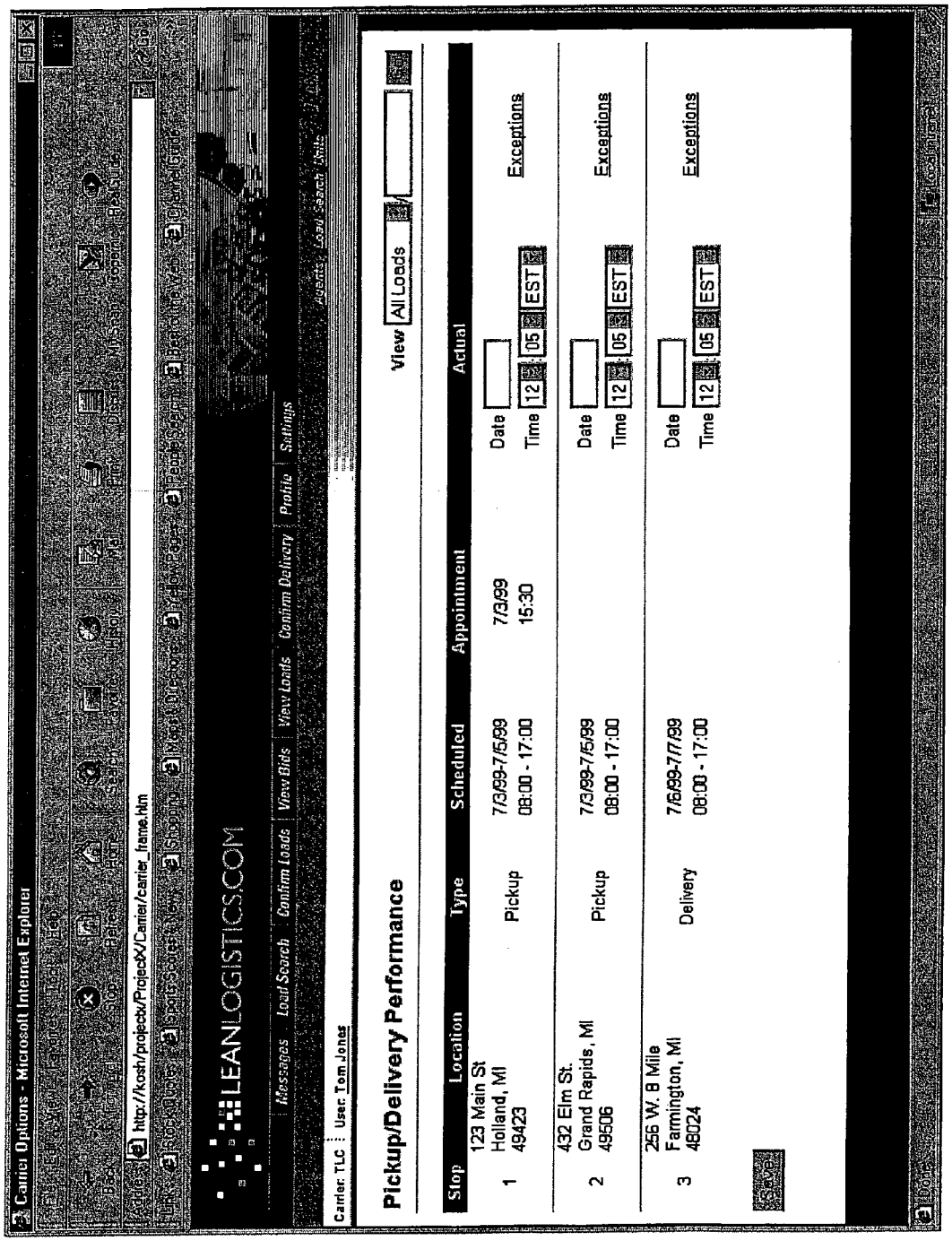
Fig. 14b (1404)

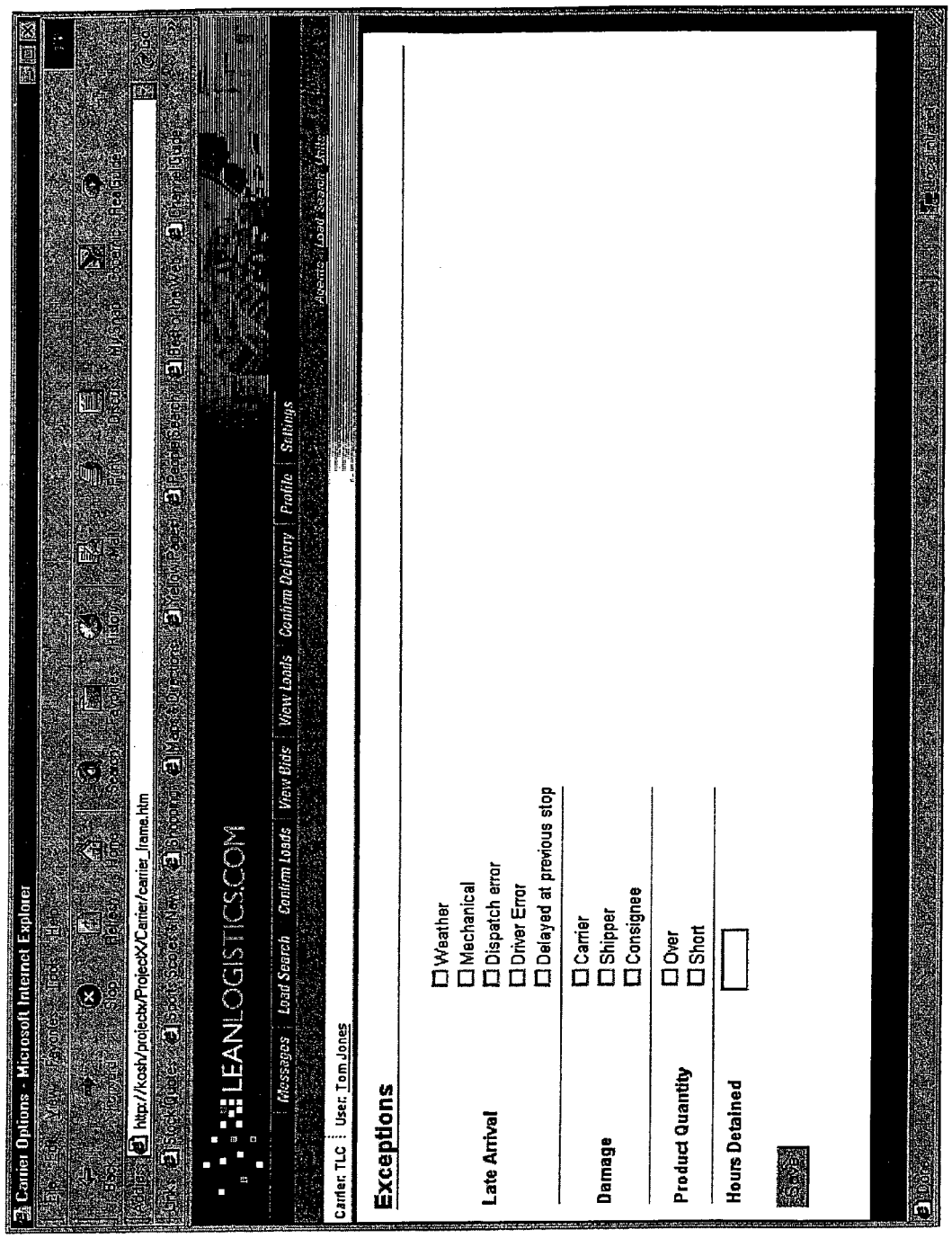
Fig. 14c (1406)

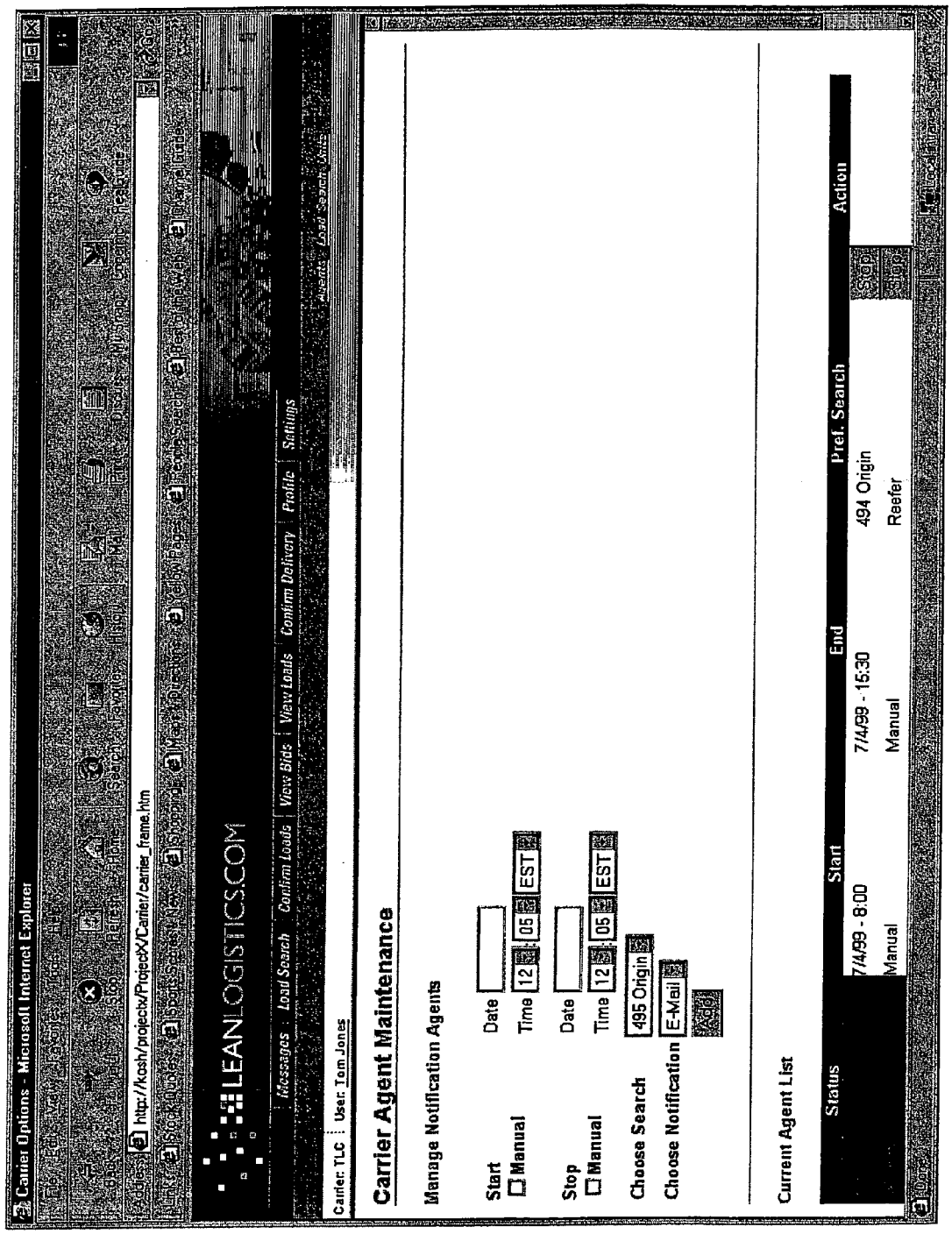
Fig. 15 (1502)

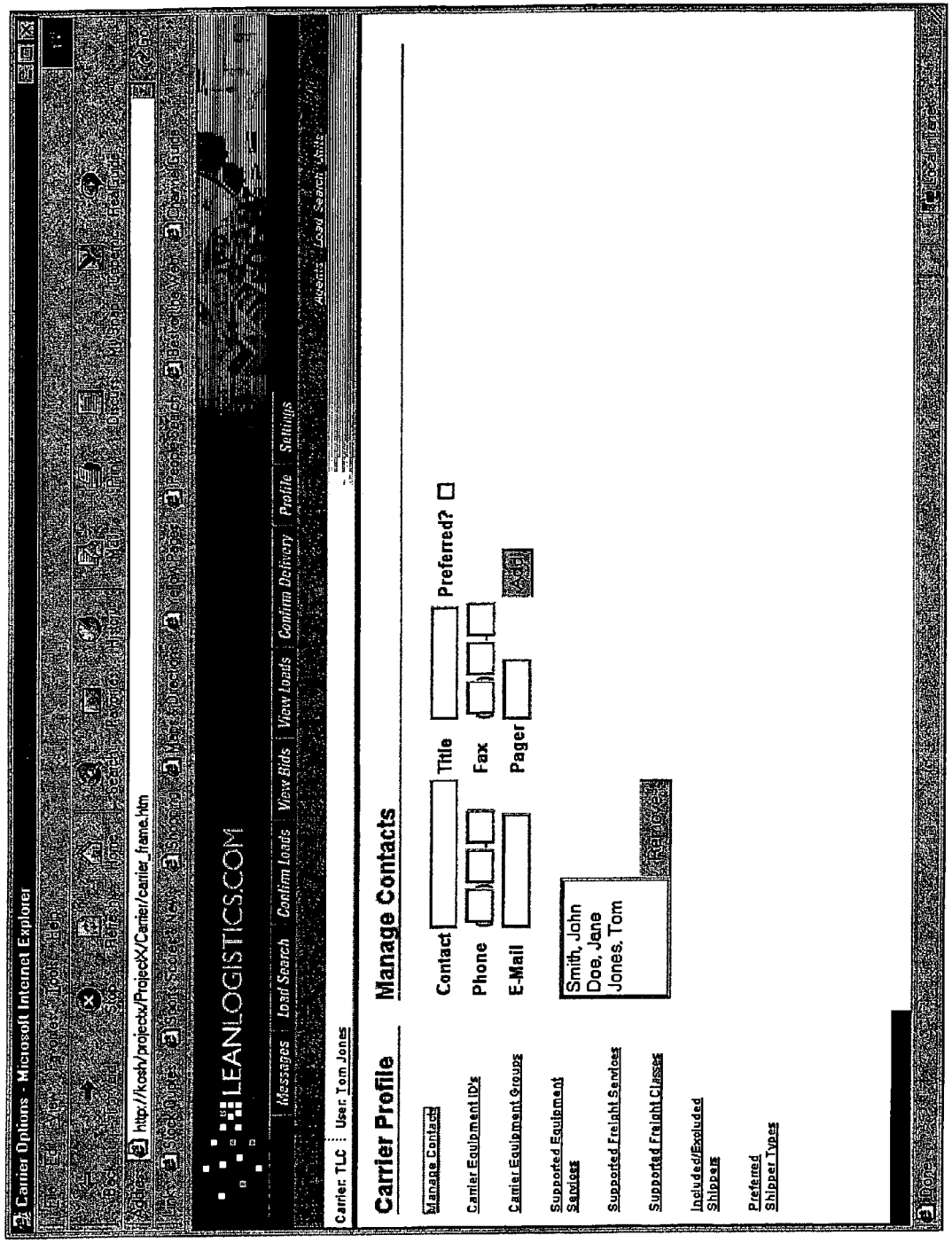
Fig. 16a (1602)

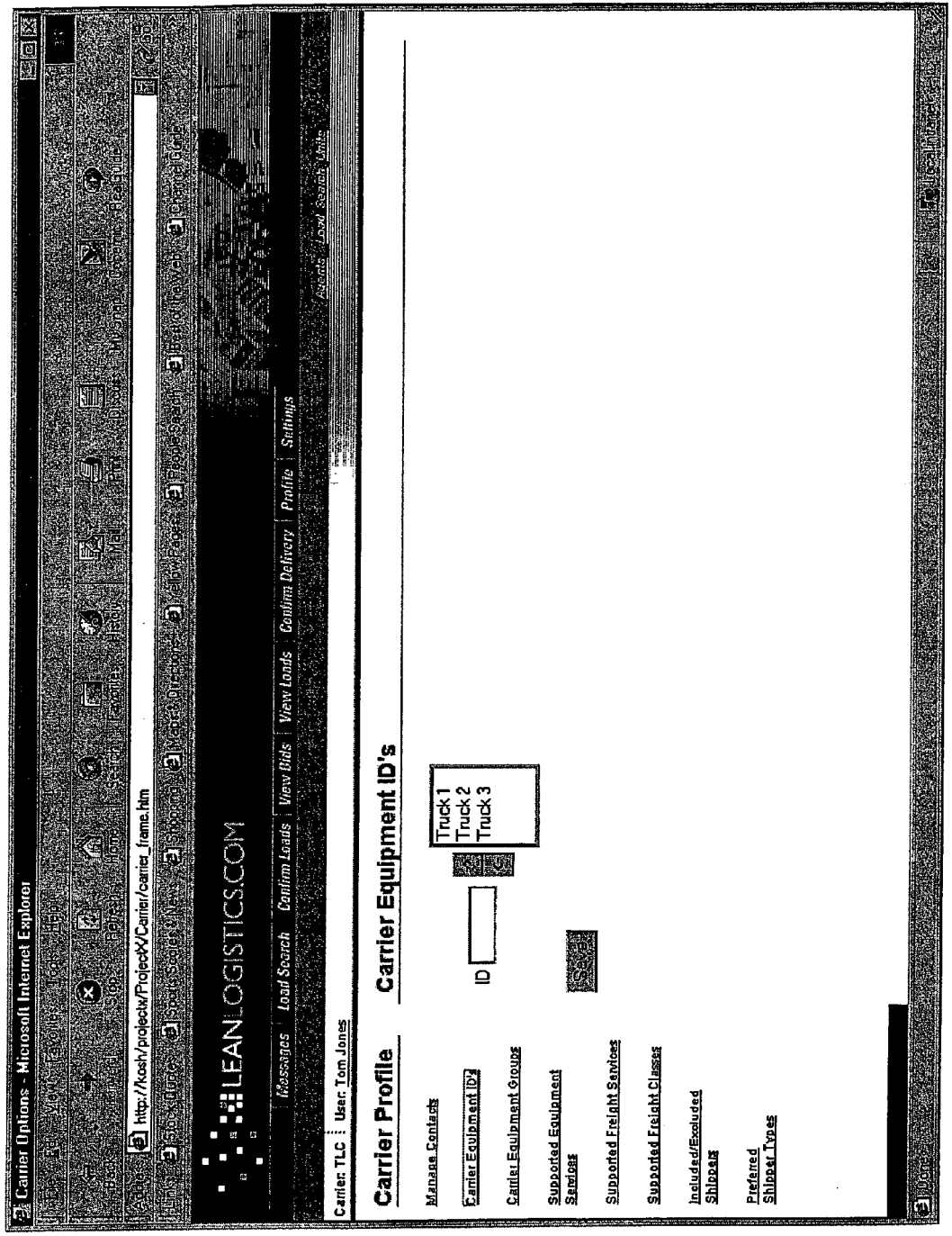
Fig. 16b (1604)

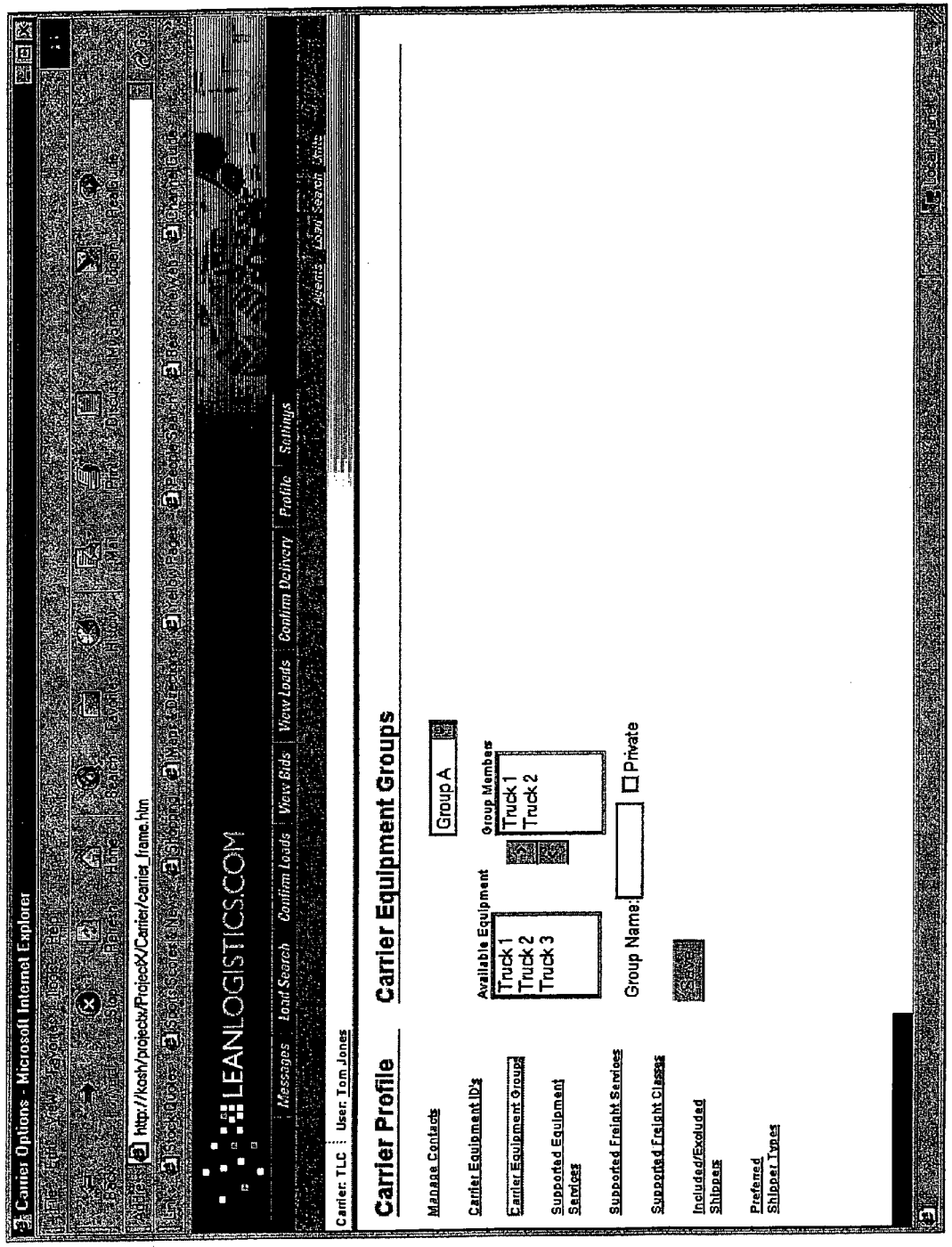
Fig. 16c (1606)

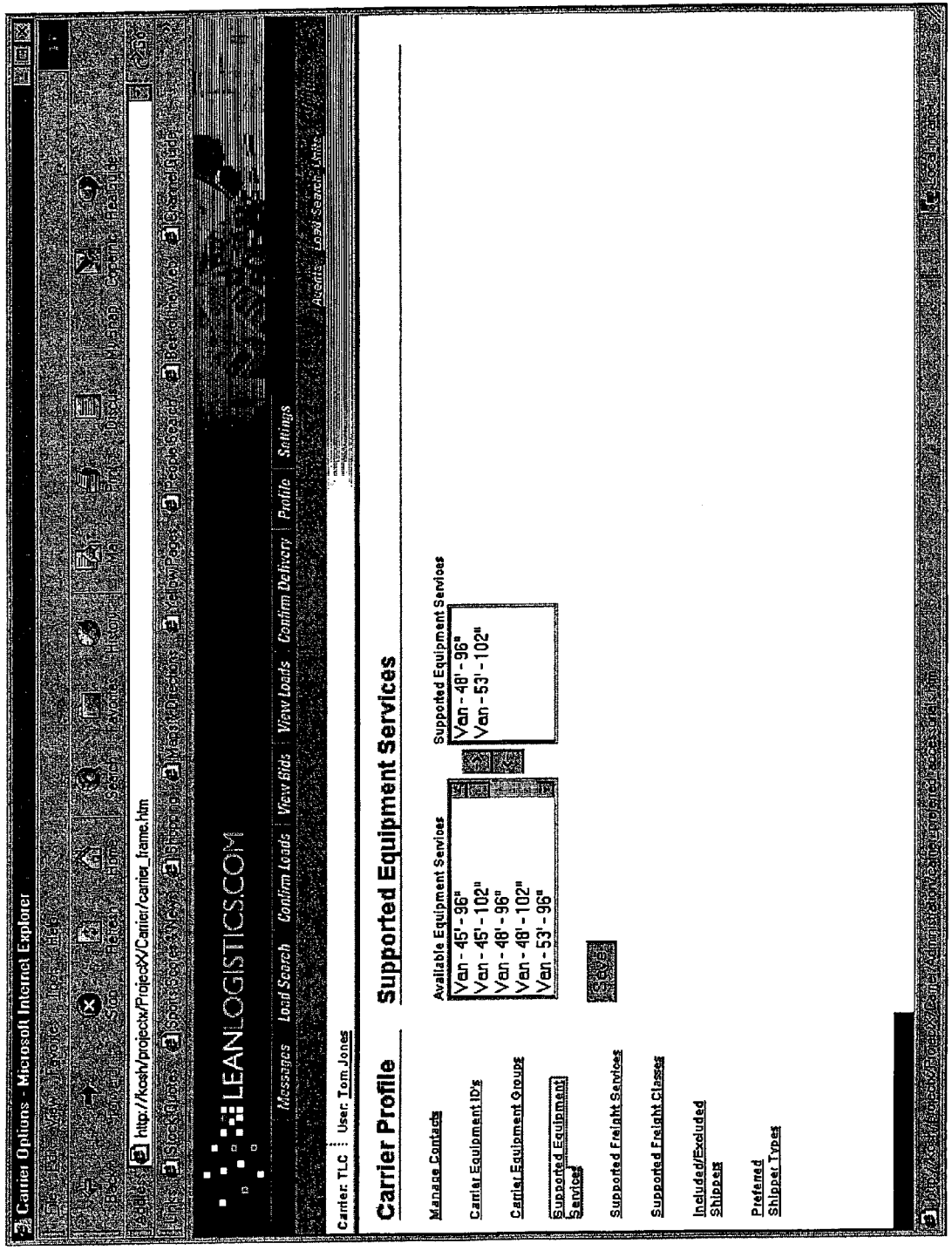
Fig. 16d (1608)

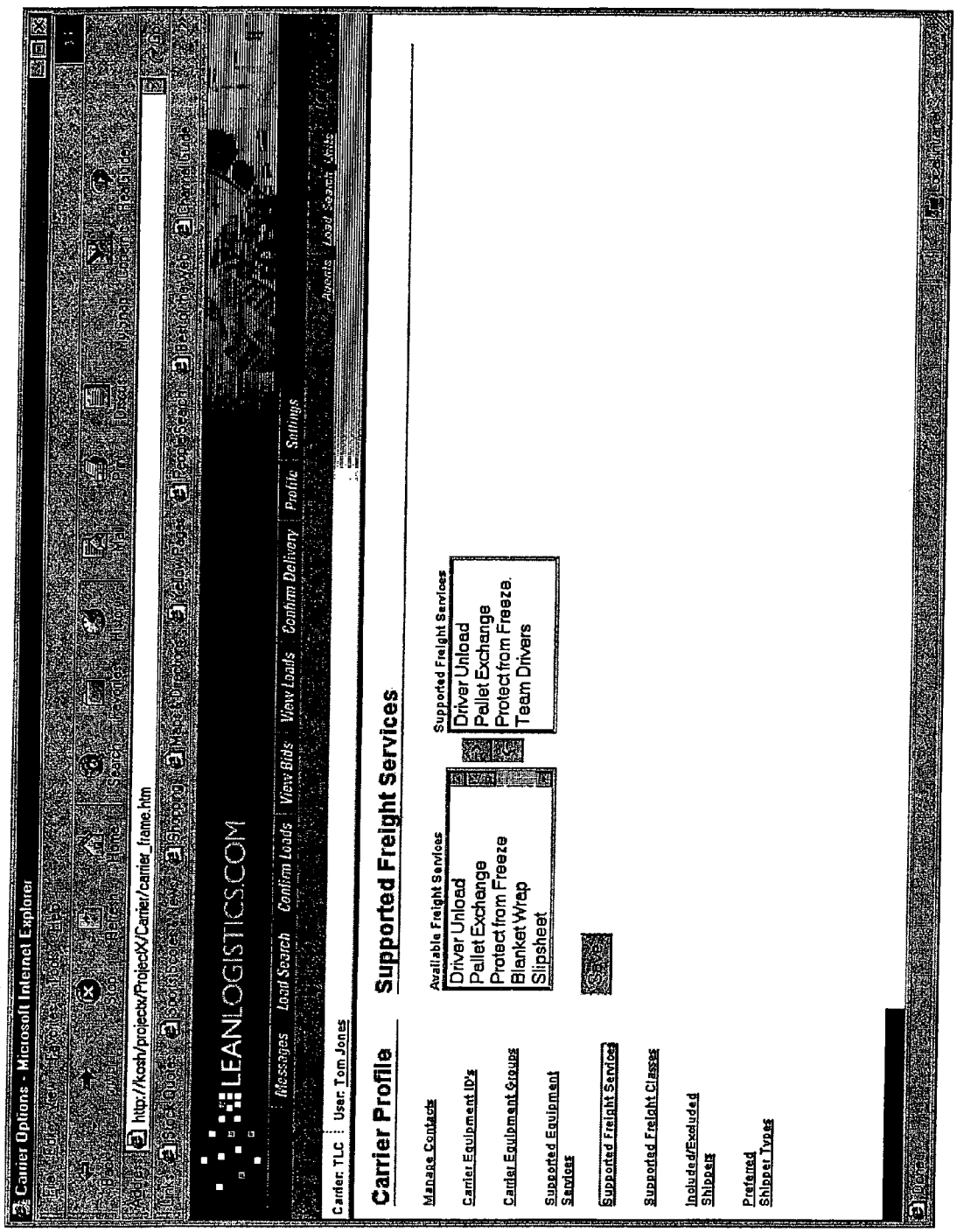
Fig. 16e (1610)

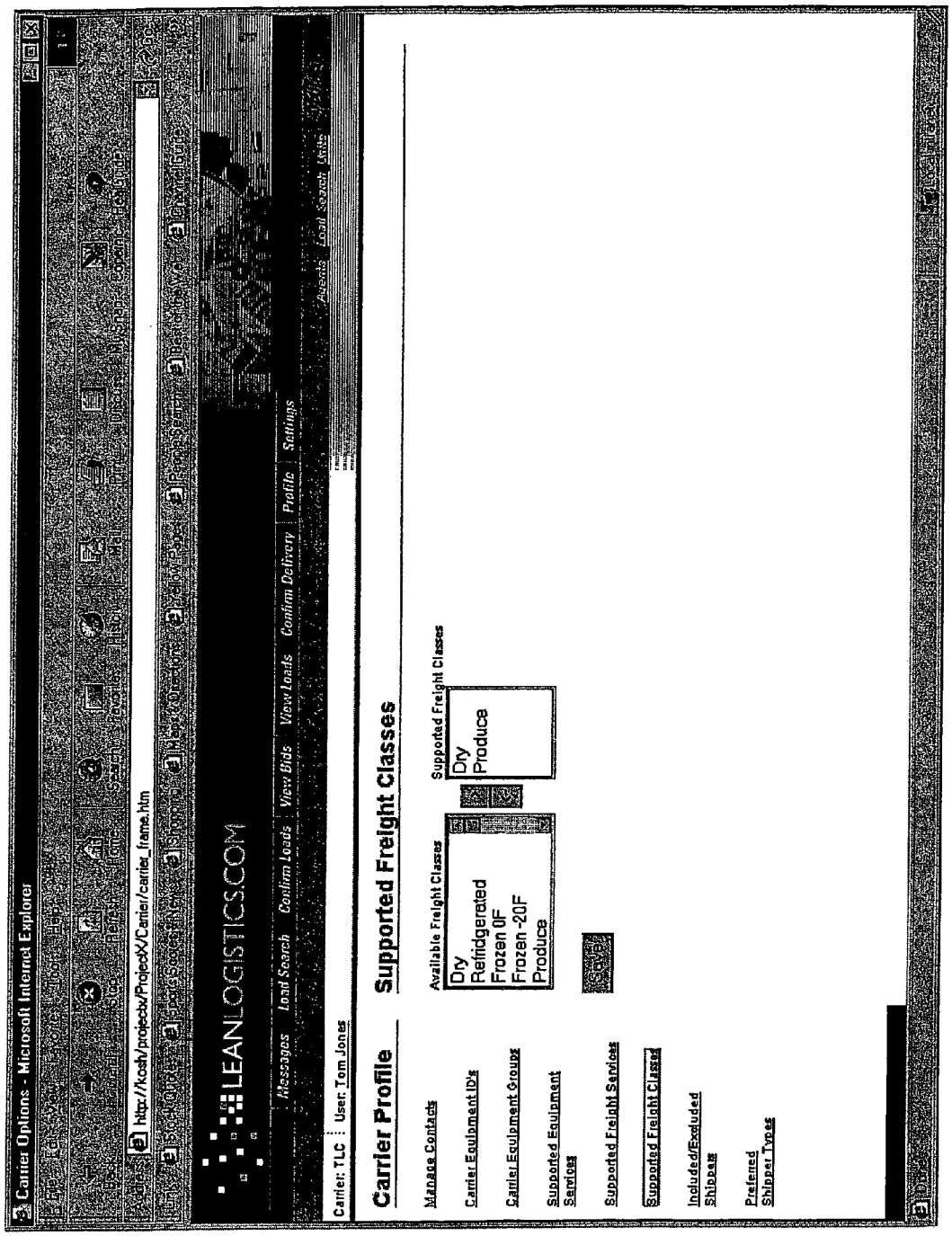
Fig. 16f (1612)

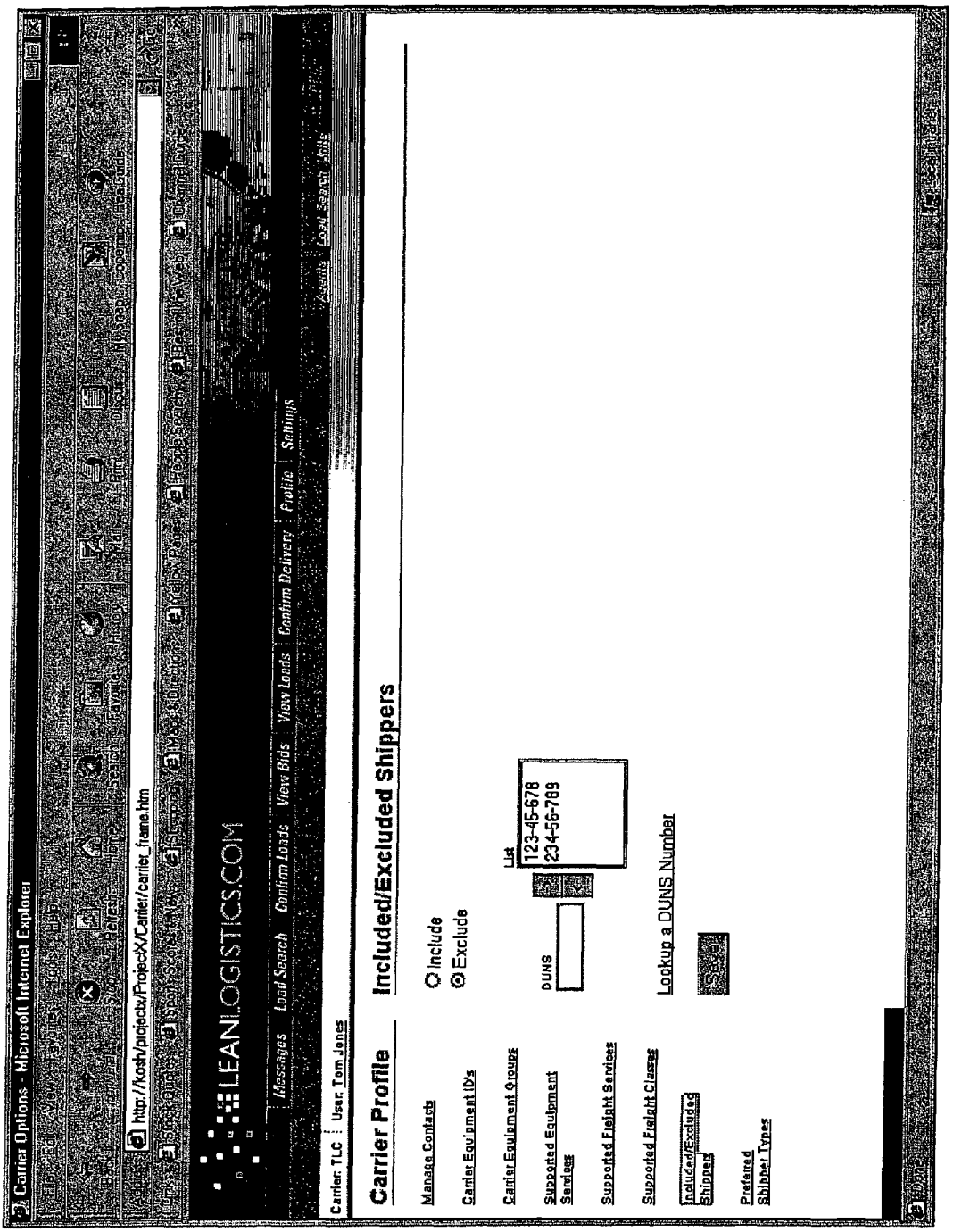
Fig. 16g (1614)

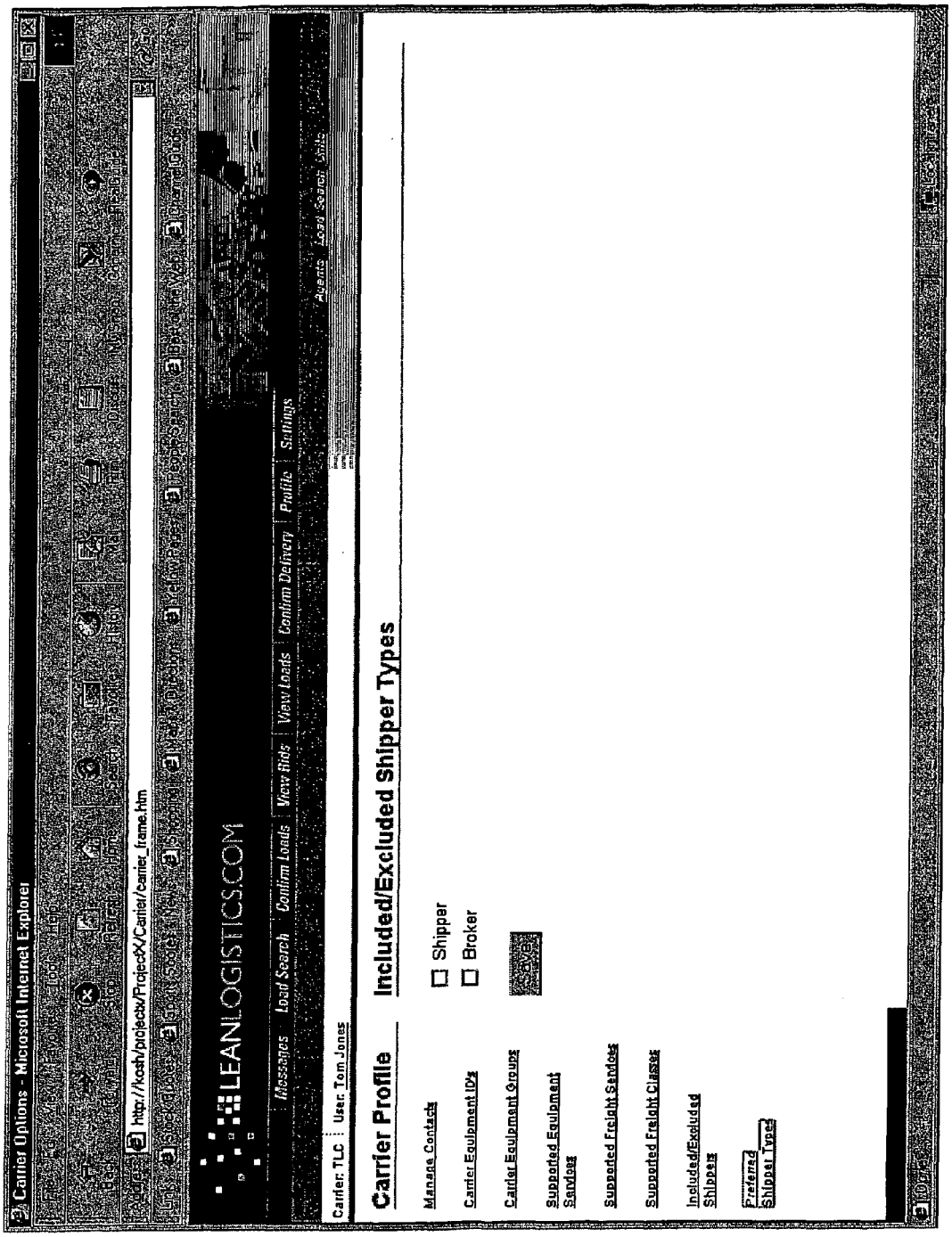
Fig. 16h (1616)

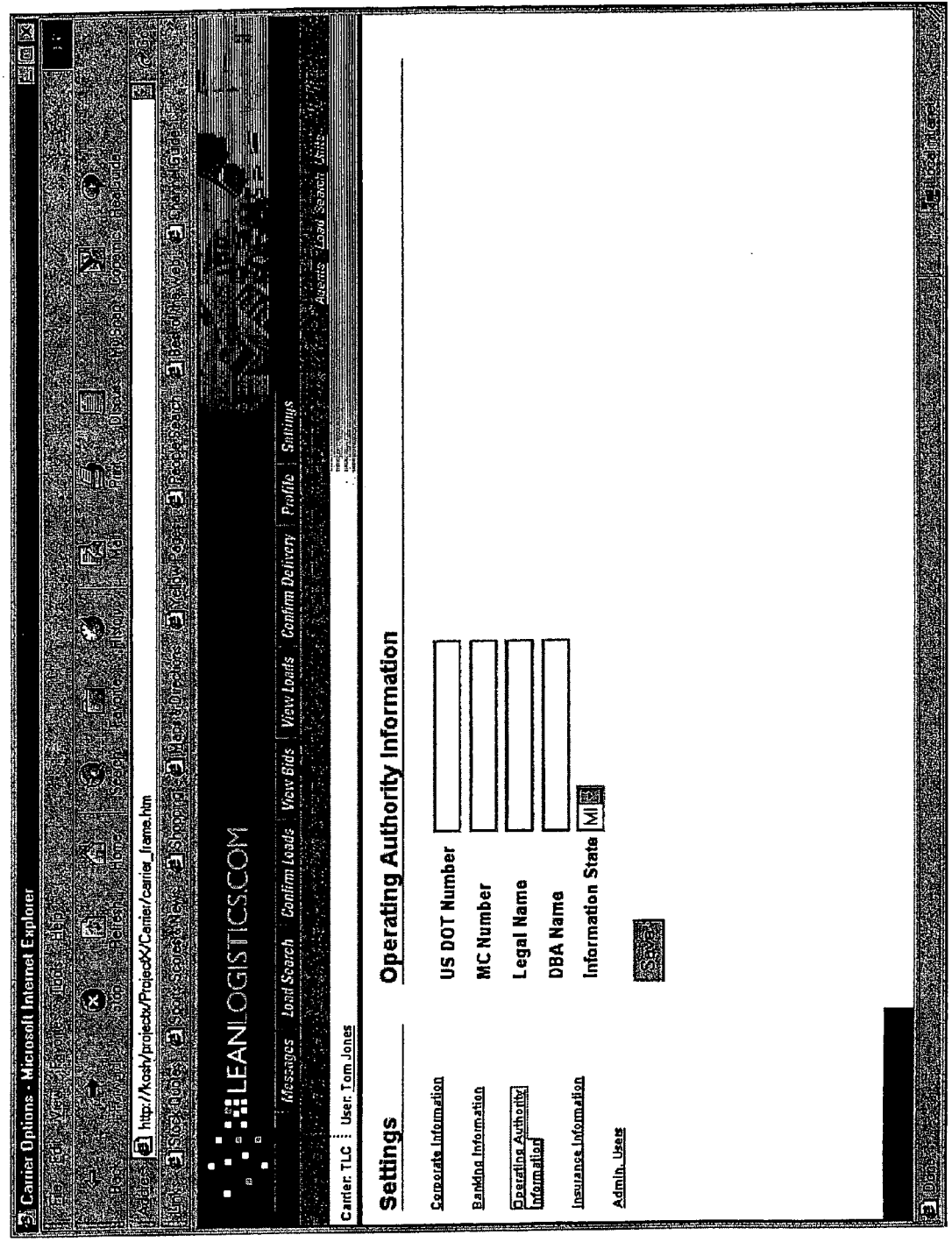
Fig. 17a (1702)

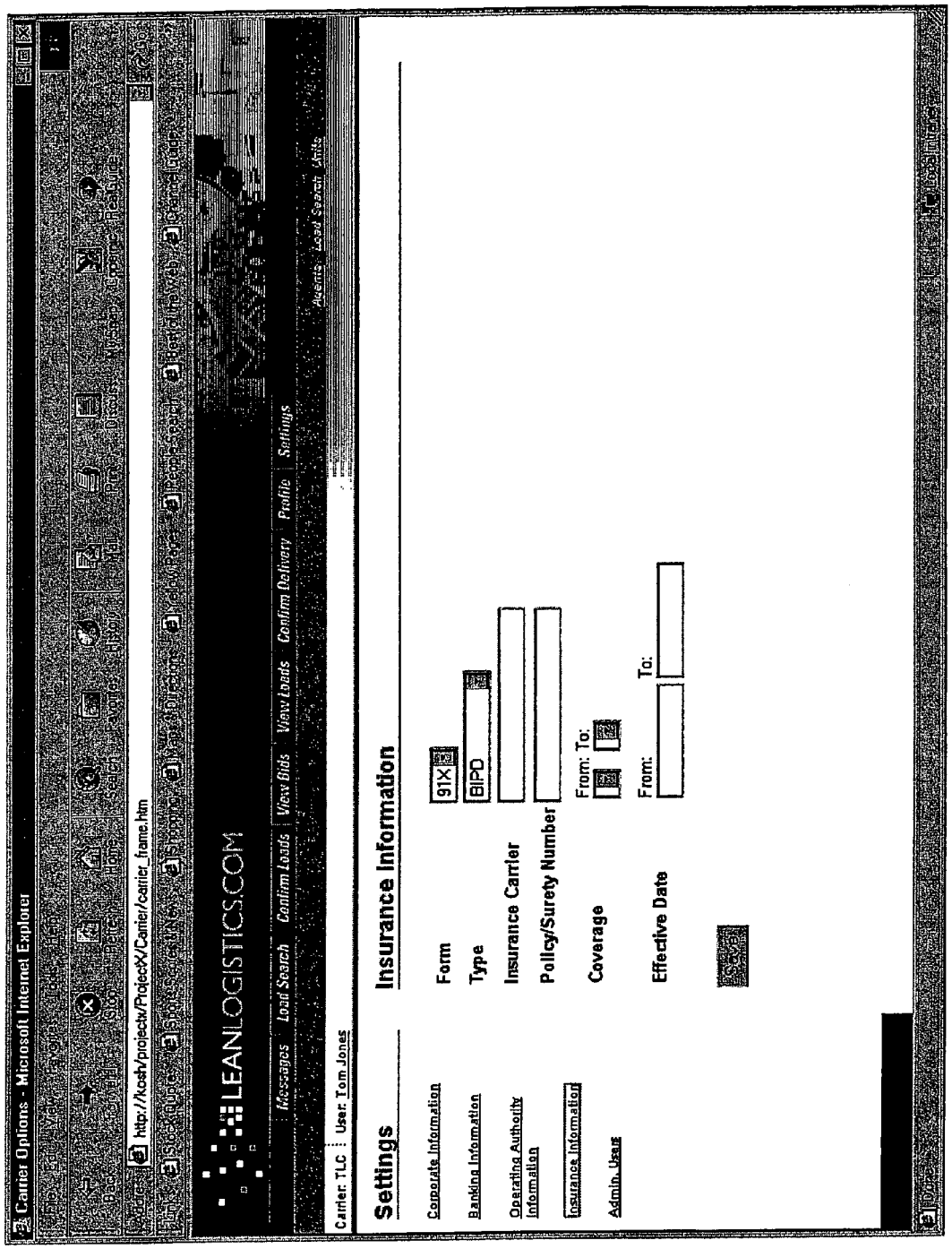
Fig. 17b (1704)

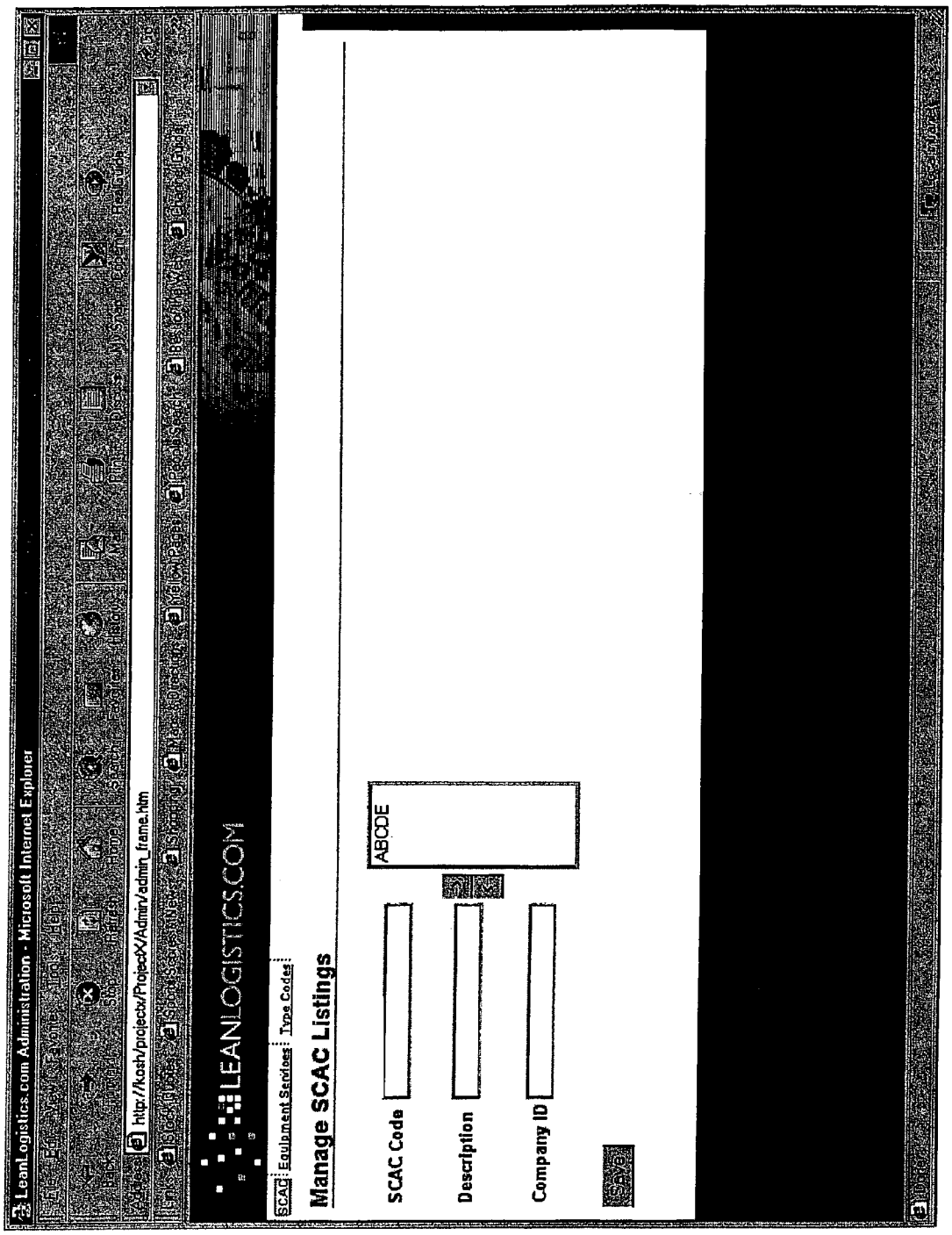
Fig. 18a (1802)

Fig. 18b (1804)

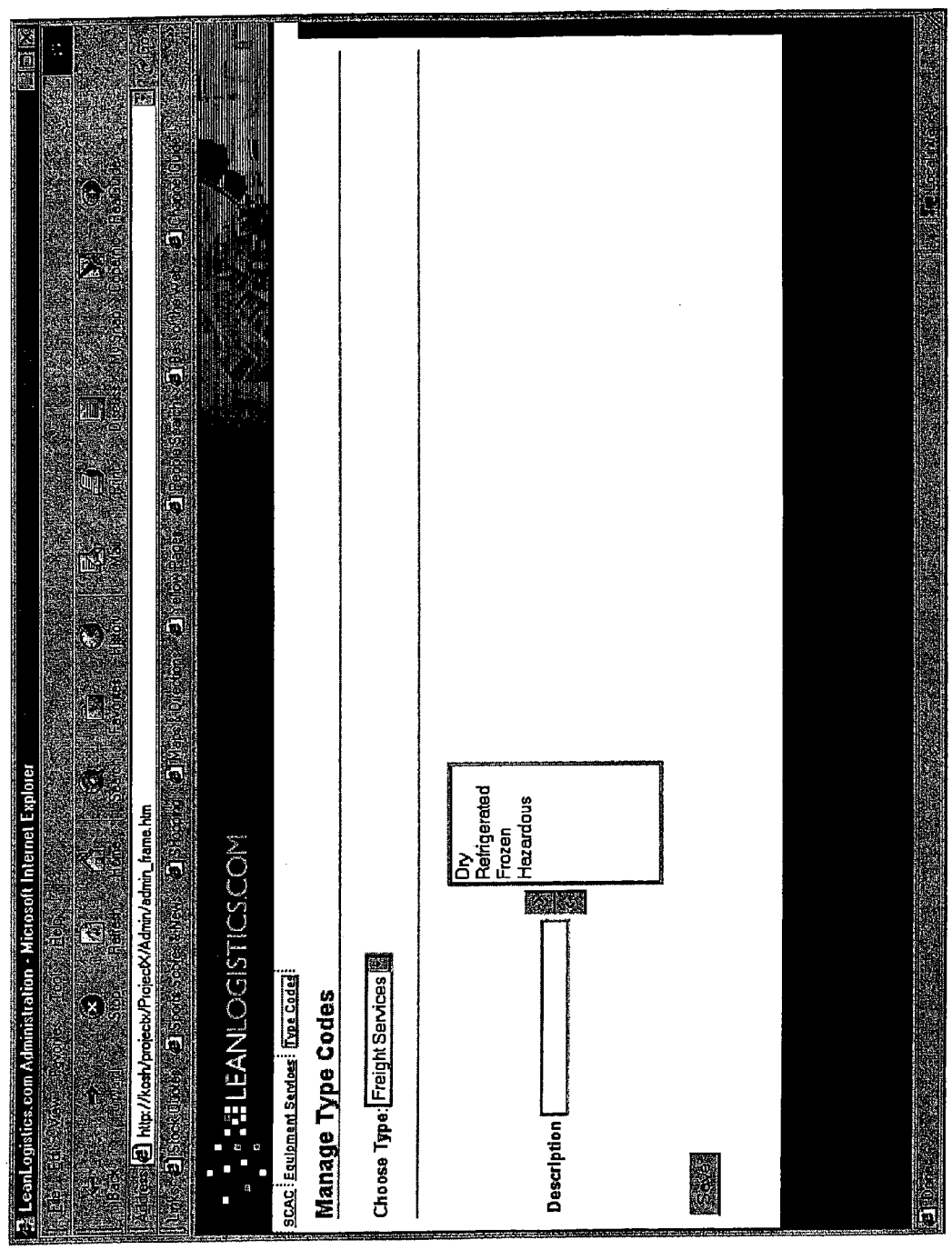
Fig. 18c (1806)

METHODS AND APPARATUS FOR CONNECTING SHIPPERS AND CARRIERS IN THE THIRD PARTY LOGISTICS ENVIRONMENT VIA THE INTERNET

RELATED APPLICATION DATA

The present application claims priority from U.S. Provisional Patent Application 60/162,809 for METHODS AND APPARATUS FOR CONNECTING SHIPPERS AND CARRIERS IN THE LOGISTICS ENVIRONMENT VIA THE INTERNET filed on Nov. 1, 1999, the entirety of which is incorporated herein by references for all purposes.

BACKGROUND OF THE INVENTION

The present invention relates to the facilitation of logistics over the Internet. More specifically, the present invention provides an online electronic marketplace in which carriers bid for freight tendered by shippers and shippers purchase the most attractive transportation services for their loads.

In 1998, U.S. businesses spent $898 billion in supply chain expenditures. Transportation expenditures accounted for 47%, or $425 billion of the supply chain costs. Globally, total costs related to supply chain logistics are estimated to be approximately $3.4 trillion. From the perspective of the consumer, supply chain logistics costs account for 5% to 50% of the total costs of a delivered product.

Transportation in the United States today is highly fragmented, with no single transportation company having any significant portion of the $425 billion market. The top 10 carriers by revenue in 1998 accounted for a combined market share of 14.5%, and the top 100 carriers had a combined market share of 22%.

The breakdown of the $425 billion transportation market by type of carrier is, approximately, $249 billion for private fleets (59% market, share), $124 billion for-hire trucking (29% market share), and $52 billion for-hire package express services (12% market share).

For all of these market sectors, empty, non-revenue-generating miles are a significant issue. Based on statistics tracked by the American Trucking Association, for-hire carriers averaged 12.6% empty miles for the first seven months of 1999. Small truckload carriers with less than $30 million in annual revenue incurred the highest percentage empty miles averaging 18.4%. Large less-than-truckload (LTL) carriers fared the best with 6.5% empty miles for the same period. Statistics on private fleets' percentage of empty miles according to the Private Fleet Benchmark of Quality and Productivity are averaging 24%. Based on these numbers, the projected inefficiency in U.S. transportation expenditures today as a result of empty non-revenue generating miles is approximately $82 billion dollars annually.

Transportation brokers play a significant role in the truckload transportation market today, representing additional inefficiency in the supply chain. The demand for their services is due to the fragmentation of information in the industry and the associated empty miles. Transportation brokers have relationships with shippers in regional markets, as well as carriers who move equipment into and out of those regions. Brokers serve as the middlemen between shippers and carriers in matching loads and equipment in return for a typical commission of 8-10% of the cost of the load, normally charging a $50-$100 minimum. Most shippers and carriers have little alternative to paying this cost of doing business due to their limited visibility into the marketplace.

It is therefore desirable to provide a means by which shippers' loads may be connected with carrier capacity in a way which helps to eliminate the supply chain inefficiencies described above.

SUMMARY OF THE INVENTION

According to the present invention, an online electronic marketplace is provided in which carriers bid for loads tendered by shippers, and shippers purchase the most attractive transportation services. The system described herein efficiently matches loads and capacities, lowers transaction costs, and creates value through enhanced visibility to information resulting in efficient transportation and financial transactions. According to specific embodiments, the present invention combines a neutral marketplace patterned after a stock exchange, with the electronic format of an Internet auction site to create a trading system for the logistics industry.

A wide variety of benefits are realized by the various participants in the system of the present invention. For example, using the present invention, transactions are effected quickly and easily with minimal paperwork and documentation. All users have access to the market 24 hours a day, seven days a week. A neutral forum is provided in which quality of service is differentiated for shippers and carriers. Pricing efficiency is realized in that the system relies on real-time market-driven pricing as opposed to contract pricing. Administrative costs of invoicing and payment are lowered due to the automatic payment mechanisms described. These mechanisms also ensure that carriers receive prompt payment for services rendered. The mechanism for load tendering is more efficient than traditional models. The overhead traditionally associated with finding loads or freight capacity is reduced or eliminated. The system give both shippers and carriers broader visibility thereby creating better load to carrier matches. This, in turn, results in lower pricing for shippers, and better profitability for carriers by reducing empty miles. Middleman broker costs are reduced or eliminated.

In addition to these immediate benefits of a real-time electronic marketplace, the system of the present invention also provides a number of highly marketable strategic benefits. For example, private fleets may utilize the system to fill out otherwise marginal trailer capacity, thereby justifying private fleet operations to corporate management. Larger for-hire carriers may use data from the system as a planning tool when allocating equipment to different geographic sections of the country. Smaller for-hire carriers may use the system to compete with larger carriers.

Once shippers and carriers are registered in the system, the following functionalities are provided. Shippers may access the virtual marketplace of the present invention via an associated Internet web site or via an integrated electronic interface to enter loads for carriers to bid against. The basic information entered for each load may include the origin pickup location(s) and time, delivery destination(s), shipping characteristics (e.g., pallet exchange), driver handling requirements, equipment requirements, total miles associated with the load, and load expiration. According to a specific embodiment, the system automatically calculates mileage for all loads using an industry accepted mileage software package (e.g., PC*Miler). Shippers have the choice to limit the viewing of their loads to select carriers, or all carriers in the marketplace of the present invention.

Carriers may access the virtual marketplace of the present invention via an associated Internet web site or via an integrated electronic interface to view loads that are available to bid. Search tools allow carriers to view loads broadly or more narrowly based on geography, date constraints, and load characteristics. According to specific embodiments, carriers can view load details, but will not have visibility as to the specific shipper that entered the load. Each shipper's quality of service is tracked by the system and is visible to the carriers as they review loads available. Carriers have the ability to place bids on specific loads at any time. According to a specific embodiment, the various searching capabilities provided by the system integrate the visibility filters and setting specified by the user.

Before placing a bid on a load, carriers can view the current bids on a specific load, and whether a carrier or transportation broker submitted the bid. This feature allows the carriers to more intelligently bid on loads. Shippers also have the capability to view the current bids on their loads, and the company names of carriers or brokers who submitted the bids. The shipper also sees how many bids a carrier placed against their specific capacity, in order to better understand how long a specific capacity may be available before it is purchased by another shipper. Each carrier's quality of service is tracked by the system and is visible to the shippers as they review bids. Shippers have the ability to buy specific capacity at any time.

Carriers may bid specific units of capacity (i.e., equipment) against all loads in the system that meet their criteria. Carriers also have the ability to bid one unit of capacity to multiple loads. Carriers can either designate their bids as open bids with no expiration, or place expirations on the bid.

According to various specific embodiments, loads expire from the system when, for example, the shipper defined expiration has occurred, the specified pickup window has passed, the load is sold to a carrier, or the shipper removes the load manually from the system (e.g., the load is covered outside of the system).

According to various embodiments, bids expire from the system when, for example, the carrier defined expiration has occurred, the unit of capacity bid on the load is sold to another load, the load is awarded to another carrier, the bid is accepted by the load, or the bid is manually removed by the carrier (e.g., the capacity is filled outside the system).

According to specific embodiments, shippers may review bids and manually buy capacity, or they may specify automatic buys if a carrier placing a bid meets or beats specific price and quality of service criteria. If a shipper buys a carrier's capacity (i.e., accepts the carrier's bid), the carrier is required to make that capacity available, and the shipper is required to make the load available. Failure on the part of either the carriers or the shippers to make their respective capacity and loads available negatively impacts each party's quality of service rating.

According to specific embodiments of the invention, carriers have the ability to proactively manage their capacity by setting up agents, which allow the system to act on behalf of the carrier. Carriers are able to enter specific units of capacity, along with desired pickup and delivery geographies and times. The agent operates within the time window the carrier specifies, and notifies the carrier when loads in the system match the agent criteria setup by the carrier. Carriers have the ability to either manually place bids or have the agent enter auto-bids on loads that match the agent criteria.

According to various embodiments, shippers and carriers using the system of the present invention agree to an electronic receivables and payables system. According to a specific embodiment, the system employs Automated Clearinghouse (ACH) technology. However, it will be understood that a wide variety of such technologies may be employed to effect this aspect of the invention. In one embodiment, the system electronically sends a weekly request for funding to shippers for payment of freight bills and system transaction fees. On the specified payment date, the shipper's account is debited and the system and the various carrier accounts are credited.

Thus, the present invention provides, in a system for matching carrier capacities with shipper loads via a wide area network, methods and apparatus for generating a bid for a shipper load. A plurality of units of capacity are selected. A group identifier is assigned to the plurality of units of capacity. A bid is then generated for the shipper load using the group identifier.

According to another specific embodiment, in a system for matching carrier capacities with shipper loads via a wide area network, methods and apparatus are provided for bidding on a plurality of shipper loads. According to this embodiment, a plurality of bids corresponding to the plurality of shipper loads are generated, each of the plurality of bids corresponding to a single unit of capacity.

According to yet another embodiment of the invention, in a system for matching carrier capacities with shipper loads via a wide area network, methods and apparatus are provided for bidding on a plurality of shipper loads. According to this embodiment, a plurality of bids corresponding to the plurality of shipper loads are generated, each of the plurality of bids corresponding to a single unit of capacity. Where one of the plurality of bids is accepted, all others of the plurality of bids are made unavailable.

According to still another specific embodiment, in a system for matching carrier capacities with shipper loads via a wide area network, method and apparatus are provided for generating a bid for a shipper load. The bid for the shipper load is generated and designates a currently unavailable unit of capacity. The bid is also identified as a future bid. When the currently unavailable unit of capacity becomes available, the bid is updated to a current bid.

According to a specific embodiment of the invention, in a system for matching carrier capacities with shipper loads via a wide area network, methods and apparatus are provided for identifying shipper loads. A search process is generated according to at least one criterion specified by a carrier representative. The search process is operated without user intervention to identify at least one shipper load. A notification corresponding to the at least one shipper load is then transmitted to the carrier representative.

According to another specific embodiment, in a system for matching carrier capacities with shipper loads via a wide area network, methods and apparatus are provided for posting at least one unit of carrier capacity for viewing by shipper representatives. In response to receiving a plurality of capacity parameters input by a carrier representative, a listing for the at least one unit of carrier capacity is generated. The listing indicates the at least one unit of carrier capacity is either currently available or available at some future time. The listing for the at least one unit of carrier capacity is then posted for viewing by the shipper representatives.

According to yet another specific embodiment, in a system for matching carrier capacities with shipper loads via a wide area network, methods and apparatus are provided for presenting information regarding a bid entered against a particular shipper load, the bid corresponding to a particular carrier capacity. According to this embodiment, the number of shipper loads against which the particular carrier capacity is currently bid is communicated.

According to still another embodiment of the invention, in a system for matching carrier capacities with shipper loads via a wide area network, methods and apparatus are provided for controlling visibility of the carrier capacities and the shipper loads. According to this embodiment, visibility of carrier capacities in the system is limited according to shipper identification information input by carrier representatives, and visibility of shipper loads in the system is limited according to carrier identification information input by shipper representatives.

According to a further embodiment, in a system for matching carrier capacities with shipper loads via a wide area network, methods and apparatus are provided for notifying a system user of system events. A list of the plurality of system events is presented to the system user. A plurality of notification options is also presented to the system user. At least one selection by the system user from the list of the system events is then received, the at least one selection corresponding to a subset of the plurality of system events. At least one other selection by the system user of at least one notification option from the plurality of notification options is also received. The system user is subsequently notified using the at least one notification option upon occurrence of any of the subset of the plurality of system events.

According to a still further embodiment, in a system for matching carrier capacities with shipper loads via a wide area network, methods and apparatus are provided for effecting payment from a shipper to a carrier. A shipper load corresponding to the shipper is presented on the system. A bid corresponding to the shipper load from the carrier is presented to the shipper. Acceptance of the bid from the shipper is communicated to the carrier. Delivery information from the carrier is presented to the shipper regarding delivery of the shipper load. The shipper load is then closed, thereby automatically effecting payment from the shipper to the carrier. According to a more specific embodiment, the shipper is given a window of opportunity to confirm or dispute the carrier's delivery information before payment is effected.

In another embodiment, in a system for matching carrier capacities with shipper loads via a wide area network, methods and apparatus are provided for maintaining a service rating for each shipper and each carrier in the system. At least one parameter for each of the shippers and carriers is tracked, the at least one parameter relating to performance of the corresponding one of the shippers and carriers in system transactions. The service rating for each of the shippers and carriers is updated based on the at least one parameter. The service rating for each of the shippers and carriers is communicated to selected users of the system.

In yet another embodiment, in a system for matching carrier capacities with shipper loads via a wide area network, methods and apparatus are provided for responding to bids for a shipper load corresponding to a shipper. The shipper load is posted on the system, the shipper load having an automatic acceptance price associated therewith specified by a shipper representative. The automatic acceptance price is a monetary value at and below which automatic acceptance is authorized. A bid for the shipper load is received specifying a bid price. Where the bid price is less than or equal to the automatic acceptance price, the bid is automatically accepted on behalf of the shipper.

In still another embodiment, in a system for matching carrier capacities with shipper loads via a wide area network, methods and apparatus are provided for responding to bids for a shipper load corresponding to a shipper. The shipper load is posted on the system, the shipper load having an automatic notify price associated therewith specified by a shipper representative. The automatic notify price is a monetary value at and below which automatic notification of the shipper representative is authorized. A bid for the shipper load is received specifying a bid price. Where the bid price is less than or equal to the automatic notify price, the shipper representative is automatically notified regarding the bid.

A further understanding of the nature and advantages of the present invention may be realized by reference to the remaining portions of the specification and the drawings.

BRIEF DESCRIPTION OF THE DRAWINGS

FIGS. 1a-8 are a series of screen shots showing various shipper interfaces according to specific embodiments of the present invention;

FIGS. 9-17b are a series of screen shots showing various carrier interfaces according to specific embodiments of the present invention;

FIGS. 18a-18c are a series of screen shots showing various administrative interfaces according to specific embodiments of the present invention;

DETAILED DESCRIPTION OF SPECIFIC EMBODIMENTS

Figure 7A:
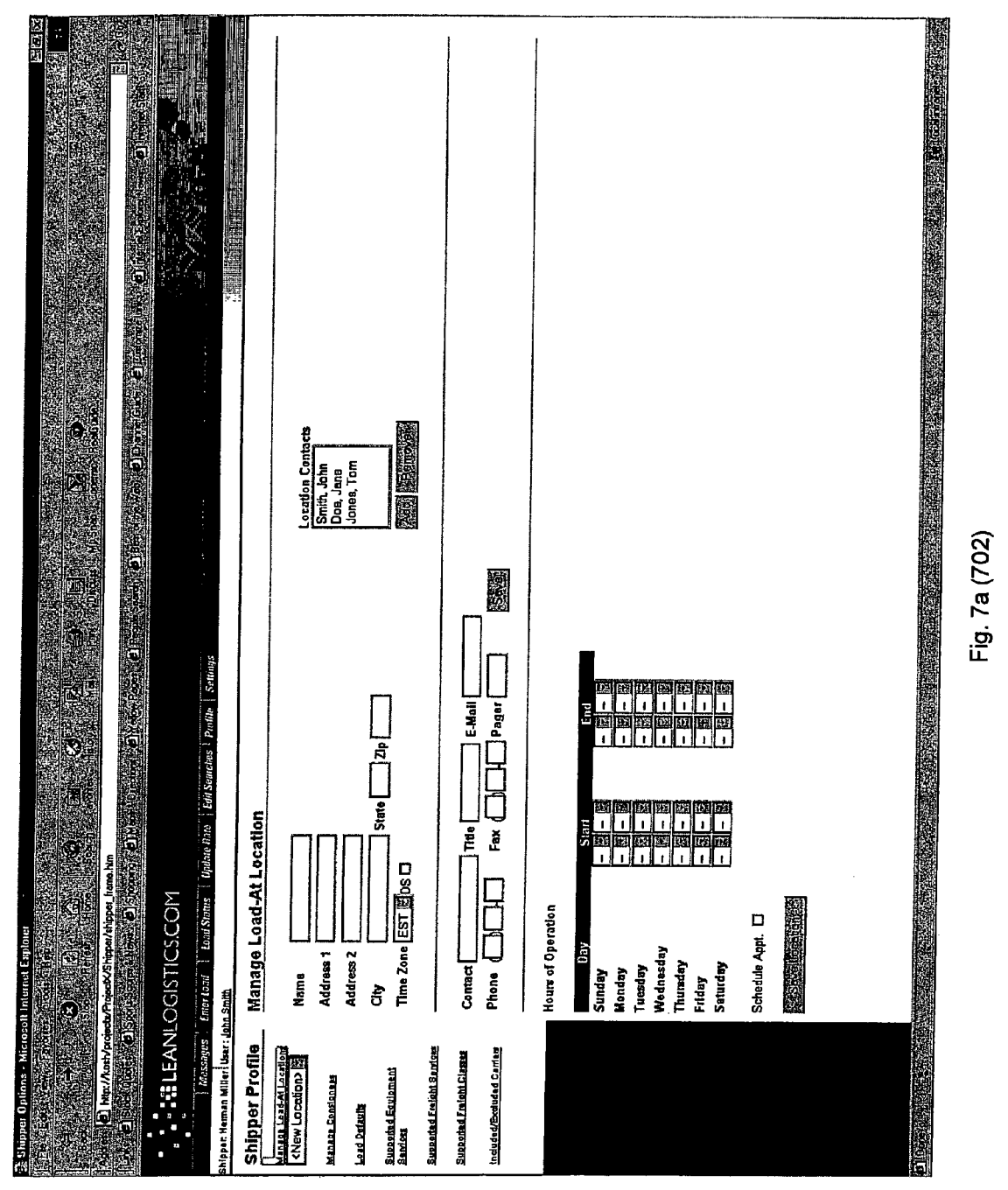
Figure 7B:
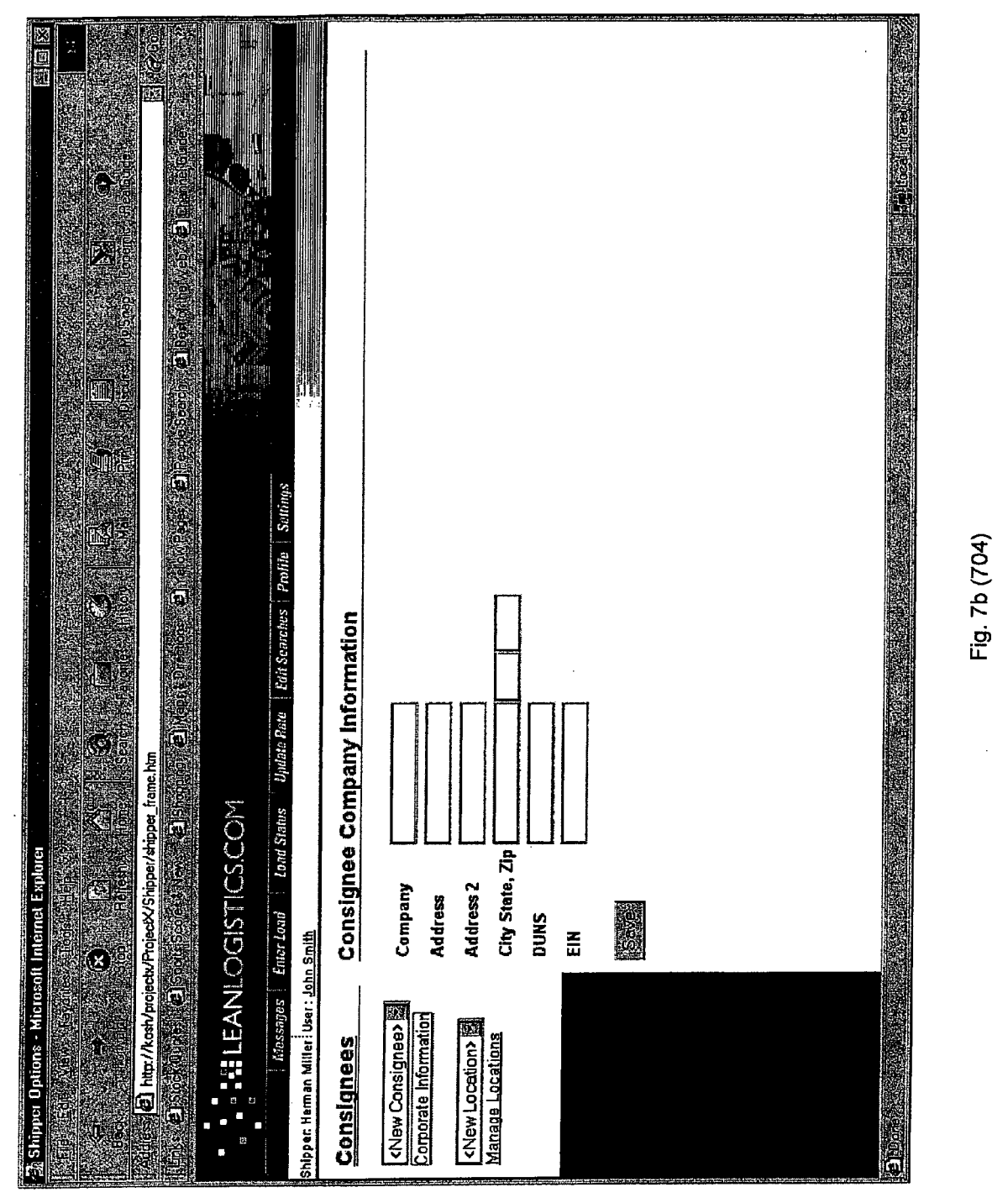
Figure 7C:
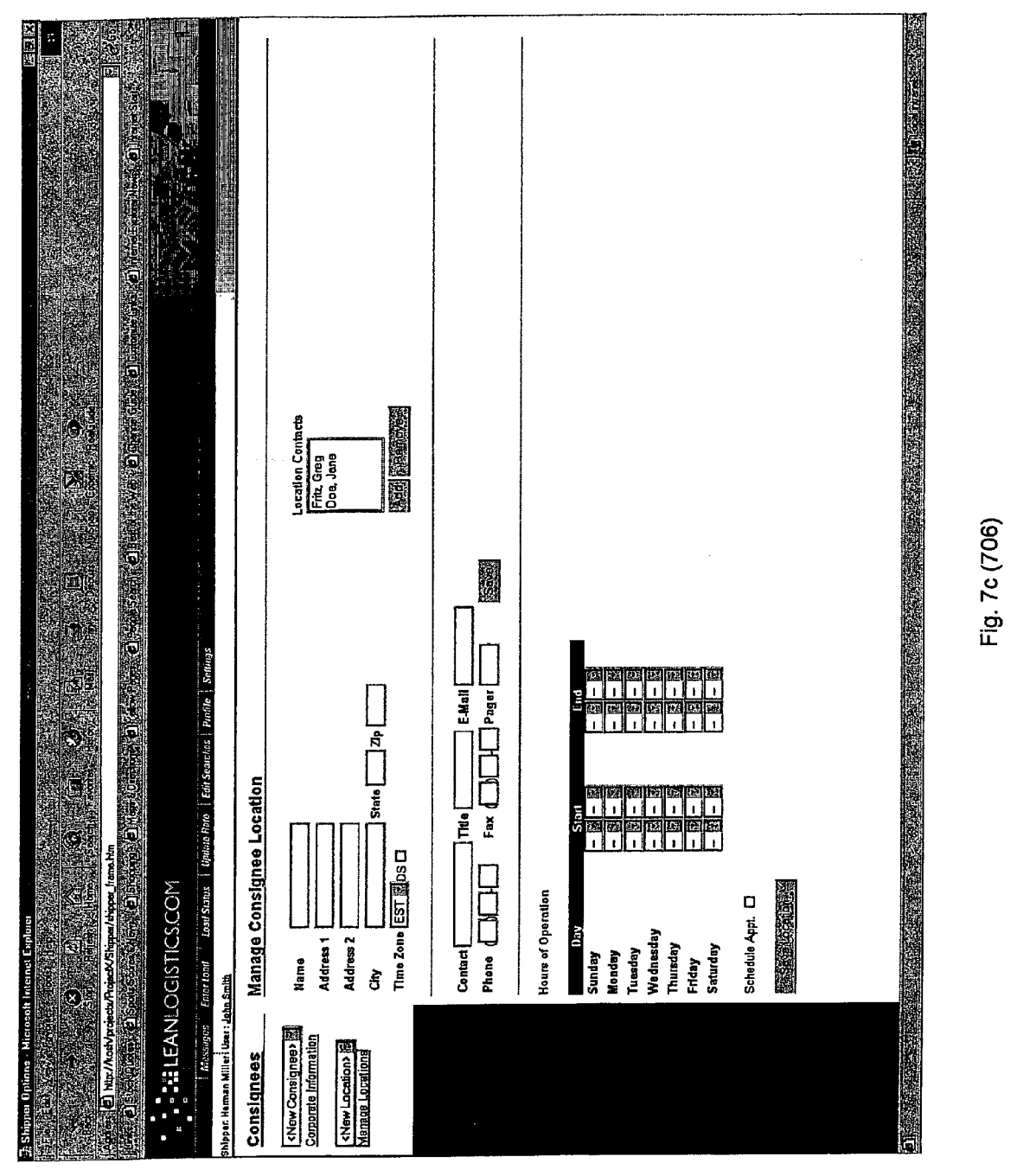
Figure 19:
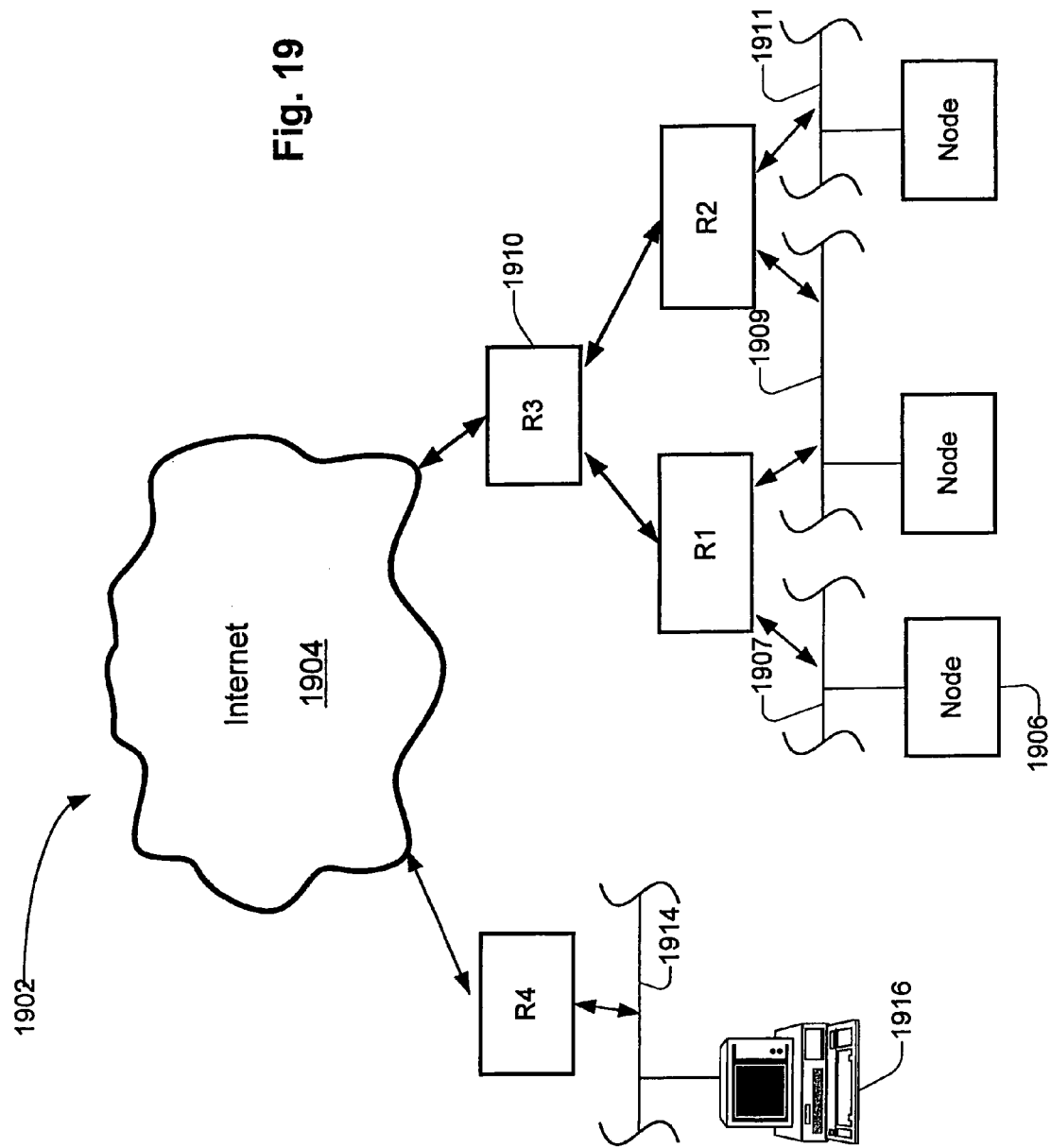
FIG. 19 shows a diagram of a generic IP network, which is an example of one type of flow-based network in which the technique of the present invention may be implemented.

Shipper interaction with a specific embodiment of the system of the present invention will now be described with reference to the screen shots of FIGS. 1a-8. FIG. 1a shows a login interface 100 which is presented to all users of the system, i.e., representatives of shippers or carriers, and system administrators. Upon entering his user name and password, the shipper representative is presented with a list of current messages as shown in interface 102 of FIG. 1b. As will be discussed, each system user may specify how they would like to be notified of various system events, e.g., e-mail, pager, web. If a user specifies notification by the web, he will receive all of his system generated messages in this interface. As shown, this particular shipper representative is being notified, for example, that one load has expired with no bids, and that another bid has been automatically accepted by the system on his behalf. The shipper representative is also receiving a price confirmation from a carrier for a particular load. The shipper representative may remove items from the list by selecting the corresponding "Remove" button, or send a confirmation using the "Confirm" button.

Shown across the top of the message area in interface 102 is a Shipper Menu which includes "Messages," "Enter Load," "Load Status," "Update Rate," "Edit Searches," "Profile," and "Setting," the related interfaces for each of which will be discussed in turn. In response to selecting his User Name, i.e., John Smith, the shipper representative is presented with User Profile interfaces 202-208 of FIGS. 2a-2d in which changes to the shipper's user profile may be effected. That is, the shipper representative may change his password in Change Password interface 202 or specify how he would like to be notified of system events in Manage Notifications interface 206. Such events may include, for example, load entered, bid entered, bid manually accepted, bid automatically accepted, bid meets auto notify, low bid underbid, load confirmed, load rejected, delivery confirmation, load removed, load updated, load pre-expire, load expired, bid pre-expire, bid expired, rate updated, transaction closed, etc. According to specific embodiments, the shipper representative may also specify methods of notification of specific contacts for specific types of events. Such notification may be for system users as well as parties outside the system. For example, when a load is delivered, both the shipper and the consignee contact for that load may wish to be notified. The consignee contact is not necessarily a system user, but they may be designated as a contact by the shipper with contact information (e.g., e-mail address) and notification rules as described below.

According to a specific embodiment, the user may specify notification by the web in which case he will be able to view these messages when he logs on as described above, or by selecting Messages in the menu. Alternatively, the user may specify notification by e-mail or by pager in which case the system will generate the appropriate e-mails or pages upon the occurrence of particular events. As shown in interface 206, the user may specify one or more of the available notification options. According to a more specific embodiment, the user may specify the kind of events for which he wishes to receive notification.

Thus, in response to selection of "Manage Notifications" in the User Profile menu, Manage Notifications interface 206 is presented. With this interface, the shipper representative may select an event from the "Event" pull down menu, select a notification method for the selected event from the "Notification Method" pull down menu, and designate a priority for the notifications from the "Priority" pull down menu. The events for which the shipper representative has specified notification protocols are listed in under "Current Events," any of which may be removed by selecting the associated "Remove" button.

Selection of "Manage Contact Information" in the User Profile menu results in presentation of interface 204 of FIG. 2b in which the shipper representative may enter and update his contact information. Selection of "Interface Prefs." in the User Profile menu results in presentation of interface 208 of FIG. 2d in which the shipper representative may specify the preferred interface type for his machine.

In response to selecting "Enter Load" in the shipper menu, the shipper representative is presented with the Enter Load interface 302 of FIG. 3a in which specific load data may be entered for presentation on the system. These data may include the shipper's own load identifier in the "Shipper Load ID#" field for tracking purposes, as well as the type of freight in the "Freight Class" field. The shipper representative may also specify the type of equipment to be used to move the load in the "Equipment Service" field.

Load visibility, i.e., the portions of the system's user base to which the load data are presented, may be specified by selecting the "Asset" check box (i.e., carriers), the "Non-Asset" check box (i.e., brokers), and the "Both" check box (i.e., carriers and brokers). This provides a first high level mechanism by which a shipper can control who has an opportunity to bid on its loads. The shipper representative may also specify an estimate of the related freight service costs the carrier will incur. The shipper representative may also specify a minimum service rating for the load which limits the visibility of the load data to carriers having at least the specified rating. As will be discussed, each carrier and shipper in the system has a service rating which is determined by the system using a variety of parameters. Other such mechanisms to control the visibility of load data will be discussed below.

Using interface 302, the shipper representative may also specify an "Auto Buy Price" and/or an "Auto Notify Price." The Auto Buy Price is the price at or below which the shipper wants the system to automatically accept bids on the associated load on its behalf. The Auto Notify Price is the price at or below which the shipper wants the system to notify its representative if a bid for that price is entered for the associated load. The system notifies the representative using the medium specified in the user profile discussed above with reference to FIG. 2c. The shipper representative may also enter a date and time at which the load expires, i.e., becomes unavailable in the system.

Once the load data are specified, pickup and delivery locations for the load may then be specified. According to a specific embodiment of the invention, multiple pickup and multiple delivery locations may be specified. As shown on the left side of interface 302, two pickup locations and one delivery location have been specified. Each locations has one or more buttons associated with it. Selection of the "x" button removes the associated location from the list. Selection of the up arrow button moves the associated location up within the pickup or delivery list. Selection of the down arrow button moves the associated location down. In this way, the shipper representative may specify the order in which pickups and deliveries are to be made. For recurring loads, previously entered information may be used to populate a new load by selecting a previously stored load from the "Recall" pull down menu. Creation of such a load will be discussed below.

In response to selection of "Add Pickup" in interface 302, interface 304 of FIG. 3b is presented in which the shipper representative may specify the details of each pickup location associated with the load. Shipper and customer order information may be input in the corresponding windows. According to a specific embodiment, the pickup location may be input using a name for a previously stored location, or a system-assigned LeanLogistics number (LL#). That is, if a shipper wants to store addresses of frequently used consignees, LeanLogistics.com will allow them to do so and will assign a unique identifier, i.e., an LL#, to that location. According to a specific embodiment, a search capability is provided which allows the shipper representative to search for a desired pickup location in the system database.

As shown, the weight of the freight to be picked up at this location may be specified as well as the window of time in which the pickup is to occur. According to a specific embodiment, previously specified default times are automatically entered which depend upon the start and end dates selected by the shipper representative in interface 304. These default times may be overridden by selecting the "Override Default" button and using Override Window Defaults dialog box 306 of FIG. 3c. Once the pickup location data are complete, the shipper representative selects "Finished" which will result in presentation of interface 302.

In response to selection of "Add Delivery" in interface 302, interface 308 of FIG. 3d is presented in which the shipper representative may specify the details of each delivery location associated with the load. A consignee reference number and customer order numbers may be input in the corresponding windows. A consignee contact may also be specified from a menu of previously stored contacts for the shipper in the corresponding window. According to a specific embodiment, the shipper representative may search for consignee contacts using dialog box 310 of FIG. 3e.

Referring again to FIG. 3d, the delivery location may be input using a name for a previously stored location, or a system-assigned LeanLogistics number (LL#). That is, if a shipper wants to store addresses of frequently used consignees, LeanLogistics.com will allow them to do so and will assign a unique identifier, i.e., an LL#, to that location. According to a specific embodiment, a search capability is provided which allows the shipper representative to search for a desired delivery location in the system database. According to a specific embodiment, a shipper-specific consignee table in the database is searched. The shipper representative may also specify freight services for the delivery location including, for example, unloading of the freight by the driver, pallet exchange, and whether temperature control is required. Finally, the shipper representative may specify the window of time in which the delivery is to occur by entering start and end dates in the Delivery Window boxes. According to a specific embodiment dialog box 306 of FIG. 3c is used to override previously specified time windows as discussed above. Once the delivery location data is complete, the shipper representative may add another delivery location, or select "Finished" which will result in presentation of interface 302.

Once the load information is complete including all pickup and delivery location data, the shipper representative may select "Save Load" in interface 302 in response to which the load data are saved and Load Validation interface 312 of FIG. 3f is presented. Using interface 312, the shipper representative may review the load data to ensure that they are accurate. Changes may be effected by selection of the "Change" button. The shipper representative may also cancel the load by selecting the "Cancel" button.

In addition, if the shipper representative wants to save the load for future use, he selects the "Remember?" check box and enters a name by which the load may later be recalled. That is, selection of a particular load name in the "Recall" pull down menu in interface 302 results in presentation of the previously stored load data as shown in Recall Load interface 314 of FIG. 3g. Using this interface, the shipper need only specify the pickup and delivery windows and customer orders to create a new load. Once the shipper representative selects "Save Load" in interface 312, the load data are made available to the specified users for bidding. In addition, the shipper representative is presented with Load Acceptance interface 316 of FIG. 3h in which the system informs the shipper representative that the load has been accepted by the system and communicates the system assigned load number.

In response to selecting "Load Status" in the shipper menu, the shipper representative is presented with Load Status interface 402 of FIG. 4a in which the status of the shippers loads may be viewed. According to a specific embodiment, the shipper representative may view all or some subset of the loads using the "View" pull down which allows filtering of the loads to be viewed according to various criteria. An example of useful filter would be all loads for which the particular shipper representative is responsible. Each load has an entry for each bid in the system for that load which includes a "Buy" button, selection of which indicates acceptance of the particular bid to the carrier.

Once the shipper representative has selected the "Buy" button, the system removes the carrier's capacity from any other bids, removes all other bids for that load, and generates a notification to the shipper representative using the specified mechanism(s). As will be discussed below with reference to the carrier interfaces, the carrier is also notified of the shipper's acceptance of its bid.

As shown in interface 402, each load entry for which a bid has been entered includes the carrier's name, the amount of the bid, the type of carrier (asset based vs. non-asset based), the carrier's service rating, the number of loads against which the carrier capacity has been bid, and the number of shipper's loads on which the carrier has bid (e.g., Truck 1 is shown to have been bid against 3 loads, 2 of which are this shipper's loads). According to a specific embodiment, each entry may also include the specific units of capacity being bid against the load. All of this information allows the shipper to more intelligently select the appropriate carrier. For example, if the bid information for one carrier indicates that their capacity has been bid against 5 loads and the bid information for another carrier indicates that their capacity has been bid against only this load, the shipper may choose to deal with the less encumbered carrier. The interface includes button objects selection of which allows the shipper representative to either modify the associated load or remove the associated load from the system.

As mentioned above, it is possible that a particular unit of capacity or carrier equipment group may be bid against multiple loads. In addition and according to a specific embodiment, a business rule is enforced which states that "If a shipper accepts a carrier's bid, the carrier is obligated to take the load." Thus, according to this embodiment, when a shipper accepts a bid corresponding to a unit of capacity which has been bid against multiple loads, the system makes the capacity, i.e., the other bids corresponding to the capacity, unavailable so that the business rule may be enforced.

According to a more specific embodiment, once the shipper has accepted a particular bid for a load, the system flags the corresponding unit of capacity as unavailable in the carrier's Unit Status interface (see interface 1208 of FIG. 12d). All other active bids corresponding to that unit of capacity as well as other bids against the load are flagged as "removed." Thus, according to this embodiment, the bids are merely flagged as unavailable rather than actually being removed from the system.

Selection of the load number, e.g., L1, in Load Status interface 402 results in presentation of Load Detail interface 404 of FIG. 4b in which details of the selected load are presented. Selection of the links in interface 402 associated with each unit of carrier capacity, e.g., Truck 1, results in presentation of dialog box 406 of FIG. 4c in which the shipper's loads against which the unit has been bid are identified. Selection of the entry in the "# Bids" columns in either of interfaces 402 and 404 results in presentation of summary Bid History interface 408 of FIG. 4d in which a summary of the information for each bid for the selected load is provided. According to a specific embodiment, summary interface 408 shows only the last active bid from each carrier.

More detailed information may be accessed by selection of the "Detail" link in response to which detailed Bid History interface 410 of FIG. 4e is presented. In interface 410, the shipper representative is provided with the name of the carrier equipment as well as the number of loads against which the particular equipment is bid. In specific embodiments, links to Unit Usage dialog boxes, e.g., dialog box 406, are provided in both of interfaces 408 and 410. According to more specific embodiments, all bids made against the load, including retracted bids, are shown. The shipper representative may respond to any of the bids in the Bid History interfaces by selecting the "Buy" buttons. In response to selection of a "Buy" button, Buy Confirmation interface 412 of FIG. 4f is presented which confirms the capacity purchase and informs the shipper representative that the carrier has been notified.

Selection of "Update Rate" in the shipper menu results in presentation of Update Load Rate interface 502 of FIG. 5. Using this interface, a shipper representative may increase the rate associated with a load for which a bid was previously accepted by the shipper.

Shipper representatives with the appropriate authorization may select "Settings" in the shipper menu in response to which read access to the Settings interfaces 602-606 of FIGS. 6a-6c is provided. Referring first to interface 602 of FIG. 6a, the authorized shipper representative may view information about the shipper by selecting "Corporate Information" in the Settings menu on the left side of the interface. As shown, this information includes the company name, address, billing contact information, the company's Dun & Bradstreet number (the use of which will be discussed below with reference to the carrier interfaces), and the EIN (i.e., the Employer ID Number which is a unique identifier assigned by the federal government).

Selection of "Banking Information" in the Settings menu results in presentation of Banking Information interface 604 of FIG. 6b in which the authorized shipper representative may view the shipper's banking information which is used to facilitate the automatic payment mechanisms supported by the system of the present invention. According to a specific embodiment, any changes by the shipper representative to the data in Corporate Information interface 602 and Banking Information interface 604 are sent to LeanLogistics for approval.

Selection of "Admin Users" in the Shipper Environment menu results in presentation of the Maintain User Accounts interface 606 of FIG. 6c in which the authorized shipper representative may add or delete shipper representatives and enter or modify access levels for those representatives.

According to an additional embodiment, selection of "Credit Qualification" in the menu results in presentation of an interface (not shown) in which a shipper wishing to participate in the exchange enters credit information which is then used by LeanLogistics to determine the credit worthiness of the shipper.

Shipper representatives with the appropriate authorization may select "Profile" in the shipper menu in response to which access to the Shipper Profile interfaces 702-716 of FIGS. 7a-7h is provided. Referring first to interface 702 of FIG. 7a, the authorized shipper representative may enter or modify a new pickup location for use in entering loads by selecting "Manage Load-At Locations" in the Shipper Profile menu and designating either the <New Location> entry or a previously stored location in the associated menu. Selection of "Manage Consignees" presents a Consignees interface 704 of FIG. 7b for entering or modifying consignee information for use in entering loads as described above. Selection of "Manage Locations" in interface 704 results in presentation of Manage Consignee Location interface 706 of FIG. 7c in which the shipper representative may enter or modify the contact, operating, and geographical information for a particular consignee location.

Selection of "Load Defaults" in the Shipper Profile menu results in presentation of Load Defaults interface 708 of FIG. 7d in which the authorized shipper representative may specify various defaults for the load entering process described above with reference to FIGS. 3a-3h. As a result of selecting various options in interface 708, Enter Load interface 302 of FIG. 3a will be partially populated with the appropriate defaults when it is first presented to the shipper representative. Thus, the shipper representative may select its preferred carrier types to include asset based (carriers), non-asset based (brokers), or both. The shipper representative may also select the default value for the minimum acceptable service rating, as well as whether the Shipper Load ID# field in interface 302 is to be populated with a manually entered shipper's number or a number automatically generated by the system.

Selection of "Supported Equipment Services" in the Shipper Profile menu results in presentation of Supported Equipment Services interface 710 of FIG. 7e in which the authorized shipper representative may specify which types of equipment will be available to shipper representatives in the Equipment Service pull down menu in interface 302. That is, selection of the available equipment services in interface 710 results in population of the Equipment Service menu of interface 302 with the selected equipment.

Selection of "Supported Freight Services" in the Shipper Profile menu results in presentation of Supported Freight Services interface 712 of FIG. 7f in which the authorized shipper representative may specify which freight service options will be available to shipper representatives in the Enter Load, Add Pickup Location, and Add Delivery Location interfaces FIGS. 3a, 3b, and 3d. That is, selection of the available freight services in interface 712 results in the selected service options being presented in interfaces 302, 304, and 308.

Selection of "Supported Freight Classes" in the Shipper Profile menu results in presentation of Supported Freight Classes" interface 714 of FIG. 7g in which the authorized shipper representative may specify which types of freight classes, e.g., dry, will be available to shipper representatives in the Freight Class pull down menu in interface 302. That is, selection of the available equipment services in interface 714 results in population of the Freight Class menu of interface 302 with the selected freight classes.

Selection of "Included/Excluded Carriers" in the Shipper Profile menu results in presentation of Included/Excluded Carriers interface 716 of FIG. 7h in which the authorized shipper representative may specify to which carriers its loads will be made available for bidding. The shipper representative designates whether the list of carriers are to be included or excluded, then creates the list of carriers by entering their Standard Carrier Alpha Code (SCAC) in the corresponding window, and adding the SCAC to the list by selection of the right arrow. The carrier's SCAC is then displayed in the list.

Finally, the shipper representative may effect searches in the system for their own loads by selecting "Edit Searches" in the shipper menu which results in presentation of Edit Searches interface 802 of FIG. 8. Using this interface, the shipper representative may define and save searches which may then be repeatedly used by the shipper representative to identify appropriate loads according to the specified criteria. For example, the shipper representative may specify a zip code of origin, an operator (e.g., $\geq$, $\leq$, or =), and/or a value (e.g., zip code, price, miles, etc.). According to a specific embodiment, one or more additional rows of these fields specifying other parameters (e.g., destination zip code) may be added and logically combined with the previous row(s) using the logical operators "And" and "Or."

In addition to allowing standard comparison of bid and load characteristics and according to a specific embodiment, the system links to a Geographic Information System (GIS) which facilitates searching using spatial relations such as, for example, a distance radius from a specific location. Each physical location within the system database for shippers and consignees are geocoded upon entry in the database to associate a latitude and longitude coordinate for that location. This information is then used to provide the spatial comparison of data. When the search is fully specified the shipper representative names the search and selects "Save" in response to which the search is saved and enabled. A list of the available saved searches is provided in the "Choose Search" window.

Carrier interaction with a specific embodiment of the system of the present invention will now be described with reference to the screen shots of FIGS. 9-17b. Upon logging into the system using interface 100 of FIG. 1a, the carrier representative is presented with a Messages interface 902 of FIG. 9 which is similar to interface 102 of FIG. 1b, and in which access to system generated messages specific to the carrier representative is provided. As in the case of the shipper representative, a carrier menu is provided across the top of each the carrier interfaces. The carrier representative may select his name, i.e., the User Name in response to which the User Profile interfaces described above with reference to FIGS. 2a-2d are presented. As described above, the carrier representative may use these interfaces to change his password, manage contact information and the method(s) by which he would like to be notified of specific system events, and specify interface preferences. System events for which the carrier representative may select notification include, for example, bid entered, bid manually accepted, bid automatically accepted, agent matched loads, low bid underbid, load confirmed, load rejected, delivery confirmation, load removed, bid removed, bid updated, load pre-expire, load expired, bid pre-expire, bid expired, rate updated, unit updated, and transaction closed.

The carrier representative may search for loads in the system which are of interest to the carrier. For example, the carrier representative may search for loads relating to the lanes of operation in which the carrier is operating, within certain weight ranges, or that require specific equipment. According to a specific embodiment, load searching may be effected by selecting "Load Search" in the main carrier menu or in the Options menu in response to which Load Search interface 1002 of FIG. 10 is provided in which the carrier representative may define load searches. According to the embodiment shown in FIG. 10, the carrier representative may specify, for example, the origin or destination of the load, the pickup and delivery windows, and specific equipment and freight services. Alternatively, the carrier representative may select and/or modify one of a plurality of available predefined searches in the "Choose Search" pull down menu. For example, such a predefined search might designate a particular zip code in which the load originates, i.e., the initial pickup location for the load, and/or a specified radial distance from the pickup location.

Figure 11B:
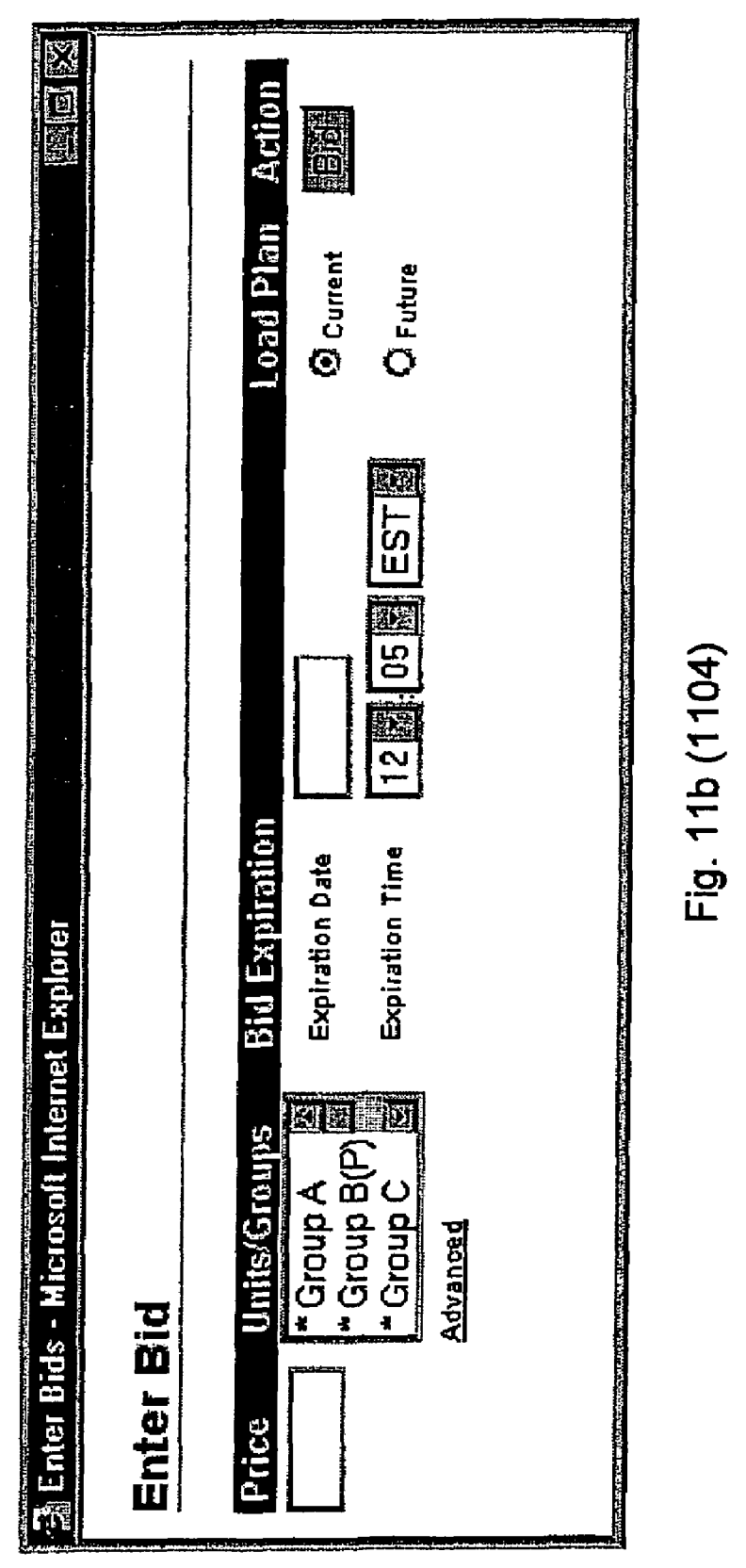

Upon selection of "View Loads" in the carrier menu, the View Loads interface 1102 of FIG. 11a is presented which provides detailed information for loads corresponding to the currently active search criteria specified by the carrier representative. A "Bid" button or hyperlink is associated with each load entry in response to selection of which the carrier representative may begin the bid generation process with the Enter Bids interface 1104 of FIG. 11b.

As shown, the carrier representative may specify the price, the time and date at which the bid expires, the carrier's equipment being bid, and whether the load is being bid as current or future capacity. A bid which is designated as a current bid is presented to the shipper as currently available capacity. A bid which is designated by the carrier as a future bid is made with a unit of capacity which is currently reserved for some other load. Such bids are presented to shippers as capacity which will be available at some future date and time. When the reserved capacity is made available to the system by the carrier closing the current load, the system automatically updates the future bid to a current bid and makes the bid available to the shipper as currently available capacity. This allows the carrier to plan the use of specific units of capacity one or more steps in advance.

Referring back to interface 1102, election of an entry in the "# Bids" column results in presentation of Bid History window 1106 of FIG. 11c which provides information regarding each of the bids for the associated load. According to a specific embodiment and as shown in the figure, this information includes the date and time the bid was made, the type of carrier (i.e., asset vs. non-asset), the carrier rating, and the amount of the bid, as well as an indication of whether the current user's company has bid on this load.

Advanced Unit Assignment window 1108 of FIG. 11d is presented in response to selection of "Advanced" in interface 1104 of FIG. 11b. This interface allows the carrier representative to assign specific equipment, e.g., trucks, to current and future load plans.

When the carrier representative submits a bid for one of the listed loads, Bid Acceptance window 1110 of FIG. 11e is presented which confirms receipt of the bid by the system and allows the carrier representative to review the details of the bid before it is posted.

When a shipper accepts the carrier's bid, the appropriate carrier representative is notified in the specified manner(s) and the carrier representative must then communicate acceptance of the load by selecting "Confirm Loads" in the carrier menu in response to which Confirm Loads interface 1202 of FIG. 12a is displayed. According to a specific embodiment, the carrier is obligated to accept the load once the shipper has accepted the bid. If the carrier rejects the load various penalties may be exacted including, for example, payment of money damages and, as will be discussed in greater detail below, a negative impact on the carrier's service rating.

Selection of the load number in interface 1202 results in presentation of Load Detail interface 1204 of FIG. 12b in which detailed information for the associated load is provided. Selection of the unit number, e.g., Truck 1, in interface 1202 results in presentation of Unit Status window 1206 of FIG. 12c in which the status of the particular unit of capacity is detailed. According to a specific embodiment and as shown, window 1206 identifies the loads against which the unit of capacity is currently bid. "Move" buttons are provided which may be used to move the capacity from one bid to another or to remove the capacity from the associated bid.

Selection of "Units" in the Options portion of the carrier menu results in presentation of Unit Status interface 1208 of FIG. 12d. In a specific embodiment, interface 1208 shows each unit of capacity associated with the carrier representative, the status of each unit of capacity (e.g., whether the unit has been bid, is inactive, or has won a load), and an identifier for the loads against which a unit has been bid (e.g., L-1, L-4, L-10) or which a unit has won (e.g., L-103). According to a specific embodiment, the carrier representative may post any or all of its anticipated units of capacity on the system for access by shippers. This provides visibility of available truck capacity in particular regions of the country so that shippers can plan in anticipation of spikes in business demand, or simply forward purchase carrier capacity.

The carrier representative may view information regarding the carrier's current bids in the system by selecting "View Bids" in the carrier menu in response to which View Current Bids interface 1302 of FIG. 13 is presented. Using this interface, the carrier representative may remove an active bid from the system. He may also edit certain information which is not "intrinsic" to the bid. For example, the expiration date may be edited, but not the amount of the bid.

Selection of "Confirm Delivery" in the carrier menu results in presentation of Confirmed Loads interface 1402 of FIG. 14a which, in turn, provides access to interfaces 1404 and 1406 by which the carrier representative may communicate confirmation information to the system regarding pickups and deliveries. In response to selection of a particular load number in interface 1402, Pickup/Delivery Performance interface 1404 of FIG. 14b is presented. For a specific pickup or delivery location the carrier representative enters the actual date and time of the pickup or delivery. Selection of the "Exceptions" link associated with each location results in presentation of an Exceptions interface 1406 of FIG. 14*c* in which other load related information may be specified such as, for example, the reasons for a late arrival, whether or not there was any damage to the load and who was responsible, whether the quantity delivered or picked up was over or under the contracted quantity, and the number of hours the carrier was detained at the specified location. The information input by the carrier representative is used by the system to maintain the service rating for the carrier.

According to a specific embodiment, confirmation of a delivery triggers the automatic payment feature of the present invention, e.g., an electronic funds transfer (EFT) from the shipper to the carrier is effected. According to another embodiment, the shipper and/or the addressee of the load are notified as to the information entered in this interface for verification purposes. The recipients of this information are then afforded a period of time during which any disputes regarding the accuracy of the confirmation information are dealt with. In addition, once a load has been delivered and closed, the system "unlocks" the corresponding unit(s) of carrier capacity, making it available once again for bidding.

Selection of "Agents" in the Options portion of the carrier menu results in the presentation of Carrier Agent Maintenance interface 1502 of FIG. 15. Using this interface, the carrier representative can create "agents" which search the system on an ongoing basis without user interaction for loads which satisfy specified criteria. The criteria with which a particular agent looks for loads are selected from among the predefined searches in the "Choose Search" pull down menu (the manner in which such predefined searches are created is discussed above with reference to FIG. 10). Thus, for example, an agent could be configured using a predefined search which looks for loads originating within 100 miles of Chicago with delivery within 100 miles of Atlanta. Pickup and delivery dates and times may also be specified, as well as the types of equipment and freight services specified by the shipper.

The carrier representative may also specify dates and times between which the agent will operate. Alternatively, the carrier representative may specify a manual control for starting and stopping the agent. Interface 1502 also provides a Current Agent List in which details about each of the carrier representative's searches are displayed. As shown, each agent entry may also include a "Stop" button with which the carrier representative may terminate operation of the agent at any time.

According to a specific embodiment, the carrier representative may also specify how they would like any loads matching the agent criteria to be handled. For example, the carrier representative may specify that he wants to be notified of any matching loads so that he may manually enter a bid. This may be done, for example, via an e-mail which contains a hyperlink to the load, thus facilitating entering of the bid. Alternatively, the carrier representative may specify that the system should generate a bid automatically when a matching load is found. According to a specific embodiment, the system employs a rating engine to calculate the most appropriate bid, taking into consideration the distances, freight services, and bidding rules set forth by the carrier. Such bidding rules might specify, for example, a rate per mile, a shipper rating, an equipment service class, freight services, bid expiration date and times, and origin and destination zip codes as well as distance radii from specific locations.

Selection of "Profile" in the carrier menu by an authorized carrier representative results in presentation of Carrier Profile interfaces 1602-1616 of FIGS. 16*a*-16*h* in which the carrier representative may modify the carrier profile in many of the same ways as discussed above with reference to the Shipper Profile interfaces. For example, selection of "Manage Contacts" in the Carrier Profile menu results in presentation of Manage Contacts interface 1602 of FIG. 16*a* in which the authorized carrier representative may enter and modify contact information.

Selection of "Carrier Equipment ID's" in the Carrier Profile menu results in presentation of Carrier Equipment ID's interface 1604 of FIG. 16*b* in which the authorized carrier representative may add or remove the carrier's own identifiers for specific equipment and units of capacity such as, for example, truck identifiers as shown. The carrier representative may also group individual units of capacity together and create group identifiers, e.g., Group A, for the purpose of being able to bid multiple units of capacity against a single load as shown in interface 1606 of FIG. 16*c*. An equipment group is simply a grouping of units understood by the carrier. The equipment and group identifiers are then available to the carrier representative for the purpose of, for example, creating a bid as described above.

Selection of "Supported Equipment Services" in the Carrier Profile menu results in presentation of interface 1608 of FIG. 16*d* in which the authorized carrier representative may select from a list of equipment services provided by the system to create a list of equipment services supported by the carrier. Similarly, selection of "Supported Freight Services" results in presentation of interface 1610 of FIG. 16*e* in which the authorized carrier representative may create a list of freight services (including a value where appropriate) supported by the carrier. The supported equipment and freight services are used by the carrier to create a standard accessorial charges table. Selection of "Supported Freight Classes" results in presentation of interface 1612 of FIG. 16*f* in which the carrier representative may create a list of freight classes supported by the carrier.

Selection of "Included/Excluded Shippers" in the Carrier Profile Options menu results in presentation of interface 1614 of FIG. 16*g* in which the authorized carrier representative may specify the shippers with which the carrier is willing to do business. According to a specific embodiment, shippers are identified by their Dun & Bradstreet identification numbers. Similarly, selection of "Preferred Shipper Types" brings up interface 1616 of FIG. 16*h* in which the carrier representative may specify whether the carrier is willing to do business directly with shippers, through transportation brokers, or both. Interfaces 1614 and 1616 essentially allow the specification of filters (as described above with reference to shipper interface 130) which allow or prevent access to the carrier's units of capacity in the system.

Selection of "Settings" in the carrier menu by an authorized carrier representative results in presentation of the Settings menu shown, for example, in interface 1702 of FIG. 17*a*. Selection of "Corporate Information," "Banking Information," or "Admin Users" in the Settings menu results in interfaces similar to those described above with reference to FIGS. 6*a*-6*c* in which the authorized carrier representative can view information regarding the carrier, the carrier's bank account(s), and administer the various carrier representatives who have access to the system. Selection of "Operating Authority Information" by an authorized user leads to an interface 1702 (FIG. 17*a*) in which the carrier's operating authority information may be entered and modified. Selection of "Insurance Information" by an authorized user leads to an interface 1704 (FIG. 17*b*) in which the carrier's insurance information may be entered and modified.

According to various embodiments of the present invention, a service rating is maintained for each shipper and carrier which provides a visible and objective measure of the quality of service provided by each. According to a specific embodiment, the service rating is a numeric rating from 1 to 5 with 5 being the highest rating. Each new carrier and shipper in the system start with an average rating of 3. The system employs a variety of metrics to adjust the service ratings. For example, for carriers, such metrics may include on-time pickup and delivery, damage to cargo, rejection of loads, the number of shipper complaints relative to the aggregate number of loads handled by the carrier, misrepresentation of equipment or services (e.g., use of an out-of-spec trailer), etc. According to a specific embodiment, a carrier's service rating is automatically updated upon closing of a load.

The service rating for shippers may be determined from a variety of metrics including, for example, carrier complaints (e.g., carrier detention at either pickup or delivery locations), reneging on accepted bids, payment issues, misrepresentation (e.g., no unload at delivery location), hidden charges (e.g., shipper's customer charges to unload), etc.

FIGS. 18a-18d are a series of screen shots showing various administrative interfaces. By selection of each of the entries in the menu, a corresponding interface is provided in which the various lists provided by the system to the shippers and carriers are maintained. Manage SCAC Listings interface 1802 of FIG. 18a allows an authorized system representative to manage the SCAC listings in the system. Manage Equipment Services interface 1804 of FIG. 18b allows the system representative to add and remove items from the list of available equipment services. Manage Type Codes interface 1806 of FIG. 18c allows the system representative to add or remove items from the lists of available freight services and classes.

The following is a general description of networking technology, portions of which are relevant to various embodiments of the present invention. A computer network is a geographically distributed collection of interconnected communication links for transporting data between nodes, such as computers. By definition, a network is a group of computers and associated devices that are connected by communications facilities or links. Network connections can be of a permanent nature, such as via cables, or can be of a temporary nature, such as connections made through telephone or other communication links. A plurality of computer networks may be further interconnected by intermediate nodes, or routers, to extend the effective "size" of the networks, smaller portions of which may be maintained as autonomous domains of nodes. A router is computer system that stores and forwards data packets from one local area network (LAN) or wide area network (WAN) to another. Routers see the network as network addresses and all the possible paths between them. They read the network address in a transmitted message and can make a decision on how to send it based on the most expedient route (traffic load, line costs, speed, bad lines, etc.). Routers typically communicate by exchanging discrete "packets" of data according to predefined protocols. In this context, a protocol comprises a set of rules defining how the nodes interact with each other.

Networks vary in size, from a local area network (LAN) consisting of a few computers and related devices, to a wide area network (WAN) which interconnects computers and LANs that are geographically dispersed. An internetwork, in turn, is the joining of multiple computer networks, both similar and dissimilar, by means of gateways or routers that facilitate data transfer and conversion from various networks. A well known abbreviation for internetwork is internet. As currently understood, the capitalized term Internet refers to the collection of networks and gateways that uses a Transmission Control Protocol/Internet Protocol (TCP/IP). The Internet has recently seen explosive growth by virtue of its ability to link computers located throughout the world.

FIG. 19 shows a diagram of an IP network, which is an example of one type of flow-based network in which the technique of the present invention may be implemented. A flow can be a hard-state virtual circuit in an ATM network, a soft-state flow in an IP network (e.g., a MPLS tunnel), or a stateless connection as a TCP/IP connection in today's Internet. As shown in FIG. 19, the IP network 1902 includes the Internet (or a WAN) 1904 over which a Node 1916 (e.g. a computer) can communicate with a separate node 1906 via a plurality of intermediate nodes (e.g. R1, R3, R4). Node 1906 may be, for example, a server which is part of Local Area Network (LAN) 1907, connected to the Internet via routers R1 and R3. Router R3 (1910) may, in turn, connect one or more other routers (e.g., router R2) with the Internet.

A LAN is a communication network that serves users within a confined geographical area. It is made up of servers, workstations, a network operating system and a communications link. Servers are high-speed machines that hold programs and data shared by all network users. The workstations, or clients, are the users' personal computers, which perform stand-alone processing and access the network servers as required The controlling software in a LAN is the network operating system, such as, for example, NetWare, UNIX, and/or Appletalk, which resides in the server. Message transfer is managed by a transport protocol such as, for example, IPX, SPX, SNA and/or TCP/IP. The physical transmission of data is performed by the access method (Ethernet, Token Ring, etc.) which is implemented in the network adapters that plug into the machines. The actual communications path is the cable (twisted pair, coax, optical fiber) that interconnects each network adapter.

In order to reduce design complexity, most networks are organized as a series of hardware and software levels or "layers" within each node. These layers interact to format data for transfer between, e.g., a source node and a destination node communicating over the network. Specifically, predetermined services are performed on the data as it passes through each layer and the layers communicate with each other by means of the predefined protocols. This layered design permits each layer to offer selected services to other layers using a standardized interface that shields those layers from the details of actual implementation of the services. The layered protocols, commonly referred to as protocol stacks, are described in greater detail with reference to FIG. 20.

Figure 20:
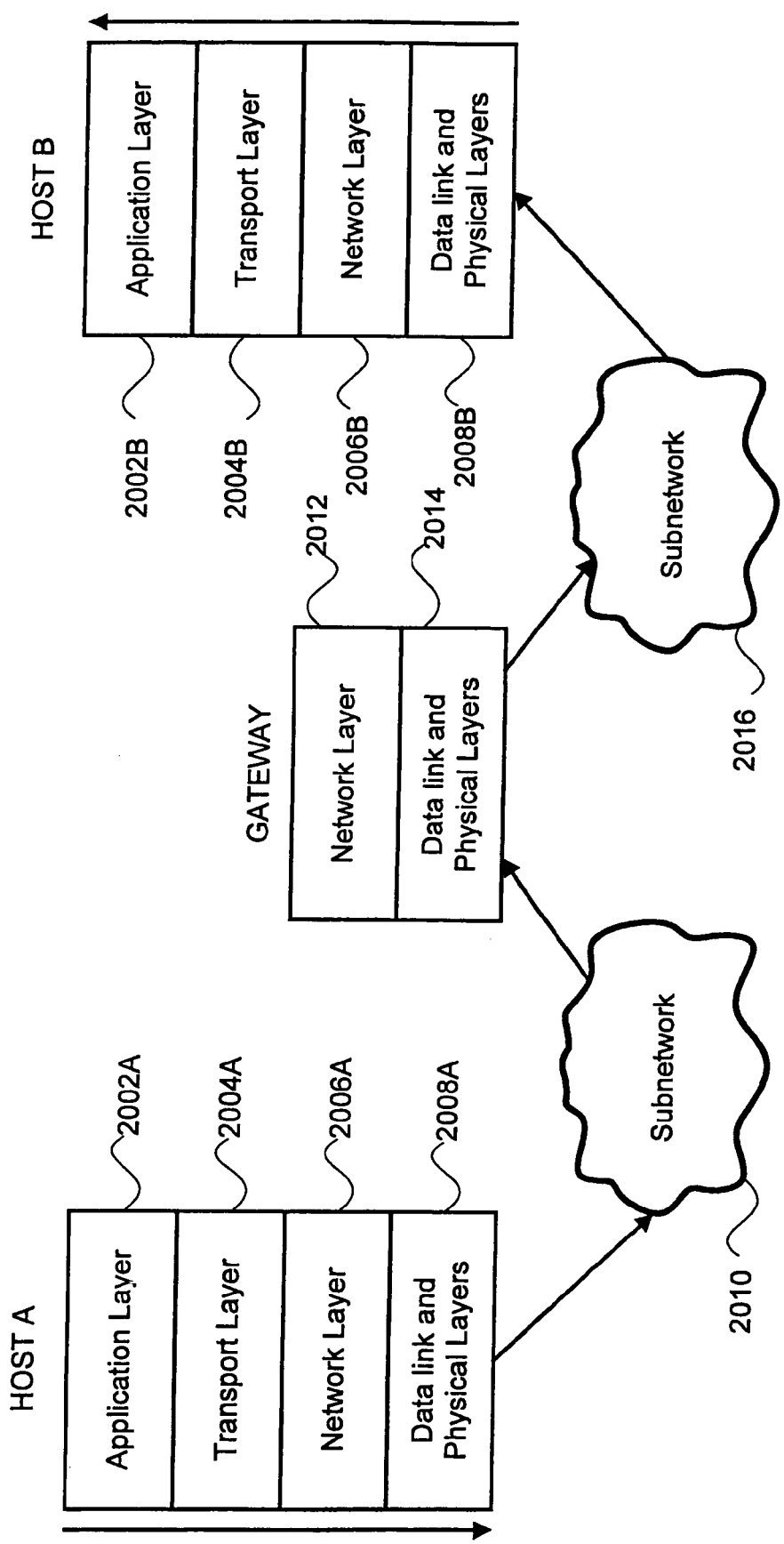
FIG. 20 illustrates the relationship of subnetworks and gateways to layered protocols.

FIG. 20 illustrates the relationship of subnetworks and gateways to layered protocols. Assume that the user application 2002A in host A sends an application protocol data unit (PDU) to an application layer protocol 2002B in host B, such as, for example, a file transfer system. The file transfer software performs a variety of functions and sends file records to the user data. In many systems, the operations at host B are known as server operations and the operations at host A are know as client operations.

As indicated by the downward arrows in the protocol stack at host A, this unit is passed to the transport layer protocol 2004A, which performs a variety of operations and adds a header to the PDU passed to it. At this point, the unit of data is often referred to as a segment. The PDU from the upper layers is considered to be data to the transport layer.

Next, the transport layer passes the segment to the network layer 2006A, also called the IP layer, which again performs specific services and appends a header. This unit (now called a datagram in internet terms) is passed down to the lower layers. Here, the data link layer adds its header as well as a trailer, and the data unit (now called a frame) is launched into subnetwork 2010 by the physical layer 2008A. Of course, if host B sends data to host A, the process is reversed and the direction of the arrows is changed.

Internet protocols are typically unaware of what goes on inside the network. The network manager is free to manipulate and manage the PDU in any manner necessary. In some instances, however, the internet PDU (data and headers) remains unchanged as it is transmitted through the subnet. In FIG. 20, it emerges at the gateway where it is processed through the lower layers 2014 and passed to the IP (network) layer 2012. Here, routing decisions are made based on the destination address provided by the host computer.

After these routing decisions have been made, the PDU is passed to the communications link connected to the appropriate subnetwork (comprising the lower layers). The PDU is re-encapsulated into the data link layer frame and passed to the next subnetwork 2016, where it finally arrives at the destination host.

The destination (host B) receives the traffic through its lower layers and reverses the process that transpired at host A; it de-encapsulates the headers by stripping them off in the appropriate layer. The header is used by the layer to determine the actions it is to perform; the header therefore governs the layer's operations.

The PDU created by the file transfer application in the application service layer is passed to the file transfer application residing at host B. If host A and B are large mainframe computers, this application is likely an exact duplicate of the software at the transmitting host. The application might, however, perform a variety of functions, depending on the header it receives. It is conceivable that the data could be passed to another end-user application at host B, but in many instances the user at host A merely wants to obtain the services of a server protocol, such as a file transfer or email. If this is the case, it is not necessary for an end-user application process to be invoked at host B.

To return the retrieved data from the server at host B to the client at host A, the process is reversed. The data is transferred down through the layers in the host B machine, through the network, through the gateway, to the next network, and up the layers of host A to the end-user.

Figure 21:
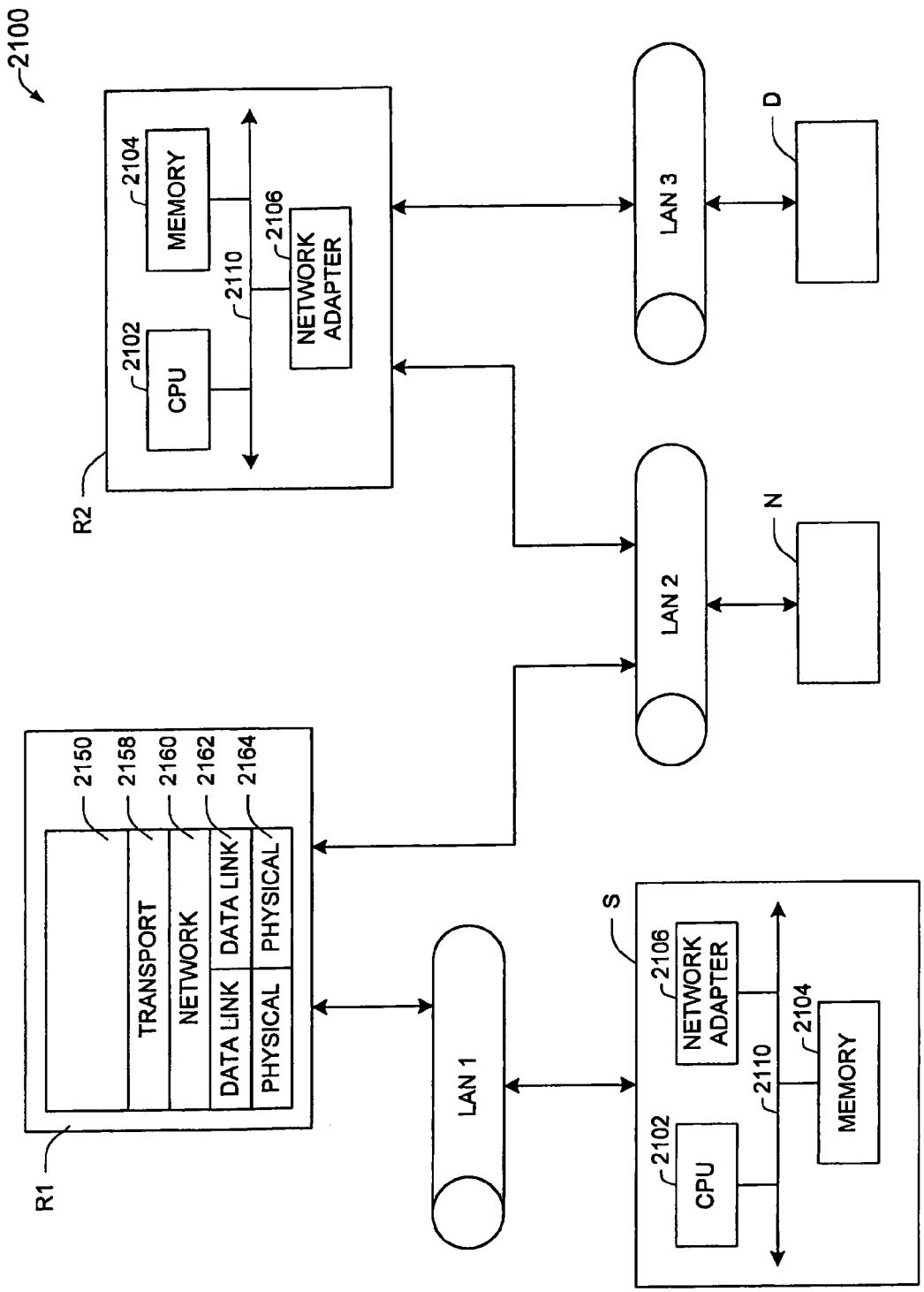
FIG. 21 is a block diagram of a network system comprising a collection of computer networks connected to a plurality of nodes.

FIG. 21 is a block diagram of a network system 2100 comprising a collection of computer networks connected to a plurality of nodes. The nodes are typically general-purpose computers comprising a source node S, an end node N, a destination node D and a plurality of intermediate nodes or routers R1 and R2. Each node typically comprises a central processing unit (CPU) 2102, a memory unit 2104 and at least one network adapter 2106 interconnected by a system bus 2110. The memory unit 2104 may comprise storage locations typically composed of random access memory (RAM) devices, which are addressable by the CPU 2102 and network adapter 2106. The memory unit typically provides temporary storage of information, such as, for example, executable processes and contents of data packets, as described further herein. An operating system, portions of which are typically resident in memory and executed by CPU, functionally organizes the node by, inter alia, invoking network operations in support of those processes executing in the CPU.

The computer networks included within system 2100 may range from local area networks (LANs) to wide area networks (WANs). A LAN is a limited area network, while a WAN may be a public or private telecommunications facility that interconnects nodes widely dispersed using communication links. Communication among the nodes coupled to these networks is typically effected by exchanging discrete data "packets" specifying addresses of, e.g., source and destination nodes.

Since the system shown in FIG. 21 comprises a relatively small group of interconnected LANs 1-3, it is typically maintained as an autonomous domain. The intermediate nodes, typically routers, are configured to facilitate the flow of data packets throughout the domain 2100 by routing those packets to the proper receiving nodes.

In general, when a source node S transmits a packet over LAN 1, the packet is sent to all nodes on that LAN. If the intended recipient of the packet is connected to LAN 3, the packet is routed through router R1, over LAN 2 and through R2 onto LAN 3. A key function of a router is determining the next node to which the packet is sent; this routing function is typically performed by network layer 2160 of a protocol stack 2150 within each node. Typically, the packet includes two destination addresses: the address of the final destination node and the address of the next node along the route. The final destination address remains constant as the packet traverses the networks along an optimal route, while the next destination address changes as the packet moves from node to node along the optimal route through the networks.

Specifically, when source node S sends a packet to destination node D, i.e., the final destination address, the packet is transmitted onto LAN 1 with a next destination address specifying the address of router R1. Address information embedded in the packet, which is processed by the higher-layer software of the protocol stack 2150, identifies the final destination of the packet as node D. Based on this information, R1 determines that the next node along the optimal path is router R2 and proceeds to pass the packet onto LAN 2 for reception by that node. Router R2 then determines that the next node is the final destination node D and transmits the packet over LAN 3 to node D.

Figure 22:
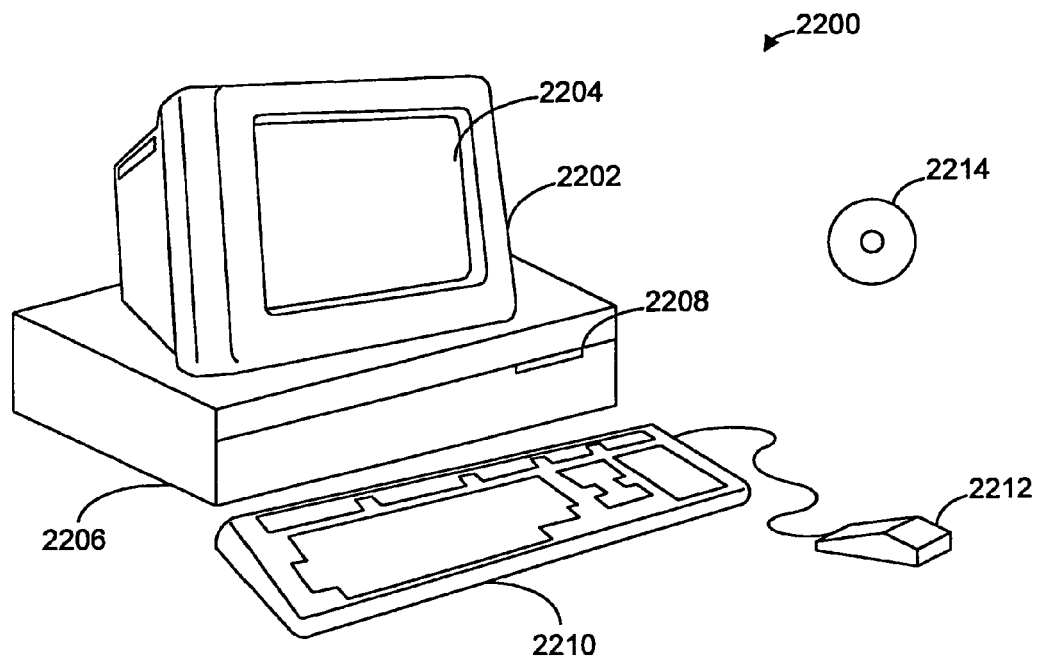
FIGS. 22 and 23 illustrate a computer system suitable for implementing embodiments of the present invention.
Figure 23:
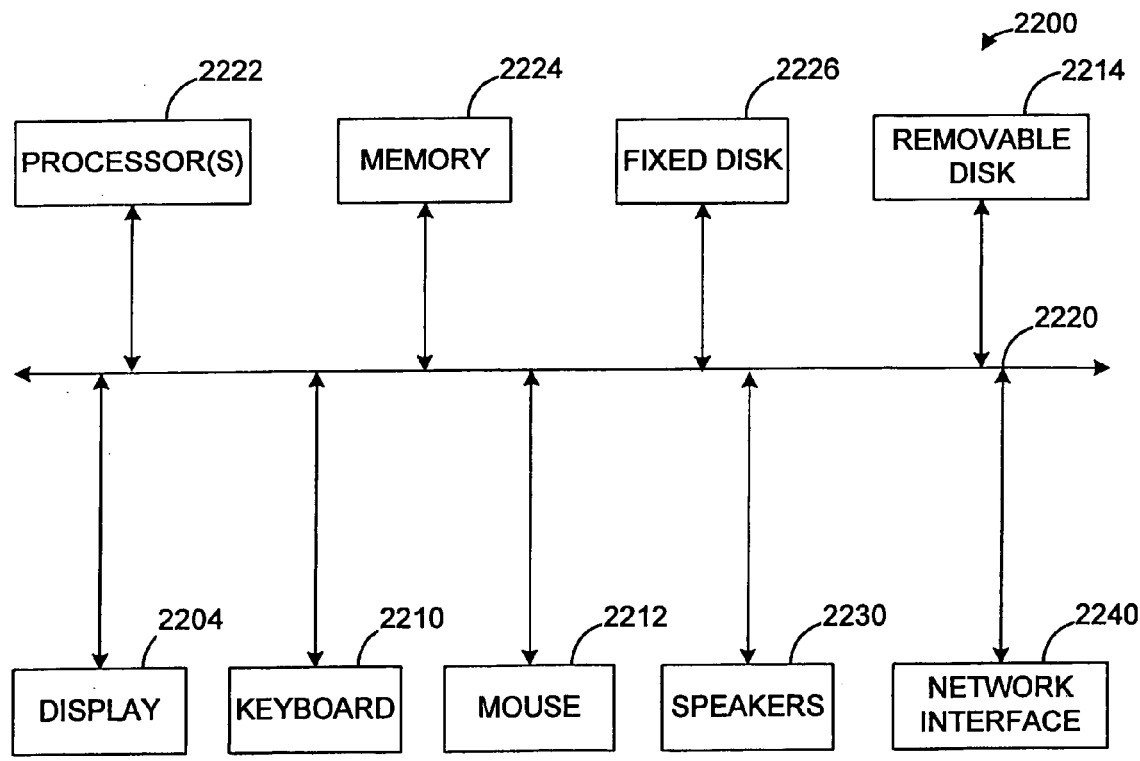

FIGS. 22 and 23 illustrate a computer system 2200 suitable for implementing embodiments of the present invention. FIG. 22 shows one possible physical form of the computer system. Of course, the computer system may have many physical forms ranging from an integrated circuit, a printed circuit board and a small handheld device up to a huge super computer. Computer system 2200 includes a monitor 2202, a display 2204, a housing 2206, a disk drive 2208, a keyboard 2210 and a mouse 2212. Disk 2214 is a computer-readable medium used to transfer data to and from computer system 2200.

FIG. 23 is an example of a block diagram for computer system 2200. Attached to system bus 2220 are a wide variety of subsystems. Processor(s) 2222 (also referred to as central processing units, or CPUs) are coupled to storage devices including memory 2224. Memory 2224 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 2226 is also coupled bi-directionally to CPU 2222; it provides additional data storage capacity and may also include any of the computer-readable media described below. Fixed disk 2226 may be used to store programs, data and the like and is typically a secondary storage medium (such as a hard disk) that is slower than primary storage. It will be appreciated that the information retained within fixed disk 2226, may, in appropriate cases, be incorporated in standard fashion as virtual memory in memory 2224. Removable disk 2214 may take the form of any of the computer-readable media described below.

CPU 2222 is also coupled to a variety of input/output devices such as display 2204, keyboard 2210, mouse 2212 and speakers 2230. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 2222 optionally may be coupled to another computer or telecommunications network using network interface 2240. With such a network interface, it is contemplated that the CPU might receive information from the network, or might output information to the network in the course of performing the above-described method steps. Furthermore, method embodiments of the present invention may execute solely upon CPU 2222 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

While the invention has been particularly shown and described with reference to specific embodiments thereof, it will be understood by those skilled in the art that changes in the form and details of the disclosed embodiments may be made without departing from the spirit or scope of the invention. For example, embodiments of the present application have been described with reference to the trucking industry. However, it will be understood that the techniques described herein are equally applicable to other sectors of the supply chain, e.g., aircraft, shipping, rail. Therefore, the scope of the invention should be determined with reference to the appended claims.

What is claimed is:

1. In a system for matching carrier capacities with shipper loads via a wide area network, a computer-implemented method for enabling a carrier representative to manage units of carrier capacity associated with a carrier, each unit of capacity corresponding to specific carrier equipment having an associated equipment identifier, the method comprising:

presenting first carrier interfaces operable to enable the carrier representative to post selected ones of the units of capacity for viewing by shipper representatives, the first carrier interfaces being operable to receive a plurality of capacity parameters for each selected unit of capacity and facilitate generation of a listing for each selected unit of capacity;

presenting second carrier interfaces operable to enable the carrier representative to identify shipper loads, the second carrier interfaces being operable to initiate a search process according to at least one criterion specified by the carrier representative;

presenting third carrier interfaces operable to enable the carrier representative to select first ones of the units of capacity, assign a group identifier to the first units of capacity thereby relating the associated equipment identifiers, and generate a first bid for a first shipper load using the group identifier;

presenting fourth carrier interfaces operable to enable the carrier representative to generate a plurality of second bids corresponding to a plurality of second shipper loads, each of the second bids corresponding to a second one of the units of capacity, such that where one of the second bids is accepted, all others of the second bids become unavailable; and presenting fifth carrier interfaces operable to enable the carrier representative to generate a third bid for a third shipper load designating a currently unavailable one of the units of capacity, the third bid being identified as a future bid, such that when the currently unavailable unit of capacity becomes available, the third bid is updated to a current bid.

2. The method of claim 1 wherein the first carrier interfaces are further operable to facilitate limiting visibility of the units carrier capacities according to shipper identification information input by the carrier representative.

3. The method of claim 1 wherein the fourth carrier interfaces further include information regarding a number of the second shipper loads against which the second unit of capacity is currently bid.

4. The method of claim 1 wherein the second carrier interfaces are operable to enable the carrier representative to specify a period of time during which the search process operates without user intervention.

5. The method of claim 4 further comprising presenting a notification to the carrier representative when the search process identifies one of the shipper loads.

6. The method of claim 5 wherein the notification comprises any of an e-mail, a pager signal, and a message to be displayed using an interface of the system.

7. The method of claim 6 wherein the e-mail includes a hyperlink corresponding to the identified shipper load.

8. The method of claim 1 wherein the second carrier interfaces are operable to enable the carrier representative to manually activate the search process.

9. The method of claim 1 wherein the second carrier interfaces are operable to enable the carrier representative to manually terminate the search process.

10. The method of claim 1 wherein the second carrier interfaces are further operable to enable the carrier representative to specify bidding rules according to which automatic bid for the shipper loads identified by the search process may be generated.

11. The method of claim 1 wherein the equipment identifiers correspond to any of trucking capacity, aircraft capacity, shipping capacity, and rail capacity.

12. The method of claim 1 further comprising presenting sixth interfaces operable to enable the carrier representative to generate additional bids for other shipper loads designating the currently unavailable unit of capacity, each of the additional bids being identified as additional future bids, such that when the currently unavailable unit of capacity becomes available, the additional future bids are updated to a additional current bids.

13. The method of claim 1 wherein the at least one criterion comprises any of a pickup location, a delivery location, a pickup date, a delivery date, an equipment type, and a freight service.

14. The method of claim 1 further comprising presenting a notification to the carrier representative upon occurrence of a system event, the notification comprising any of an e-mail, a pager signal, and a message to be displayed using an interface of the system.

15. The method of claim 1 further comprising presenting sixth carrier interfaces including bid histories corresponding to any of the plurality of bids in the system associated with the carrier.

16. A computer program product for use in a system for matching carrier capacities with shipper loads via a wide area network, the computer program product comprising at least one computer readable medium having computer program instructions embedded therein which are operable to cause at least one computing device to perform a method for enabling a carrier representative to manage units of carrier capacity associated with a carrier, each unit of capacity corresponding to specific carrier equipment having an associated equipment identifier, the method comprising:

presenting first carrier interfaces operable to enable the carrier representative to post selected ones of the units of capacity for viewing by shipper representatives, the first carrier interfaces being operable to receive a plurality of capacity parameters for each selected unit of capacity and facilitate generation of a listing for each selected unit of capacity;

presenting second carrier interfaces operable to enable the carrier representative to identify shipper loads, the second carrier interfaces being operable to initiate a search process according to at least one criterion specified by the carrier representative;

presenting third carrier interfaces operable to enable the carrier representative to select first ones of the units of capacity, assign a group identifier to the first units of capacity thereby relating the associated equipment identifiers, and generate a first bid for a first shipper load using the group identifier;

presenting fourth carrier interfaces operable to enable the carrier representative to generate a plurality of second bids corresponding to a plurality of second shipper loads, each of the second bids corresponding to a second one of the units of capacity, such that where one of the second bids is accepted, all others of the second bids become unavailable; and presenting fifth carrier interfaces operable to enable the carrier representative to generate a third bid for a third shipper load designating a currently unavailable one of the units of capacity, the third bid being identified as a future bid, such that when the currently unavailable unit of capacity becomes available, the third bid is updated to a current bid.

17. A system for matching carrier capacities with shipper loads, comprising at least one computing device deployed in a network for enabling a carrier representative to manage units of carrier capacity associated with a carrier, each unit of capacity corresponding to specific carrier equipment having an associated equipment identifier, the at least one computing device being configured to:

present first carrier interfaces operable to enable the carrier representative to post selected ones of the units of capacity for viewing by shipper representatives, the first carrier interfaces being operable to receive a plurality of capacity parameters for each selected unit of capacity and facilitate generation of a listing for each selected unit of capacity;

present second carrier interfaces operable to enable the carrier representative to identify shipper loads, the second carrier interfaces being operable to initiate a search process according to at least one criterion specified by the carrier representative;

present third carrier interfaces operable to enable the carrier representative to select first ones of the units of capacity, assign a group identifier to the first units of capacity thereby relating the associated equipment identifiers, and generate a first bid for a first shipper load using the group identifier;

present fourth carrier interfaces operable to enable the carrier representative to generate a plurality of second bids corresponding to a plurality of second shipper loads, each of the second bids corresponding to a second one of the units of capacity, such that where one of the second bids is accepted, all others of the second bids become unavailable; and present fifth carrier interfaces operable to enable the carrier representative to generate a third bid for a third shipper load designating a currently unavailable one of the units of capacity, the third bid being identified as a future bid, such that when the currently unavailable unit of capacity becomes available, the third bid is updated to a current bid.

\* \* \* \* \*